United States Patent [19]
Runyan et al.

[11] 3,850,314
[45] Nov. 26, 1974

[54] MACHINE FOR COOLING AND STACKING FLAT PRINTED ARTICLES

[75] Inventors: Kenneth R. Runyan, Milford; Quentin E. Honnert, Cincinnati; Ronald H. Porter, Milford, all of Ohio

[73] Assignee: Multifold-International, Inc., Milford, Ohio

[22] Filed: May 31, 1972

[21] Appl. No.: 258,180

[52] U.S. Cl............. 214/6 P, 198/20 R, 214/95 R, 214/310, 271/76
[51] Int. Cl........................................... B65g 57/11
[58] Field of Search...... 214/89, 95, 6 P, 6 H, 6 PK, 214/6 F, 6 R, 309, 310, 301; 198/20 R

[56] References Cited
UNITED STATES PATENTS

| | | | |
|---|---|---|---|
| 2,796,179 | 6/1957 | Van Vleck | 214/6 H |
| 2,888,126 | 5/1959 | Leaman et al. | 214/310 X |
| 3,050,199 | 8/1962 | McGrath et al. | 214/6 P |
| 3,269,565 | 8/1966 | Kemp, Jr. | 214/6 P |
| 3,303,942 | 2/1967 | Thomas et al. | 214/6 P |
| 3,329,286 | 7/1967 | Kurczak | 214/6 P |
| 3,337,069 | 8/1967 | Burger | 214/89 |
| 3,403,799 | 10/1968 | Sindzinski et al. | 214/89 |
| 3,583,580 | 6/1971 | Dean | 214/6 BA |
| 3,690,435 | 9/1972 | King | 198/20 R |
| 3,737,021 | 6/1973 | Reth et al. | 198/20 R |

*Primary Examiner*—Robert G. Sheridan
*Attorney, Agent, or Firm*—James W. Pearce; Roy F. Schaeperklaus

[57] ABSTRACT

A machine for cooling and stacking flat printed articles. The articles issue from a printing press in streams which are caused to diverge. The articles are arranged in shingle-fashion and projected into brush belt conveyors where the articles are spaced and cooling air is blown around the articles. The articles are advanced upwardly by the brush belt conveyors. The brush belt conveyors advance to downwardly moving portions to invert the articles, and the inverted articles are stacked at a plurality of levels. Skids are advanced to the levels to position opposite the stacks, and the stacks are advanced onto the skids.

3 Claims, 75 Drawing Figures

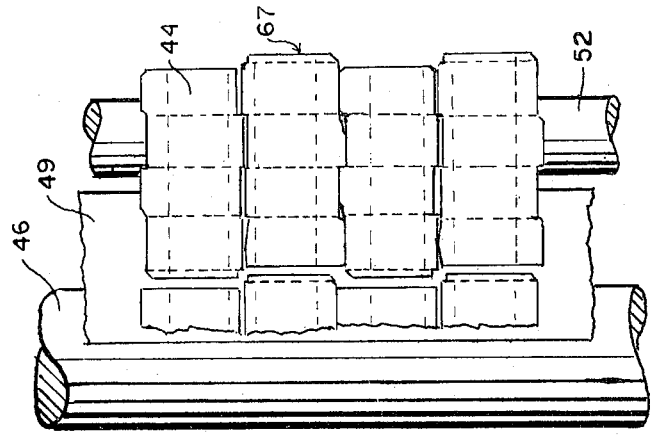
FIG. 5
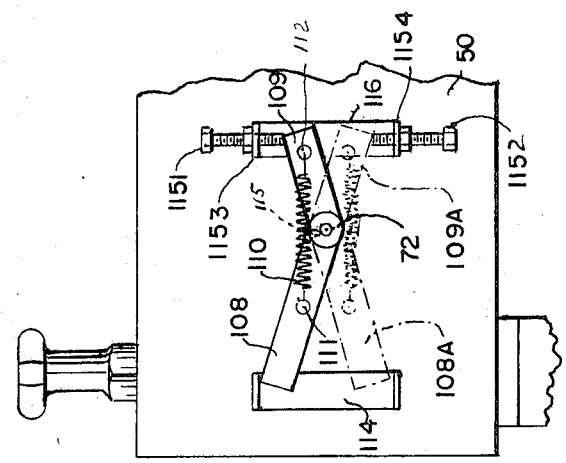
FIG. 8
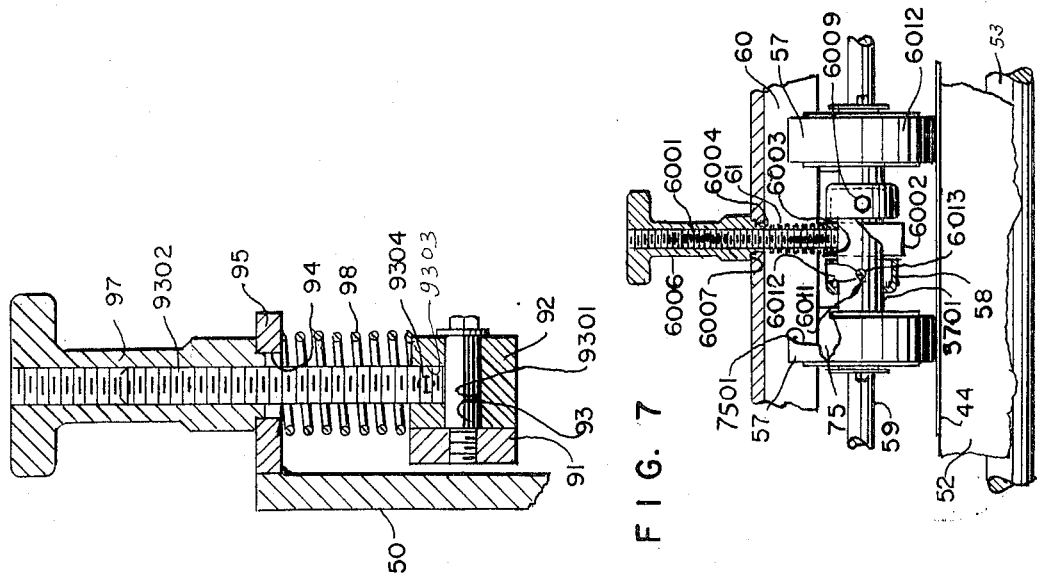
FIG. 7
FIG. 6

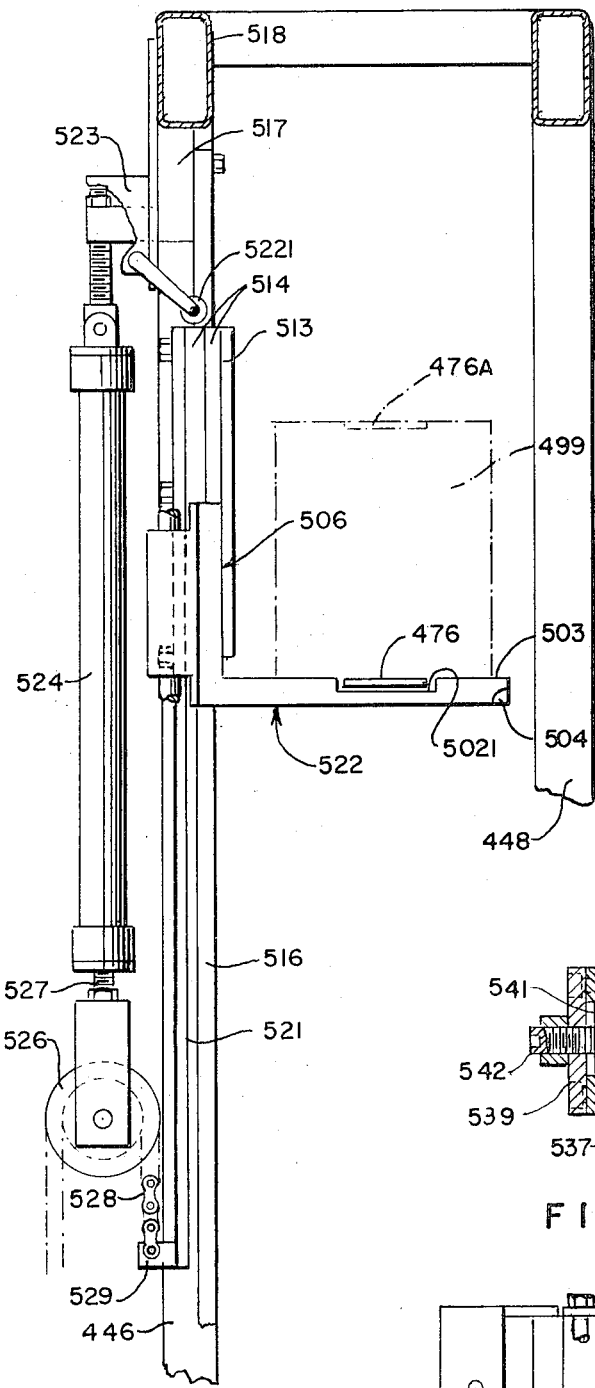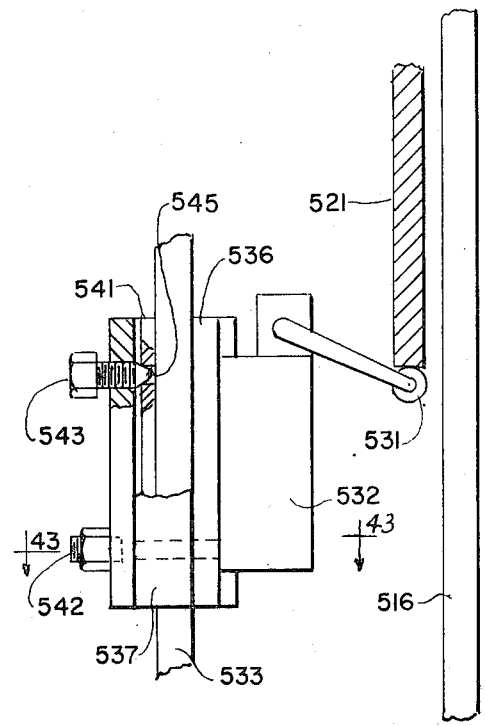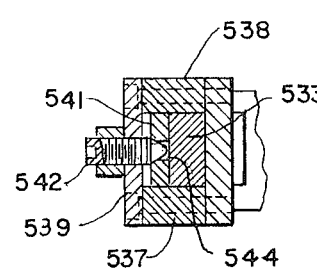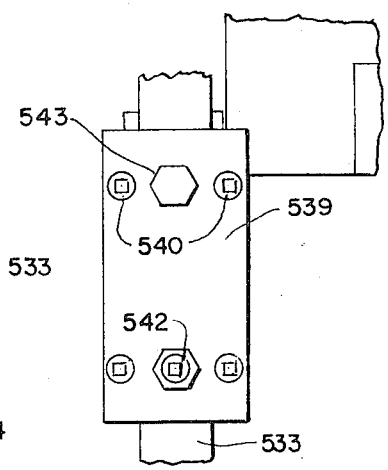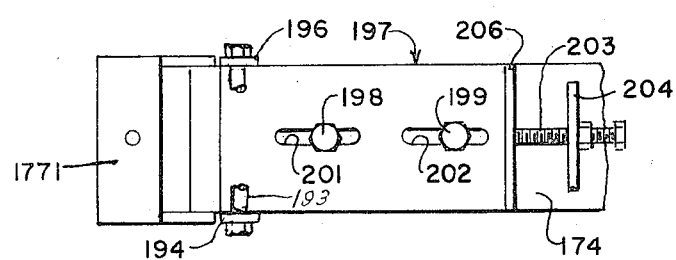

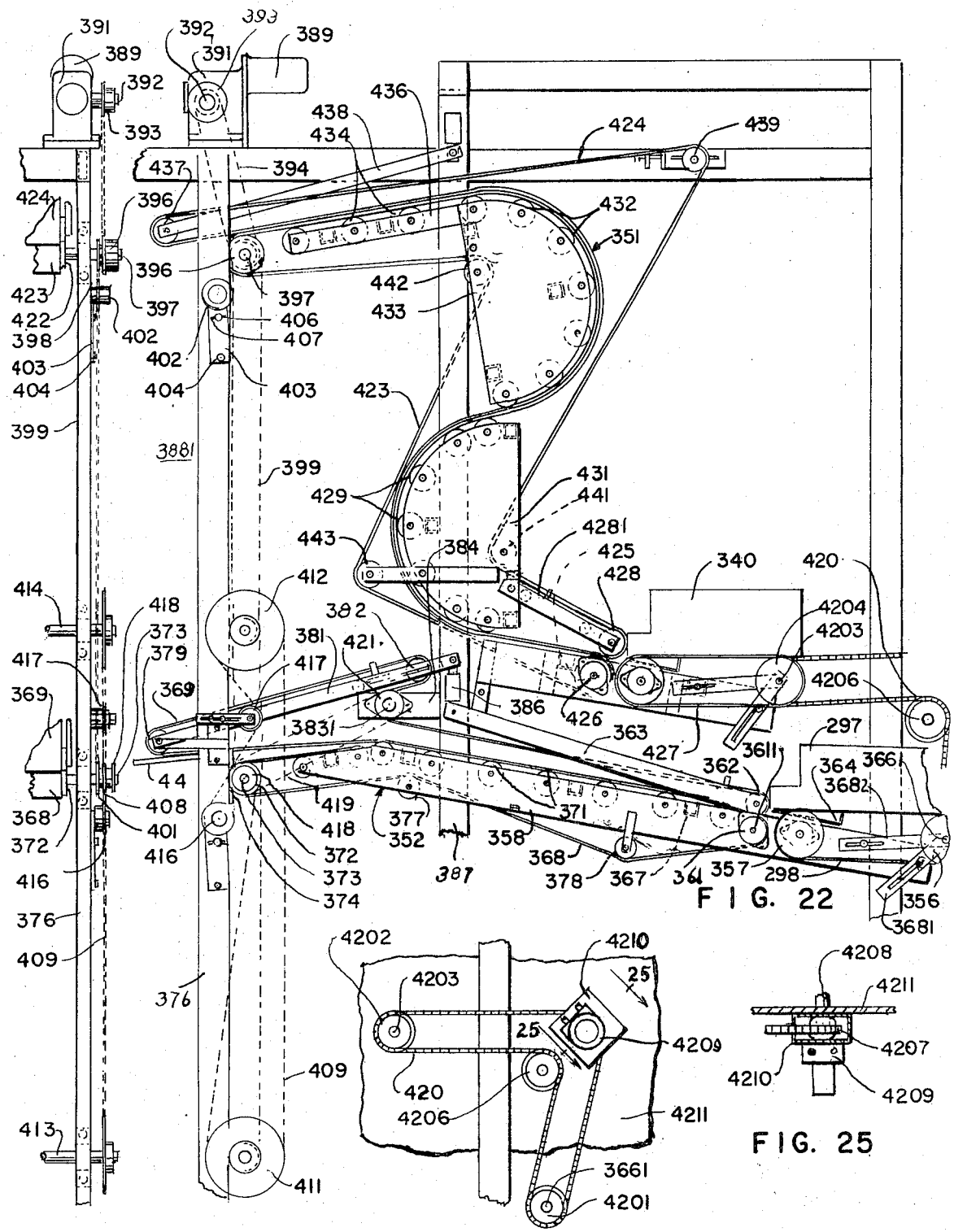
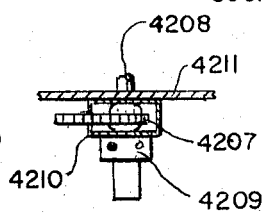
FIG. 23   FIG. 24   FIG. 25

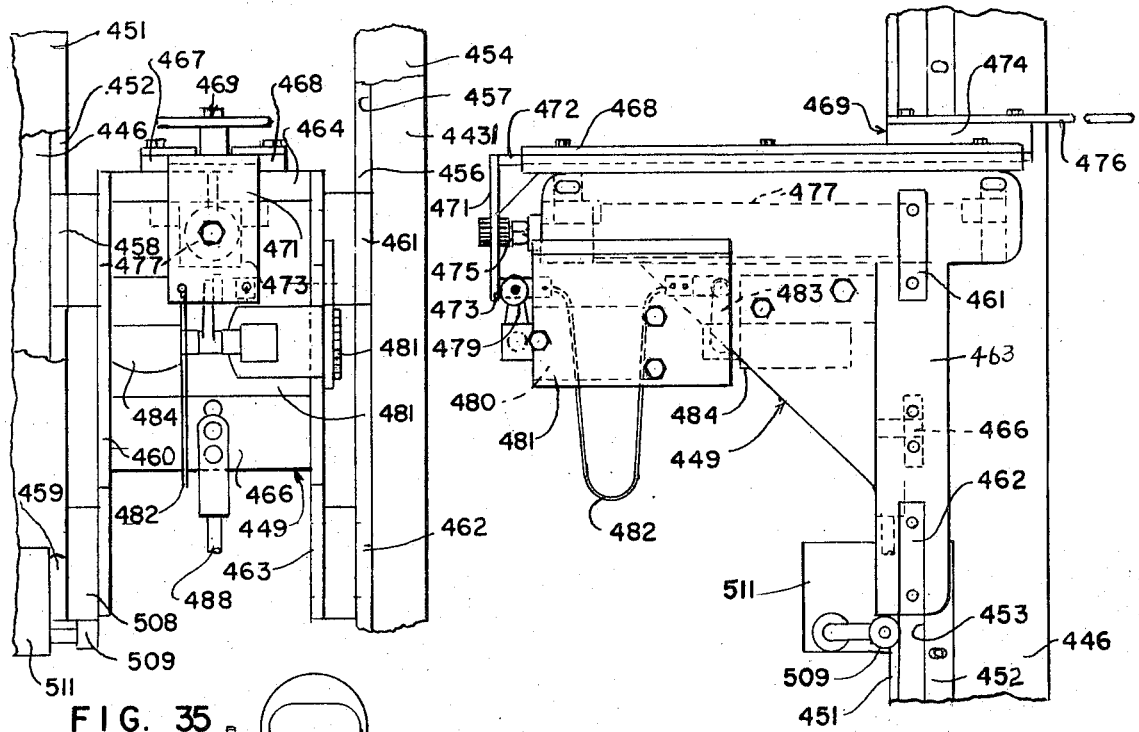
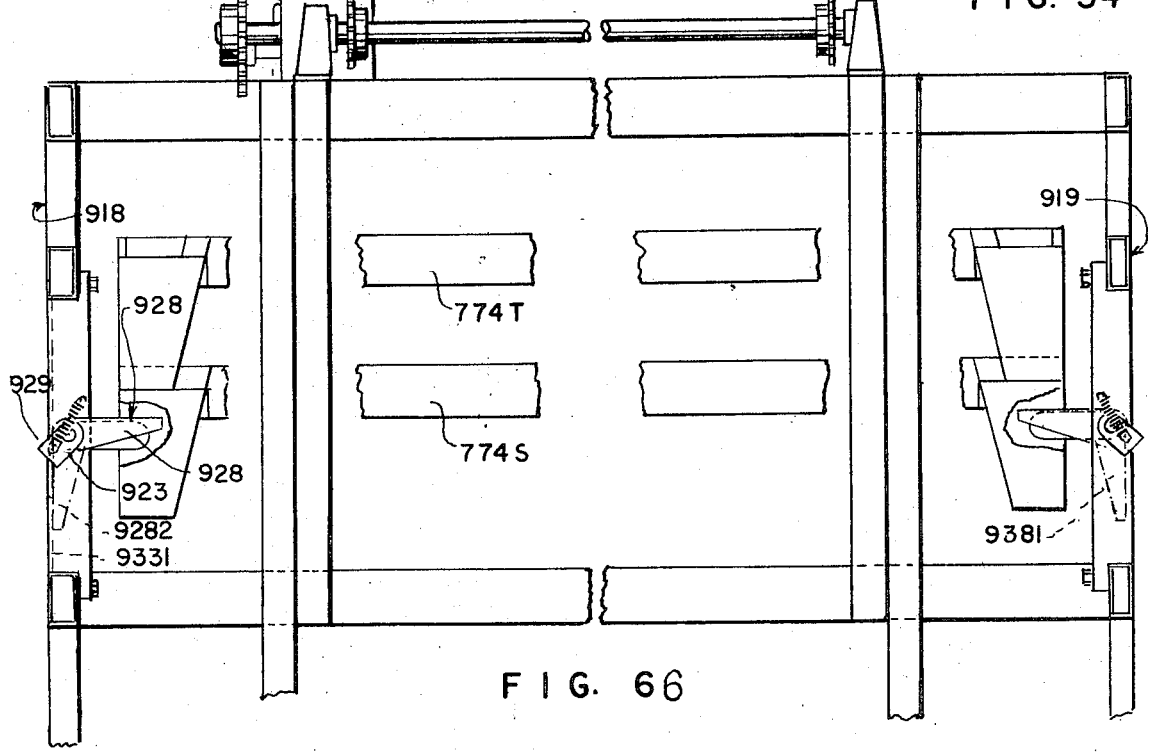

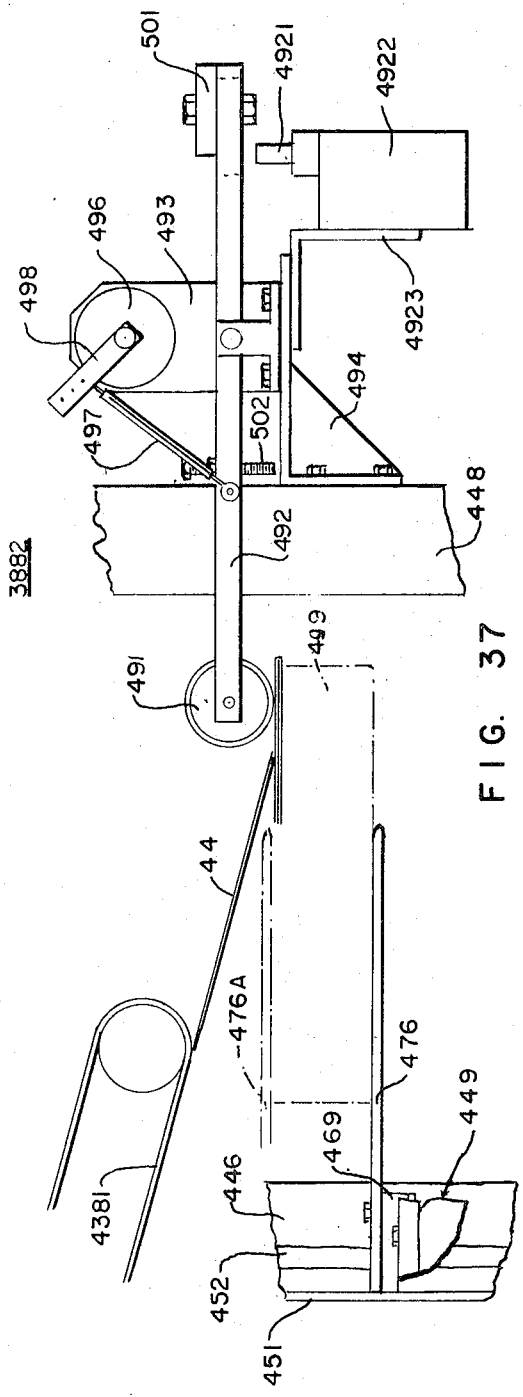
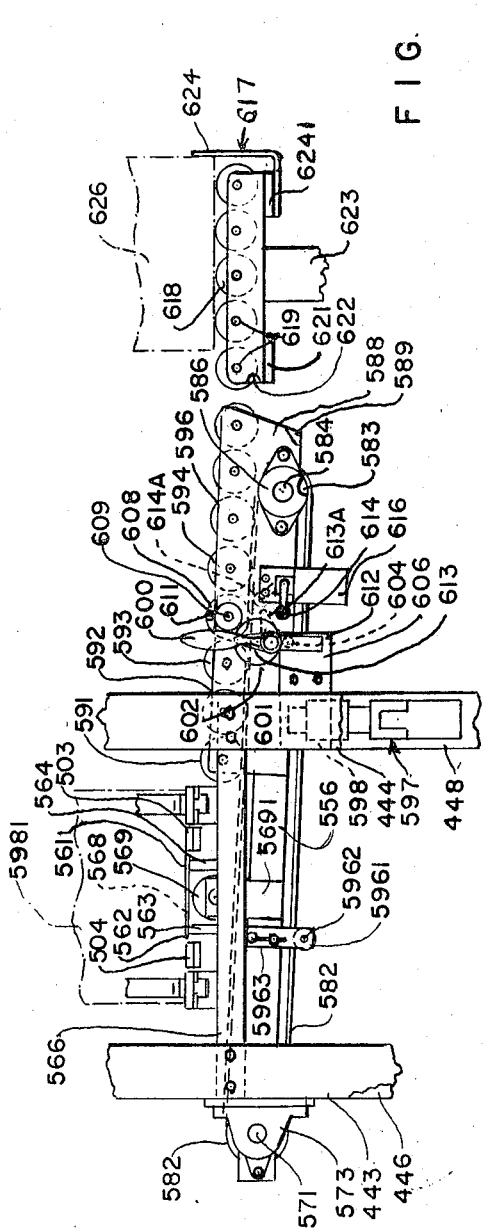
FIG. 37
FIG. 46

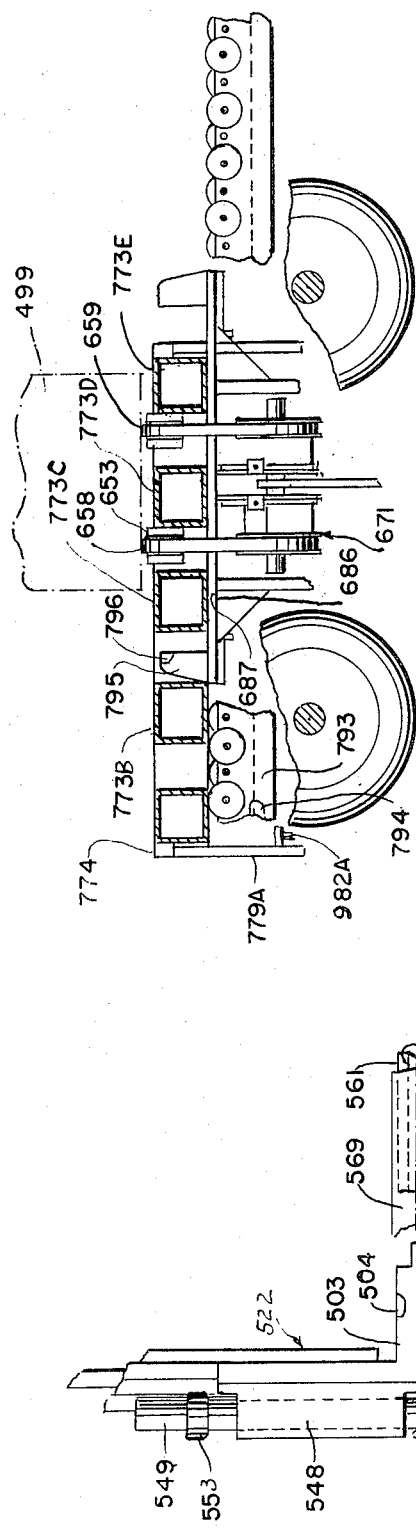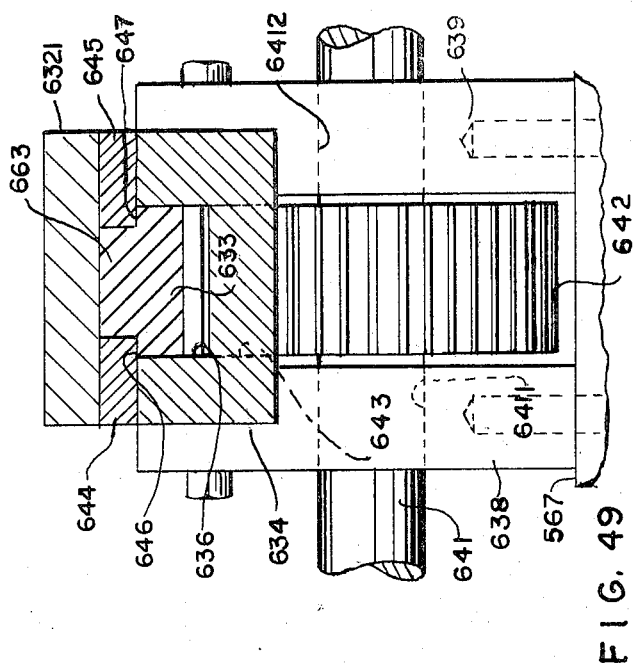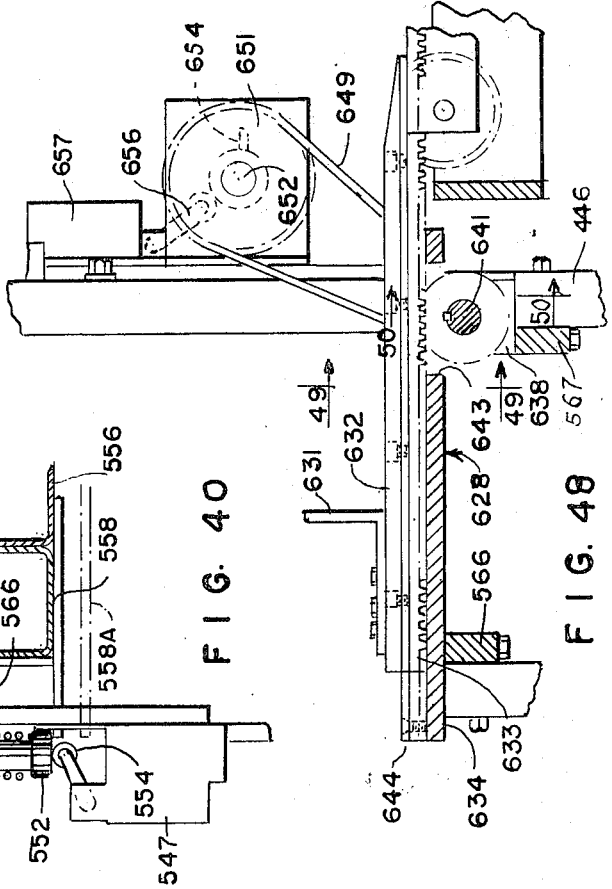

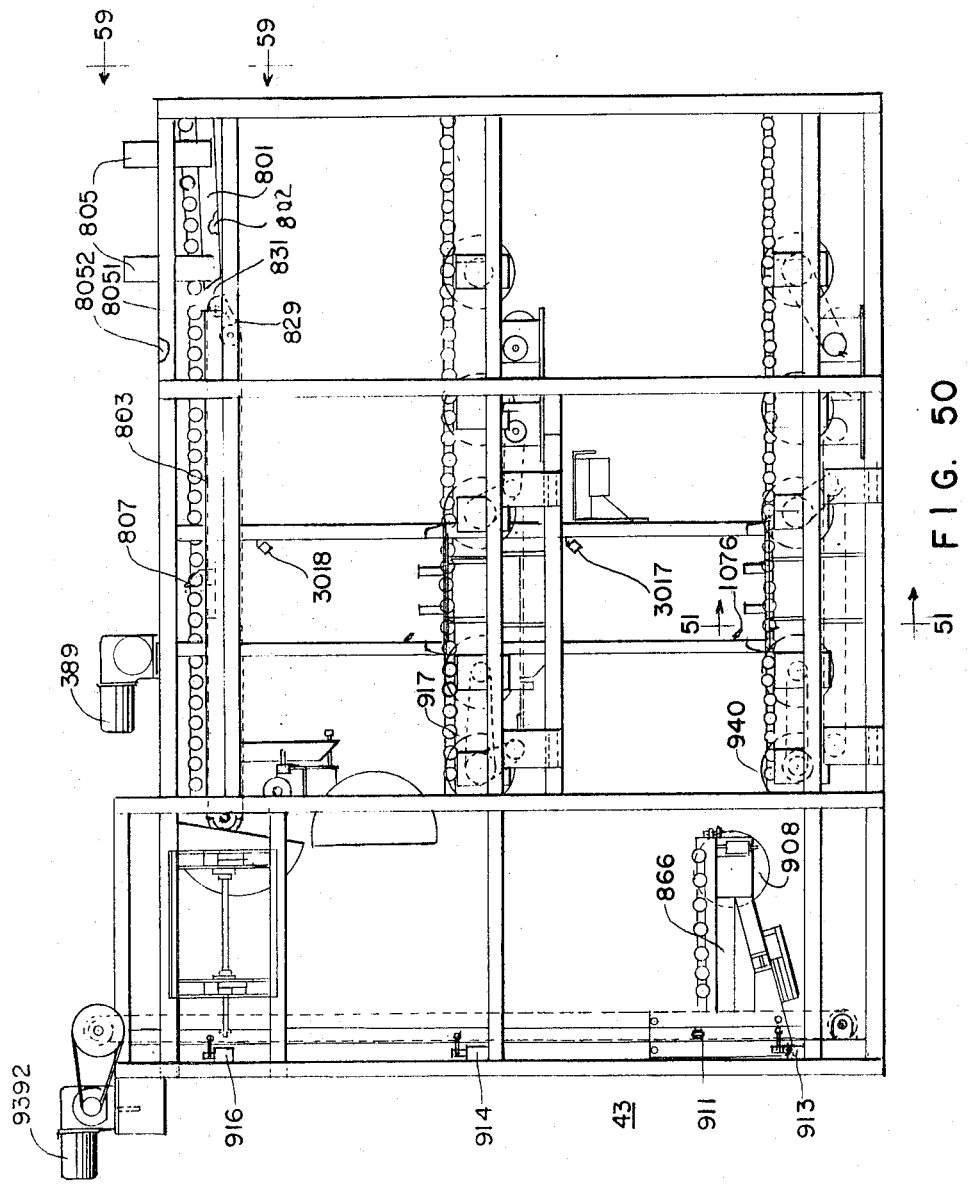

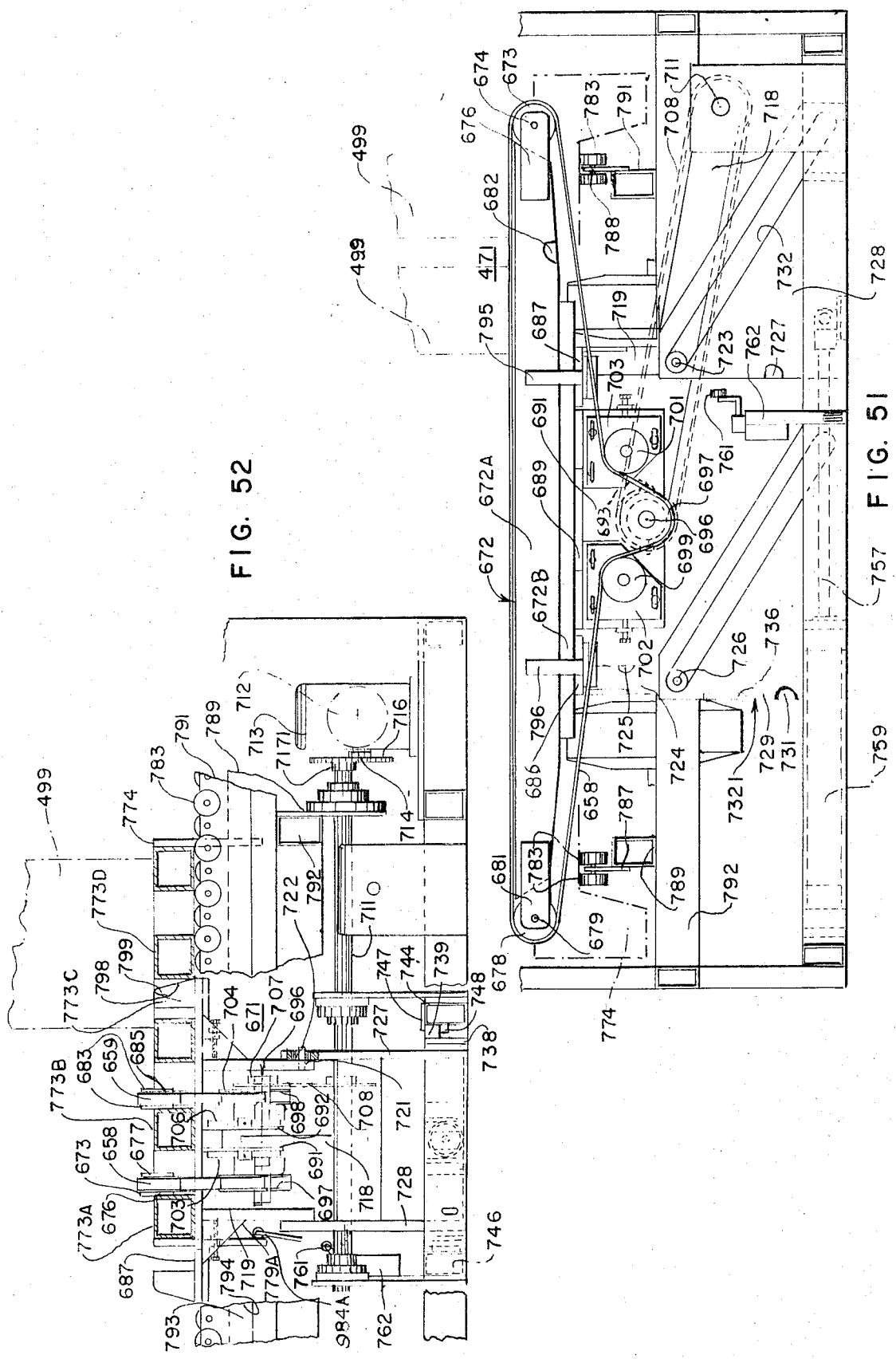

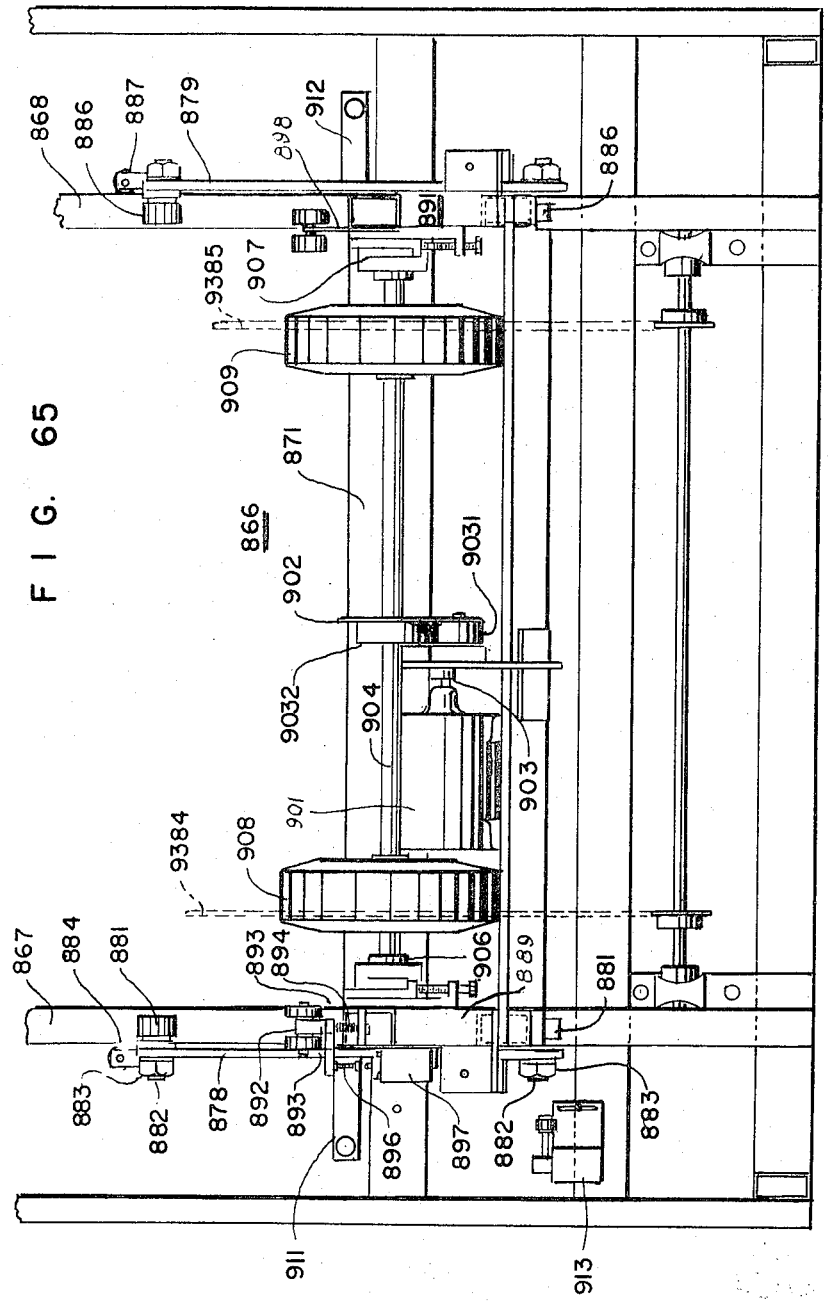

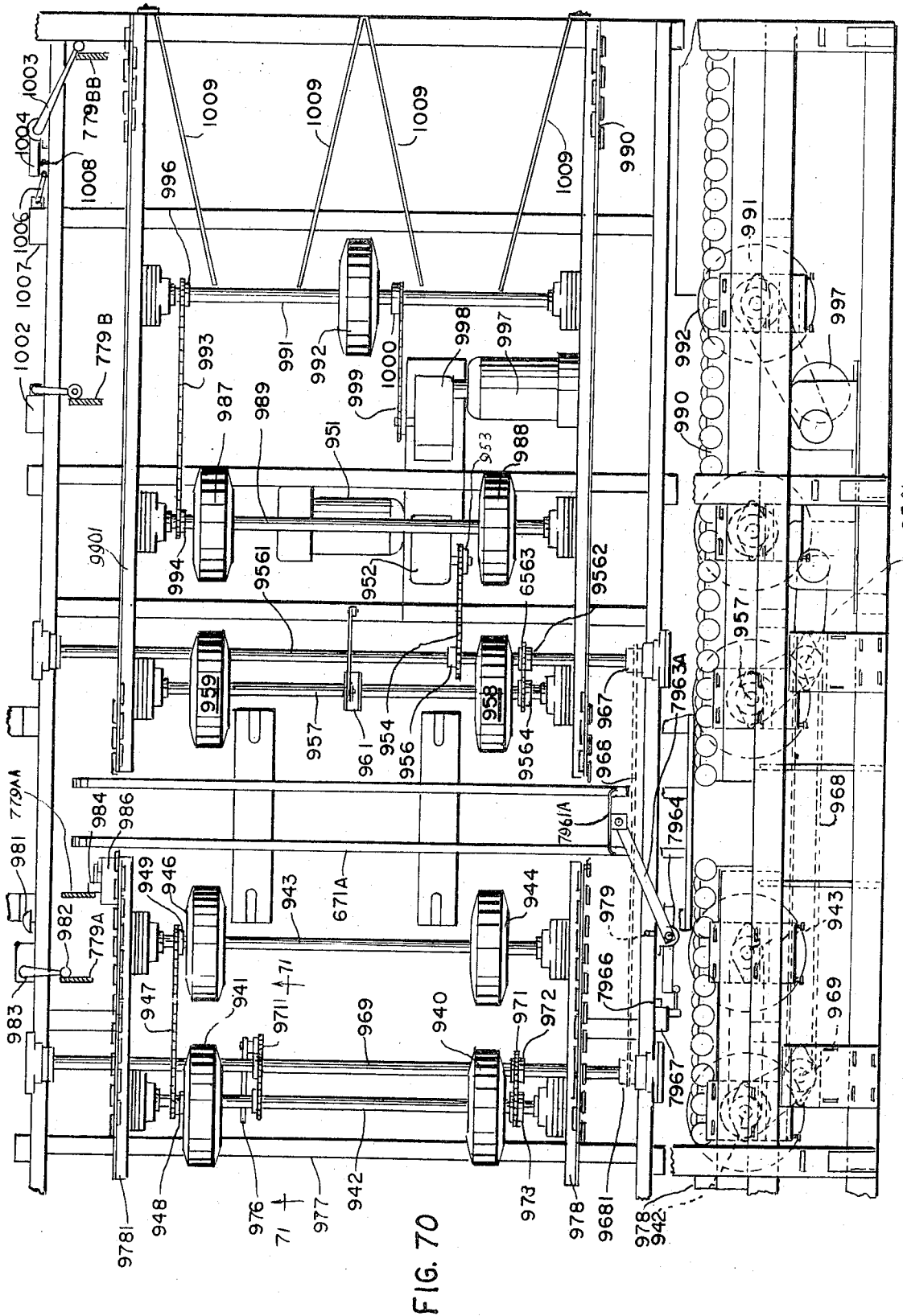

MACHINE FOR COOLING AND STACKING FLAT PRINTED ARTICLES

This invention relates to a machine for cooling carton blanks as the carton blanks are delivered by a printing press and for stacking the cooled carton blanks on skids. More particularly, this invention relates to a machine which receives carton blanks from a printing press, arranges the carton blanks in spaced relation while cooling air is blown between the carton blanks to cool them and then arranges the carton blanks in stacks on the skids ready for storing or further processing.

An object of this invention is to provide a machine of this type in which carton blanks are received face up and travel shingle fashion to a brush conveyor which spaces the carton blanks as the carton blanks are cooled and then delivers the carton blanks face down to a conveyor for delivery to stacking mechanism.

A further object of this invention is to provide such a machine in which a plurality of adjacent rows of carton blanks are divided into separate rows which are directed to individual brush conveyors for each of the rows.

A further object of this invention is to provide such a machine in which the carton blanks on each row are arranged in stacks and the stacks of each row are advanced onto a skid at a stack receiving station.

A further object of this invention is to provide such a machine in which stack receiving stations are vertically spaced, skids are delivered to the levels of the vertically spaced stack receiving stations by an elevator and in which the skids are delivered to the elevator by horizontally moving drag mechanism.

A further object of this invention is to provide such a machine in which the elevator delivers the skids to the levels, and the skids are automatically advanced along the levels to positions at which the stacks can be advanced onto the skids.

The above and other objects and features of the invention will be apparent to those skilled in the art to which this invention pertains from the following detailed description and the drawings, in which:

FIG. 5 is an enlarged fragmentary plan view of a guide table of the entry table section, carton blanks being shown in association therewith, fragmentary portions of the printing press and one roller of the machine being shown in association therewith;

FIG. 6 is an enlarged view in section taken on the line 6—6 in FIG. 3;

FIG. 7 is an enlarged view in section taken on the line 7—7 in FIG. 3;

FIG. 8 is an enlarged view in side elevation showing a diverter operating mechanism forming a part of the entry table section of the machine;

FIG. 18 is a fragmentary bottom plan view of the belt conveyor assembly and of a bracket supported thereby, a roller support being removed for clarity;

FIG. 22 is a view in side elevation of a conveyor section of the machine;

FIG. 23 is a fragmentary view in end elevation of the conveyor section of the machine showing driving chains thereof, other details of structure being omitted for clarity;

FIG. 24 is a fragmentary view in side elevation showing a drive chain structure of the conveyor section of the machine;

FIG. 25 is a view in section taken on the line 25—25 in FIG. 24;

FIG. 34 is a view in side elevation of a tongue supporting assembly of the hopper section with a tongue thereof in extended position, associated parts of frames and guides therefore being shown in association therewith;

FIG. 35 is a view in end elevation of the tongue supporting assembly and associated frames and guides;

FIG. 37 is a view in side elevation of a stack height metering device which is a part of the hopper section, a portion of a stack of carton blanks on the tongue being shown in association therewith;

FIG. 38 is a view in end elevation of a fork structure which forms a part of the hopper section, the fork structure being shown in raised position;

FIG. 40 is a fragmentary view partly in end elevation and partly in section showing a fragmentary portion of the fork structure in association with a limit switch and switch operating members associated therewith;

FIG. 41 is a view partly in end elevation and partly in upright section showing a fragmentary portion of a frame of the fork structure in association with a limit switch and switch operating members associated therewith;

FIG. 42 is a fragmentary view in side elevation of the limit switch and of the frame shown in FIG. 41;

FIG. 43 is a view in section taken generally on the line 43—43 in FIG. 41;

FIG. 46 is a view in side elevation of the reject conveyor in lowered position, a stack receiving storage roller assembly being shown in association therewith;

FIG. 48 is a fragmentary view partly in end elevation and partly in section showing details of construction of a stack pusher apparatus forming a part of the hopper section of the machine;

FIG. 49 is a view in section taken on the line 49-49 in FIG. 48;

FIG. 50 is a view in side elevation of a stacking section of the machine;

FIG. 51 is an enlarged view in transverse section taken generally on the line 51—51 in FIG. 50 showing a transfer conveyor assembly of the machine, a skid being shown in dot-dash lines in association therewith, the assembly being shown in raised position;

FIG. 52 is a view partly in side elevation and partly in section of the transfer belt assembly shown in FIG. 51, a skid being shown in association therewith in a second stack receiving position;

FIG. 53 is a view partly in side elevation and partly in section showing the transfer belt assembly and the skid shown in FIG. 52 but with the skid in a first stack receiving position;

FIG. 65 is a view in section taken on the line 65—65 in FIG. 64;

FIG. 66 is a view in section taken on the line 66—66 in FIG. 64;

FIG. 69 is an enlarged view in side elevation of a lower portion of a second stacking section of the machine;

FIG. 70 is a view in horizontal section showing the portion of the second stacking section illustrated in FIG. 69;

In the following detailed description and the drawings, like reference characters indicate like parts.

Figure 1:
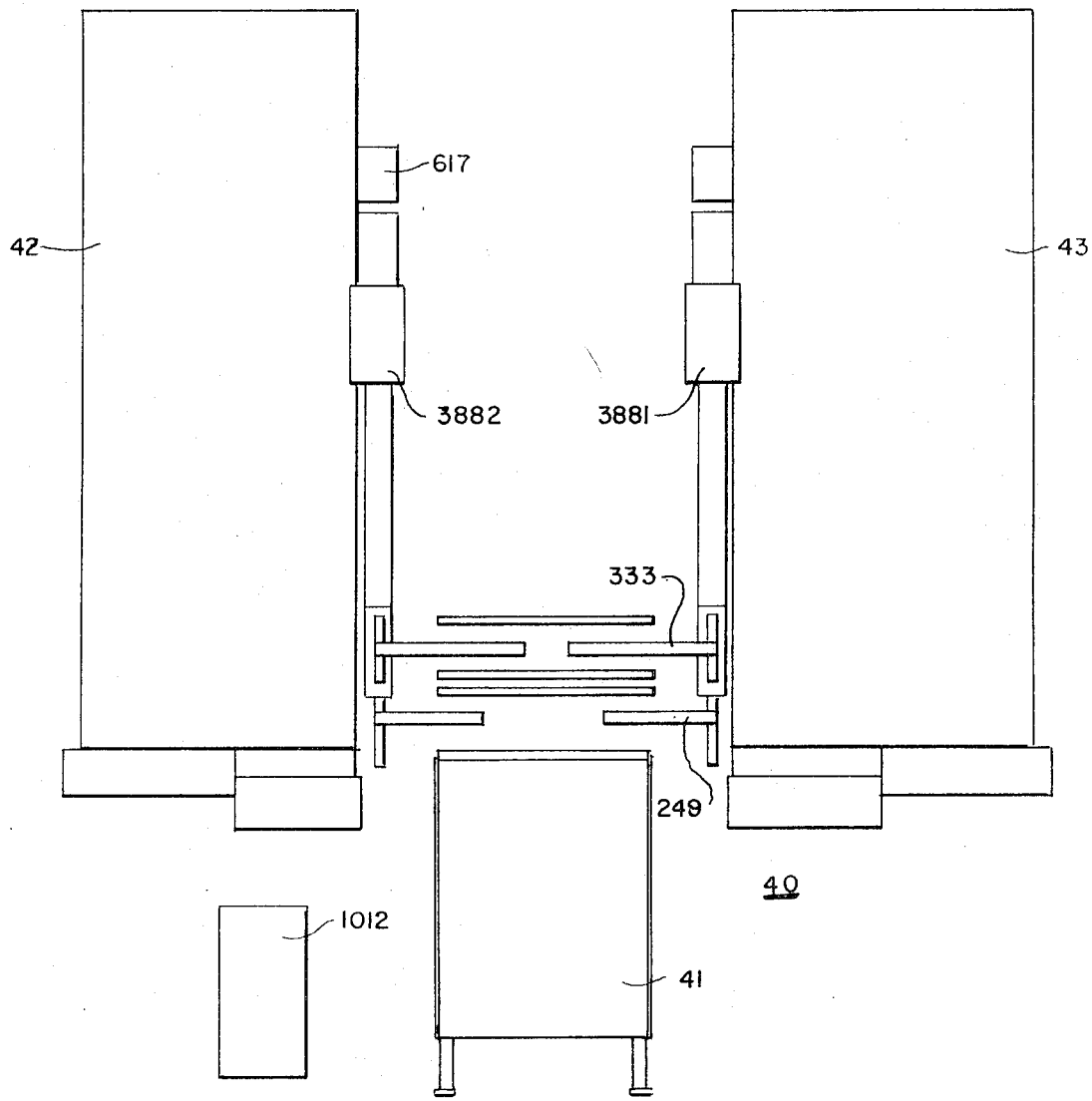
FIG. 1 is a schematic plan view of a carton stacking machine constructed in accordance with an embodiment of this invention.

In FIG. 1 is shown schematically a machine 40 for separating, cooling, and stacking carton blanks which is constructed in accordance with an embodiment of this invention. The machine includes an entry table section 41, a first stacking section 42, and a second stacking section 43.

ENTRY TABLE

Figure 2:
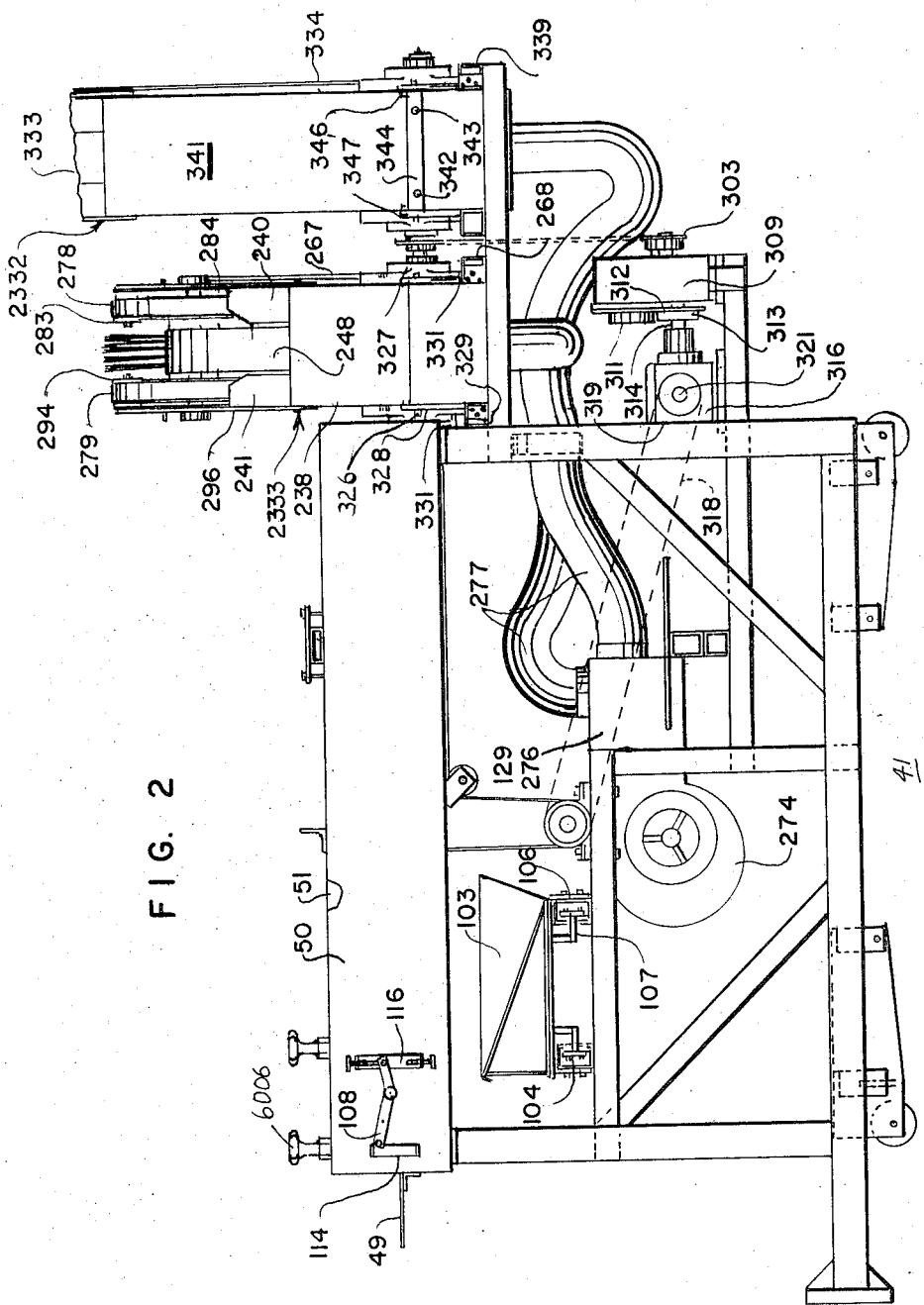
FIG. 2 is a view in side elevation of an entry table section of the machine.
Figure 3:
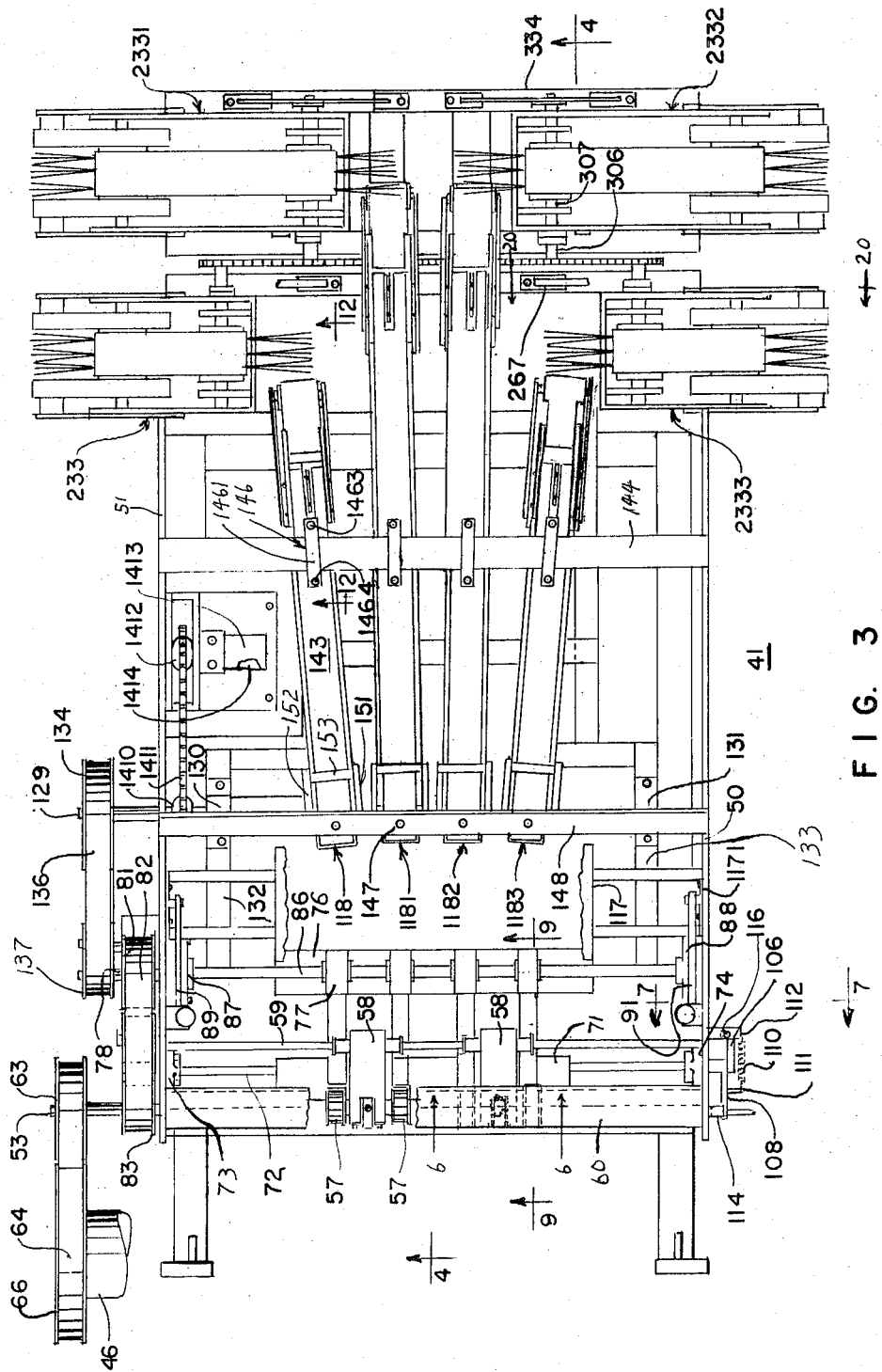
FIG. 3 is a plan view of the entry table section of the machine.
Figure 4:
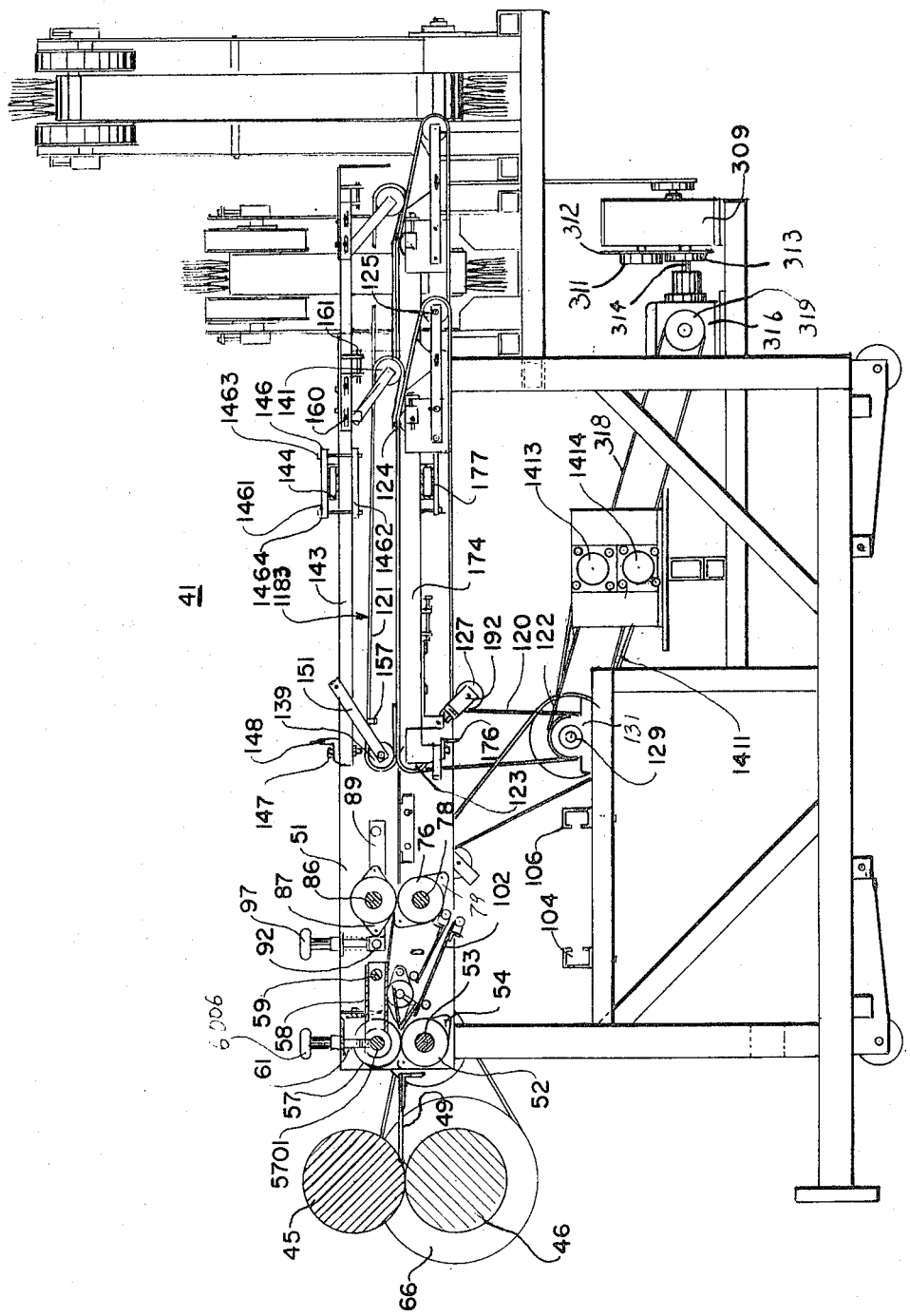
FIG. 4 is a view in section of the entry table section of the machine taken generally on the line 4—4 in FIG. 3, fragmentary portion of press rolls of a printing press being shown in association therewith, parts being broken away for clarity.
Figure 9:
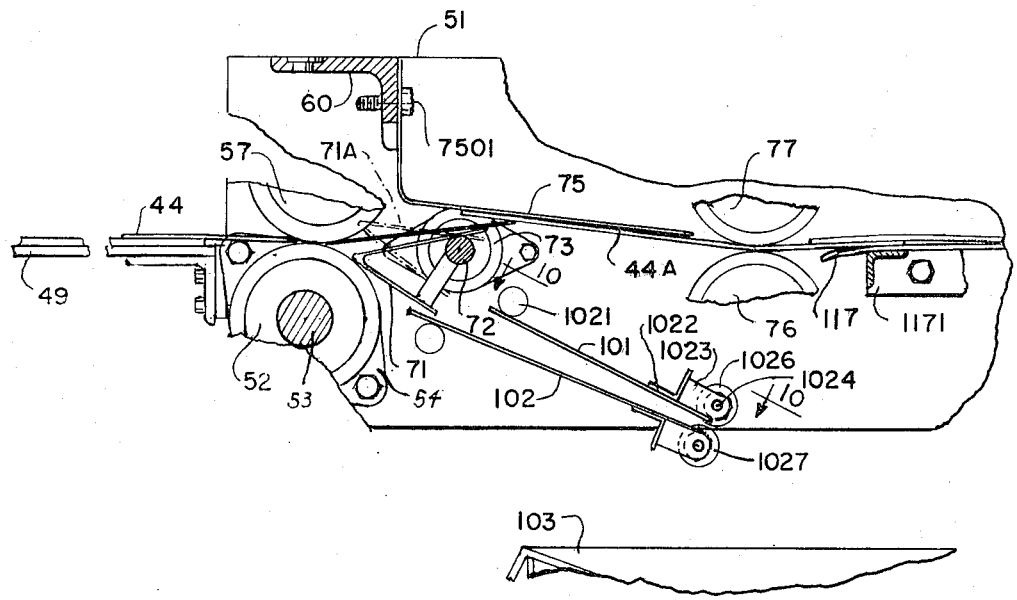
FIG. 9 is an enlarged fragmentary sectional view taken on the line 9—9 in FIG. 3.

General details of construction of the entry table section 41 are shown in FIGS. 2, 3 and 4. The entry table section can be mounted adjacent a printing press which prints, separates and scores carton blanks 44 (FIG. 5). Only a part of the printing press is shown. Exit rolls 45 and 46 (FIG. 4) of the printing press deliver carton blanks 44 onto a substantially horizontal plate 49 which is mounted on frame plates 50 and 51 (FIG. 2) and which directs the carton blanks 44 over a lower driven entry roll 52 (FIG. 4) mounted on a shaft 53 rotatably mounted in bearings 54 (one of which is shown in FIG. 9) carried by the frame plates 51 and 50 of the entry table section. Idle entry rolls 57 (FIG. 4) overlie the driven entry roll 52 and are rotatably mounted on shafts 5701 (FIGS. 4 and 6), each of which is carried by a frame 58, and hold the carton blanks against the lower roll 52. The frames 58 are rotatably mounted on a cross rod 59 (FIGS. 3 and 4) which spans the side plates 50 and 51. A free end of each of the frames 58 is supported from an angle-shaped cross frame bar 60, as shown in FIG. 6. Only one of the frames 58 and associated members will be described in detail, as the other frame 58 is similar in construction. A stud 6001 is mounted in a bracket 6002 rotatably mounted on the shaft 5701. A set screw 6003 mounted in the bracket 6002 holds the stud 6001 in place. The stud extends upwardly through an opening 6004 in the frame bar 60. A handle nut 6006 threaded on the stud 6001 and provided with a shoulder 6007 supported on the frame bar 60, can be turned for raising and lowering the free end of the swinging frame 38. A compression spring 61 urges the free end of the frame 58 downwardly (counterclockwise as shown in FIG. 4) to cause the rolls 57 to grip the carton blanks 44 as shown in FIGS. 9 and 6, as the carton blanks enter between the driven roll 52 and the idle rolls 57. The spring 61 is mounted on the stud 6001 and engages the frame bar 60. The shaft 5701 is attached to the frame 58 by fasteners 6009 (FIG. 6) which extend through openings 6011 in plate members 6012 that are a part of the frame 58. The fasteners 6009 are received in threaded sockets 6013 (only one of which is shown) in the shaft 5701.

The shaft 53 of the driven roll 52 carries a pulley 63 (FIG. 3) on which a belt 64 runs. The belt 64 also runs on a pulley 66 (FIG. 4) carried by the press roll 46 so that the driven roll 52 is driven in timed relation to the delivery of carbon blanks by the printing press. The peripheral speed of the driven roll 52 is approximately 110 percent of the speed at which the press rolls 45 and 46 deliver the carton blanks so that each carton blank is separated from the succeeding carton blank as it crosses the plate 49 as shown in FIG. 5. The press can deliver a plurality of rows 67 of the carton blanks 44, four rows of carton blanks being shown in FIG. 5. In the carton blanks shown in FIG. 5, cut edges are shown in full lines and score lines or lines of weakening are shown in dashed lines.

From the entry rolls 52 and 57, the carton blanks of each row pass to and over a pick-off fitting 71 (FIG. 9), which is of generally angle shape and which is mounted on a cross shaft 72 rotatably mounted in bearings 73 and 74 (FIG. 3) carried by the side plates 51 and 50, respectively. In the normal position of the pick-off fitting 71, as shown in full lines in FIG. 9, each carton blank is directed upward by the pick-off fitting 71 in the manner that the carton blank 44 is shown. An angle-shaped guide plate 75, which is attached to the cross frame 60 by a fastener 7501 threaded in the cross frame 60, limits upward movement of the carton blanks. From the pick-off fitting 71, the carton blank passes over a driven intermediate roll 76 and under one of a set of idle intermediate rolls 77. The driven intermediate roll 76 is carried by a shaft 78 rotatably mounted in bearings 79, one of which is shown in FIG. 4, and which are mounted on the side plates 50 and 51. The shaft 78 carries a pulley 81 (FIG. 3) on which a belt 82 runs. The belt 82 also runs on a pulley 83 carried by the shaft 53 which carries the driven entry roll. The pulley 81 is sufficiently larger than the pulley 83 that the peripheral speed of the driven intermediate roll 76 is approximately 62 percent of the speed at which the press rolls 45 and 46 deliver the carton blanks so that each carton blank is caused to slow down or decrease in speed as it goes between the intermediate rolls 76 and 77, and the leading edge of each succeeding carton blank 44 enters underneath the trailing edge of the preceding carton blank 44A (FIG. 9) so that, as the carton blanks leave the intermediate rolls 76 and 77, the trailing edge of each carton blank overlies the leading edge of the succeeding carton blank shingle fashion. The idle intermediate rolls are rotatably mounted on a cross shaft 86 (FIGS. 3 and 4), ends of which are carried by bearings 87 and 88 (FIG. 3). The bearings 87 and 88 are mounted on swinging bearing frames 89 and 91, respectively, which in turn are pivotally mounted on the frame plates 51 and 50, respectively. Free ends of the frames 89 and 91 are supported in the manner that the frame 91 is shown in FIG. 7. A lug 92 is pivotally mounted on the swinging bearing frames 91. A stud 93 mounted in the lug 92 is received in a bearing opening 9301 in the lug 92. A stud 9302 is mounted in a socket 9303 in the lug 92 and held there by a set screw 9304. The stud 9302 extends upwardly through an opening 94 in a flange plate 95 which is mounted on the frame plate 50. An interiorly threaded nut fitting 97 is threaded on the stud 9302 and bears on the flange plate 95 to limit downward movement of the free end portion of the swinging bearing frame 92. A compression spring 98 mounted on the stud 93 and bearing on the flange plate 95 urges the free end portion of the swinging bearing frame 91 downwardly to hold the idle intermediate rolls 77 in position for gripping the carton blanks against the driven intermediate roll 76 (FIG. 4).

Figure 10:
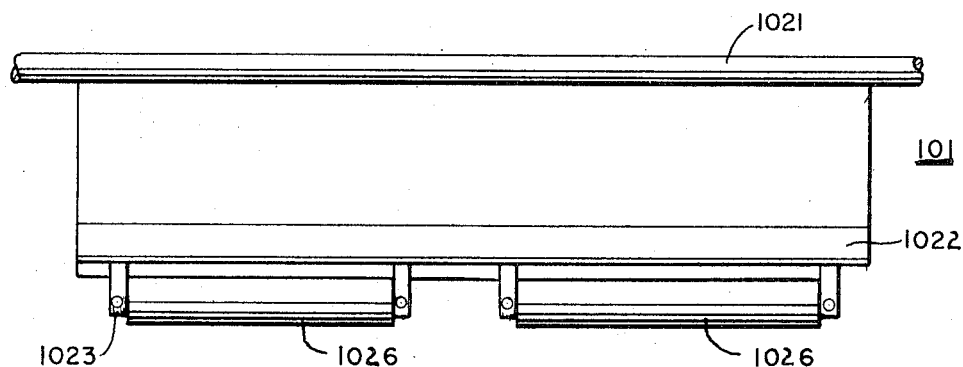
FIG. 10 is a view of a portion of the diverter mechanism of the entry table section taken in the direction of the arrows 10—10 in FIG. 9.

The pick-off fitting 71 can be swung from the normal full-line position of FIG. 9 to a dot-dash line blank-diverting position 71A if carton blanks are to be discharged, whereupon the carton blanks are diverted between diverter guide plates 101 and 102 into a scrap bin 103 (FIG. 2). The guide plates 101 and 102 are similar in construction and only the guide plate 101 will be described in detail. As shown in FIGS. 9 and 10, the guide plate 101 is carried by a cross rod 1021, which is rotatably supported on the side plates 50 and 51. An angle bracket 1022 mounted on the plate 101 supports flange plates 1023 which carry rods 1024 (FIG. 9) on which rolls 1026 are rotatably mounted. The carton blanks are discharged between the rolls 1026 and similar rolls 1027 mounted on the guide plate 102. The scrap bin 103 is mounted on rails 104 and 106 (FIG. 4) and is provided with a wheeled carriage 107 (FIG. 2) so that the scrap bin 103 can be rolled to one side to permit ready emptying. A crank arm 108 (FIGS. 2, 3 and 8) rotatably mounted on the shaft 72 can be swung from the position shown in full lines in FIG. 8 to a position shown in dot-dash lines at 108A to cause a crank 109 mounted on the shaft 72 to swing from the full line position of FIG. 8 to a diverter position 109A shown in dot-dash lines to swing the pick-off fitting 71 between the normal position and the diverting position. A tension spring 110, which links a lug 111 mounted on the crank 108 with a lug 112 mounted on the crank 109 urges the pick-off fitting to normal and diverting positions. Channel-shaped stop members 114 and 116 mounted on the frame plate 50 limit swinging of the cranks 108 and 113 so that the pick-off fitting 71 does not swing beyond the positions shown in FIG. 9. A set screw 115 mounted in the hub of the crank 109 engages the shaft 72 to cause the shaft 72 and the crank 109 to turn together. Screws 1151 and 1152 mounted in flanges 1153 and 1154, respectively, of the stop member 116 limit swinging of the crank 109 and can be adjusted to provide proper swinging thereof.

From the intermediate rolls 76 an 77, the carton blanks pass shingle fashion over a table 117 to belt sets 118, 1181, 1182, and 1183 (FIG. 3). The table 117 is mounted on a frame 1171 which is bolted to the side plates 50 and 51. These belt sets diverge as they extend to the right as shown in FIG. 3 so that rows of carton blanks carried by these belt sets are moved from the FIG. 5 relationship in which the rows are adjacent each other to substantially spaced condition as the rows of carton blanks proceed along the machine to the right as shown in FIGS. 3 and 4. Details of construction of the belt set 118 are shown in FIGS. 3 and 12–18, and only the belt set 118 will be described in detail as the other belt sets are similar in construction. However, for convenience, in FIG. 4, corresponding parts of the belt set 1183 are given similar reference characters. The belt set 1181 includes a lower driven belt 120 and an upper idle belt 121. The driven belt 120 runs on a driven roller 122 and on idle rolls 123, 124, 125, and 127. The driven roll 122 is mounted on a shaft 129 rotatably supported in bearings 130 and 131 (FIG. 3), which are mounted on frame elements 132 and 133. The shaft 129 carries a pulley 134 (FIG. 3) on which a belt 136 runs. The belt 136 also runs on a pulley 137 carried by the shaft 78 so that the shafts 78 and 129 are driven in timed relation. However, the shaft 129 is driven at such a speed that the rate of advance of the lower driven belt 120 is approximately 25 percent of the speed at which carton blanks are delivered by the printing press so that the rate of advance of the carton blanks slows as the carton blanks are received between the driven belt 120 and the idle belt 121. The idle upper belt 121 runs on rolls 139 and 141. Courses of the belts 120 and 121 are aligned so that the carton blanks are received between the lower course of the upper belt 121 and the upper course of the lower belt 120. A sprocket 1410 (FIG. 3) is carried by the shaft 129. The shaft 129 drives a chain 1411 which runs on sprockets 1412 (only one of which is shown) mounted on master orbit motor pump units 1413 and 1414 (FIG. 4) which are driven in timed relation to the shaft 129. The motor pump units drive conveyor units to be described in detail hereinafter.

The upper belt rolls 139 and 141 are supported from a lengthwise frame 143 carried by a cross frame 144, which is mounted on the side plates 50 and 51. A bracket 146 attaches the lengthwise frame 143 to the cross frame 144. The bracket 146 (FIG. 12) includes a top plate 1461 which overlies the cross frame 144, a lower plate 1462 which underlies the lengthwise frame 143 and bolts 1463 and 1464 which span the plates 1461 and 1462. The left hand end of the lengthwise frame 143 is supported by a bolt 147 (FIG. 3) which extends through a flange of an angle-shaped cross frame 148 mounted on the side plates 50 and 51.

Figure 11:
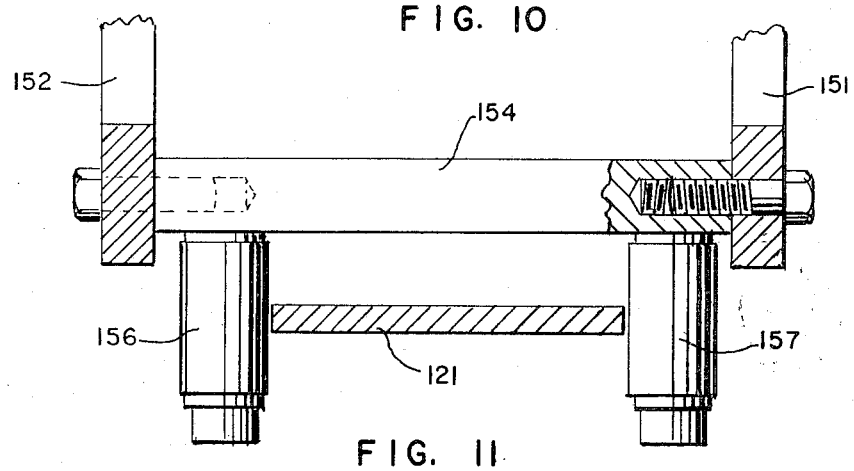
FIG. 11 is a view in upright section of a belt guiding assembly forming a portion of the entry table.
Figure 12:
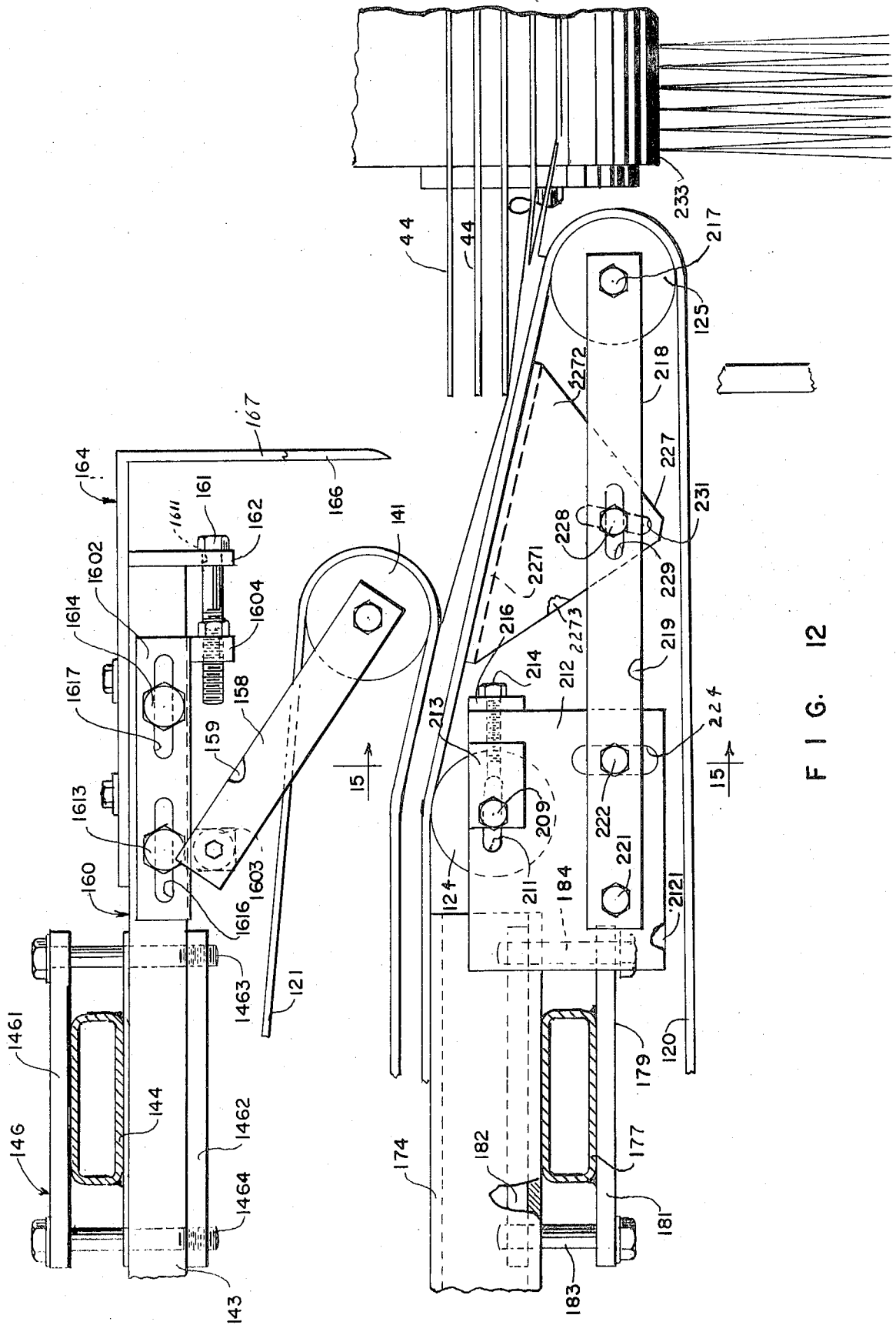
FIG. 12 is a fragmentary enlarged view in upright section showing a portion of one belt conveyor assembly of the entry table taken generally on the line 12—12 in FIG. 3.
Figure 13:
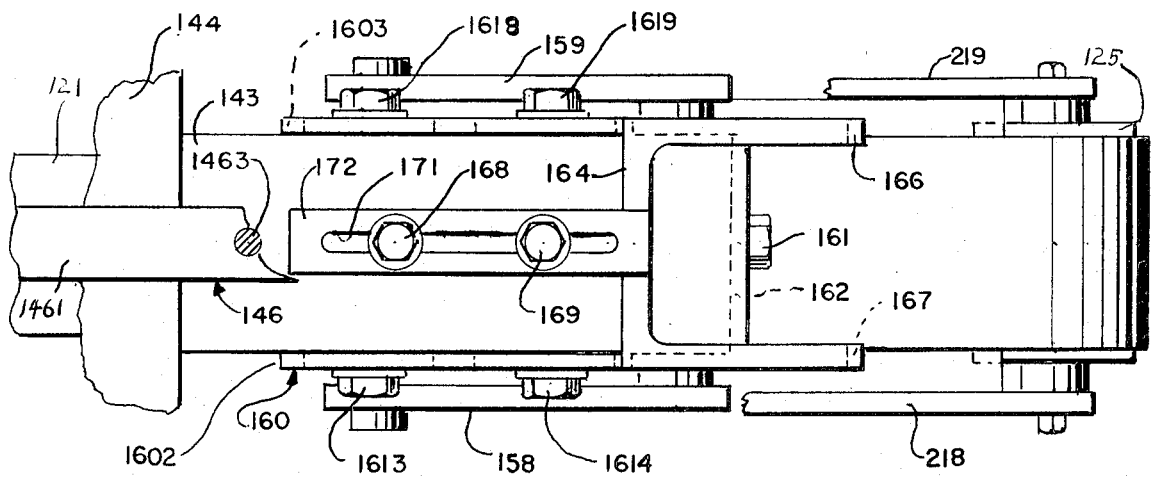
FIG. 13 is a fragmentary plan view, partly broken away and in section of the portion of the belt conveyor shown in FIG. 12.
Figure 14:
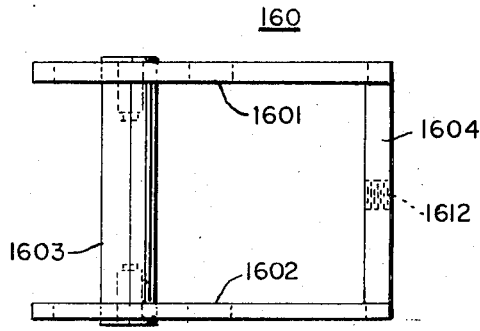
FIG. 14 is a plan view of a roller pivot supporting member forming a part of the belt conveyor assembly of FIG. 12.

The roll 139 (FIG. 4) is rotatably mounted between swinging frames 151 and 152 (FIG. 11). The frames 151 and 152 are pivotally mounted on a cross frame 153 (FIG. 3) which is attached to the lengthwise frame 143. A cross brace 154 (FIG. 11) links the swinging frames 151 and 152 and supports belt guiding rollers 156 and 157. The roll 141 (FIG. 12) is rotatably mounted between swinging frames 158 and 159 (FIGS. 12 and 13). The frames 158 and 159 are pivotally mounted on an auxiliary frame 160 which is slidable lengthwise of the lengthwise frame 143. As shown in FIG. 14, the auxiliary frame 160 includes side arms 1601 and 1602 and cross bars 1603 and 1604. An adjustment screw 161 which extends through an opening 1611 (FIG. 12) in a lug 162 that forms a part of the lengthwise frame 143 is threaded in an opening 1612 (FIG. 14) in the cross bar 1604 on the sliding frame 160 for adjusting the position of the sliding frame 160. Screw fasteners 1613 and 1614 (FIG. 12) which are mounted in the lengthwise frame 143 and extend through slots 1616 and 1617 on the side arms 1602 and screw fasteners 1618 and 1619 (FIG. 13) which extend through similar slots in the side arm 1601 hold the sliding frame in adjusted position. A generally angle-shaped guide 164 (FIG. 12) is mounted on the lengthwise frame 143 with teeth 166 and 167 thereof extending downwardly beyond the roll 141. Screw fasteners 168 and 169 (FIG. 13) mounted in the lengthwise frame 143 and extending through a slot 171 in a tongue 172 of the guide 164 hold the guide in position on the lengthwise frame 143 with the guide 164 being adjustable lengthwise of the lengthwise frame 143.

Figure 17:
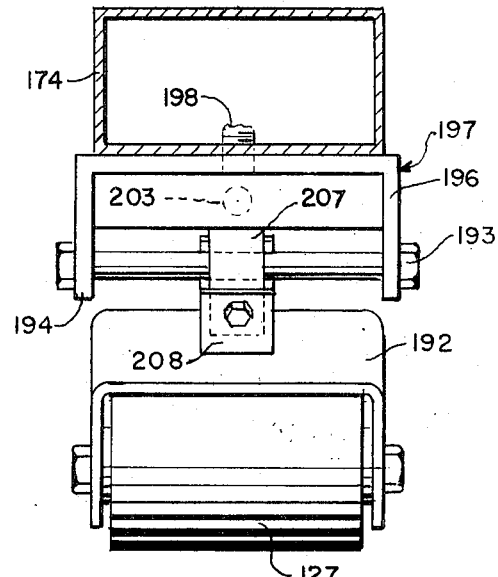
FIG. 17 is an enlarged fragmentary view partly in end elevation and partly in section of a part of the belt conveyor assembly.

The idle rolls 123, 124, and 125, on which the driven belt 120 travels, are supported from a lower lengthwise frame 174 (FIG. 4). The lower lengthwise frame 174 is supported on an angle-shaped cross frame 176 and a box-shaped cross frame 177, both of which span and are mounted on the side frames 50 and 51. A bolt 178 (FIG. 16) which extends through a flange of the angle-shaped cross frame 176 and through a cross bar portion 1771 of the lengthwise frame 174 connects the lengthwise frame 174 to the angle-shaped cross frame 176. A bracket 179 (FIG. 12) connects the lengthwise frame 174 to the box-shaped cross frame 177. The bracket 179 includes a lower bar 181 which underlies the box-shaped cross frame 177, an upper bar 182 which is received inside the lengthwise frame 174 and bolts 183 and 184 which link the bars 181 and 182. The idle roll 123 (FIG. 16) is rotatably mounted on a shaft 186 mounted on flanges 187 and 188 of the lengthwise frame 174. Guide rolls 189 and 191 rotatably mounted on the cross bar portion 1771 steady the driven belt 120. The idle roll 127 is rotatably mounted between flanges of a U-shaped bracket 192 (FIG. 4). The bracket 192 (FIG. 17) is supported from a cross rod 193 which spans lugs 194 and 196, which are part of a sliding frame 197. The sliding frame 197 is supported underneath the lengthwise frame 174 by screws 198 and 199 (FIG. 18) which extend through lengthwise slots 201 and 202 in the sliding frame 197 and are mounted in the lengthwise frame 174. An adjustment screw 203 threaded in a lug 204 mounted on the lengthwise frame 174 bears on a flange 206 of the sliding frame 197 to hold the sliding frame 197 in position. As shown in FIG. 17, the U-shaped bracket 192 is supported from a sliding block 207, which is pivotally and slidably mounted on the cross rod 193. A U-shaped clip bracket 208 is pivotally mounted on the sliding block 207. The U-shaped bracket 192 is pivotally mounted on the clip bracket 208. Thus, the roll 127 can swing and move back and forth with a universal movement to follow the belt 120 (FIG. 4).

Figure 15:
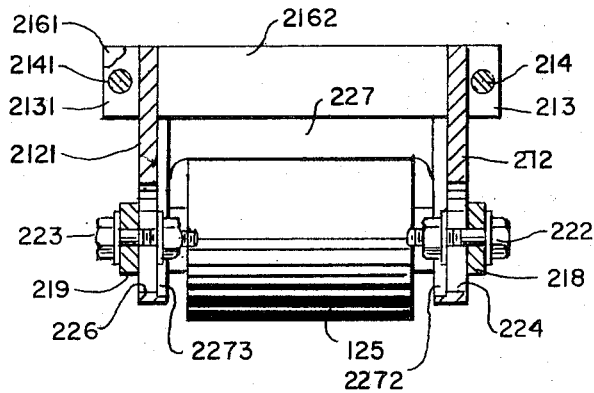
FIG. 15 is a view in section taken on the line 15—15 in FIG. 12.
Figure 16:
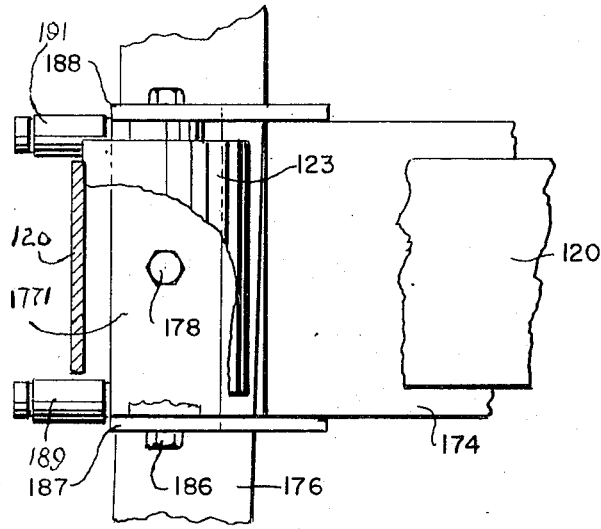
FIG. 16 is an enlarged fragmentary plan view partly broken away and in section of an end portion of the belt conveyor assembly.

The idle roll 124 is rotatably mounted on a shaft 209 (FIG. 12). The shaft 209 extends through slots 211 (only one of which is shown) in plates 212 and 2121 which are attached to the lengthwise frame 174. The shaft 209 also extends through openings (not shown) in bearing blocks 213 and 2131 (FIG. 15). Screw fasteners 214 and 2141 (FIG. 15) threaded in the blocks 213 and 2131, respectively, and bearing on flange end portions 216 (FIG. 12) and 2161 (FIG. 15) of a cross bar 2162 which spans the plates 212 and 2121 holds the blocks 213 and 2131 and the shaft 209 (FIG. 12) in adjusted position. The idle roll 125 is rotatably mounted on a shaft 217 which is carried by elongated bars 218 and 219. The bars 218 and 219 are pivotally mounted on the plates 212 and 2121, respectively, by screw fasteners 221 (one of which is shown in FIG. 12). Bolts 222 and 223 (FIG. 15) mounted in the bars 218 and 219, respectively, extend through slots 224 and 226 in the plates 212 and 2121, respectively, to hold the bars 218 and 219 and the roll 125 in adjusted position. A belt guiding table 227 is also mounted on the bars 218 and 219. The table 227 is of generally channel shape and includes an upper table web 2271 (FIG. 12) on which the upper course of the belt 120 runs and downwardly extending generally triangular flanges 2272 and 2273. Bolt fasteners 228 (one of which is shown in FIG. 12) extend through lengthwise slots 229 (only one of which is shown) in the bars 218 and 219 and through upright slots 231 (only one of which is shown) in the flanges 2272 and 2273 so that the position of the table web 2271 can be adjusted up and down, lengthwise, and angularly. The upper course of the belt 120 runs on the upper face of the lengthwise frame 174 and on the table 227. The carton blanks 44 are discharged from the belt 120 to the right as shown in FIG. 12 to a brush belt conveyor assembly 233.

BRUSH BELT CONVEYORS

Figure 19:
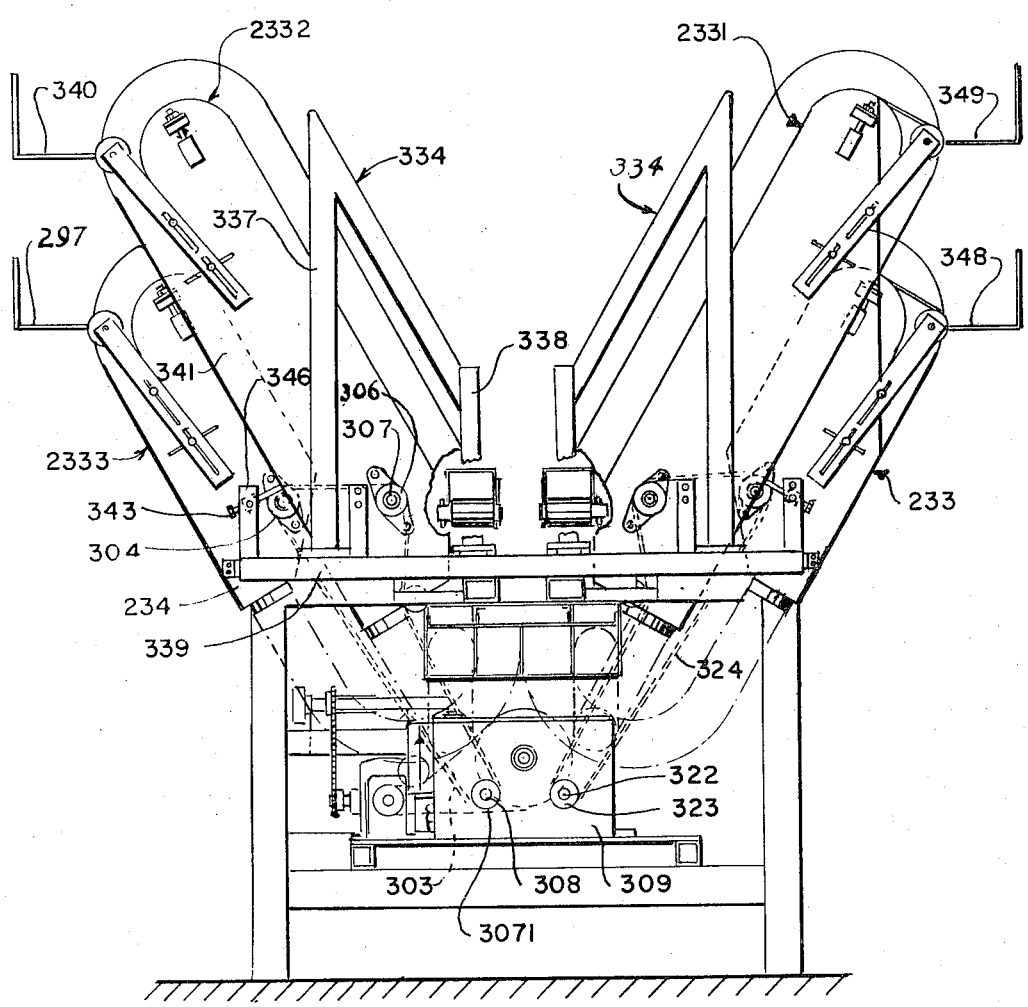
FIG. 19 is a view in end elevation of the entry table section of the machine, fragmentary portions of carton blank receiving bins being shown in association therewith.
Figure 20:
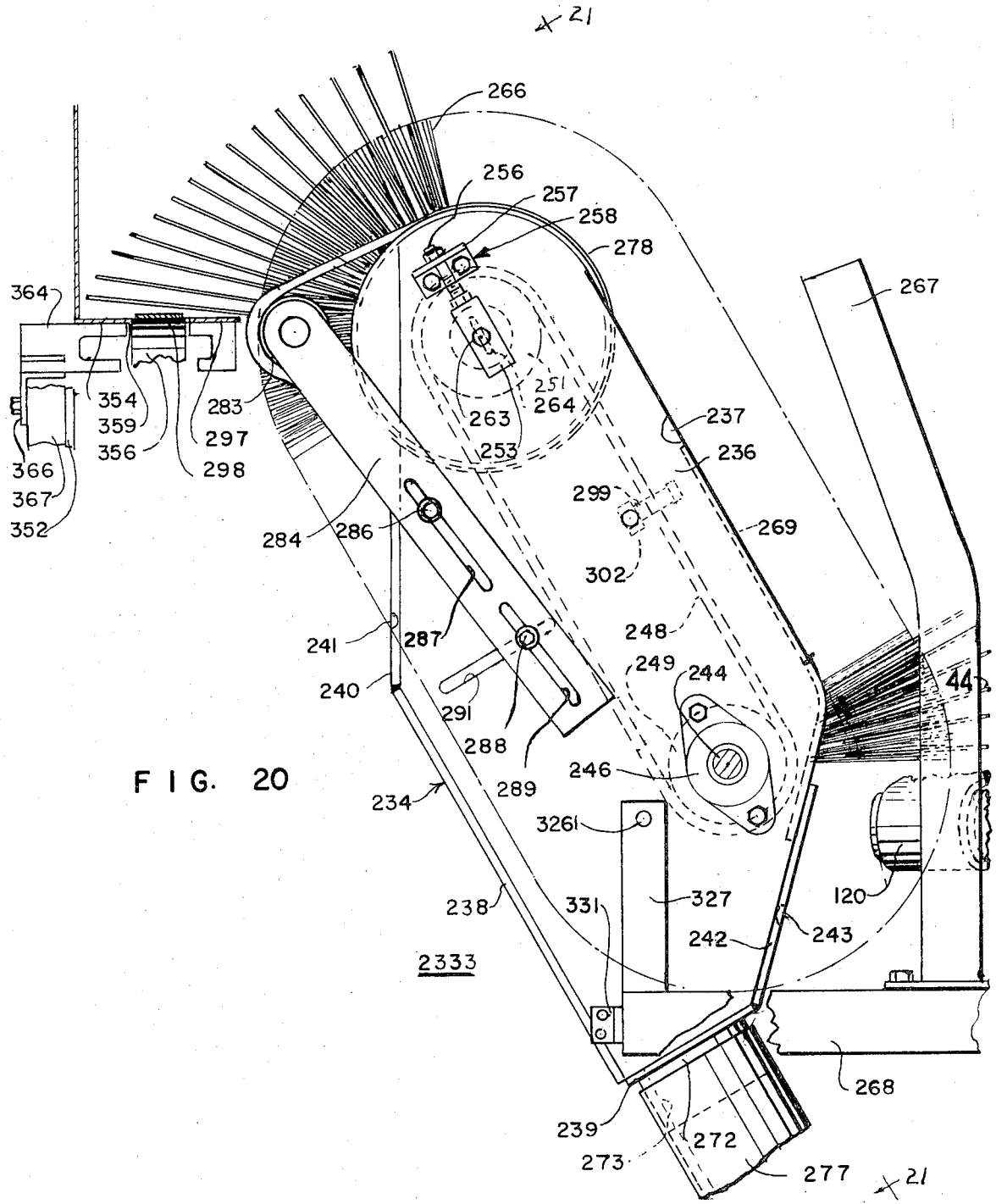
FIG. 20 is an enlarged view in section taken on the line 20—20 in FIG. 3.
Figure 21:
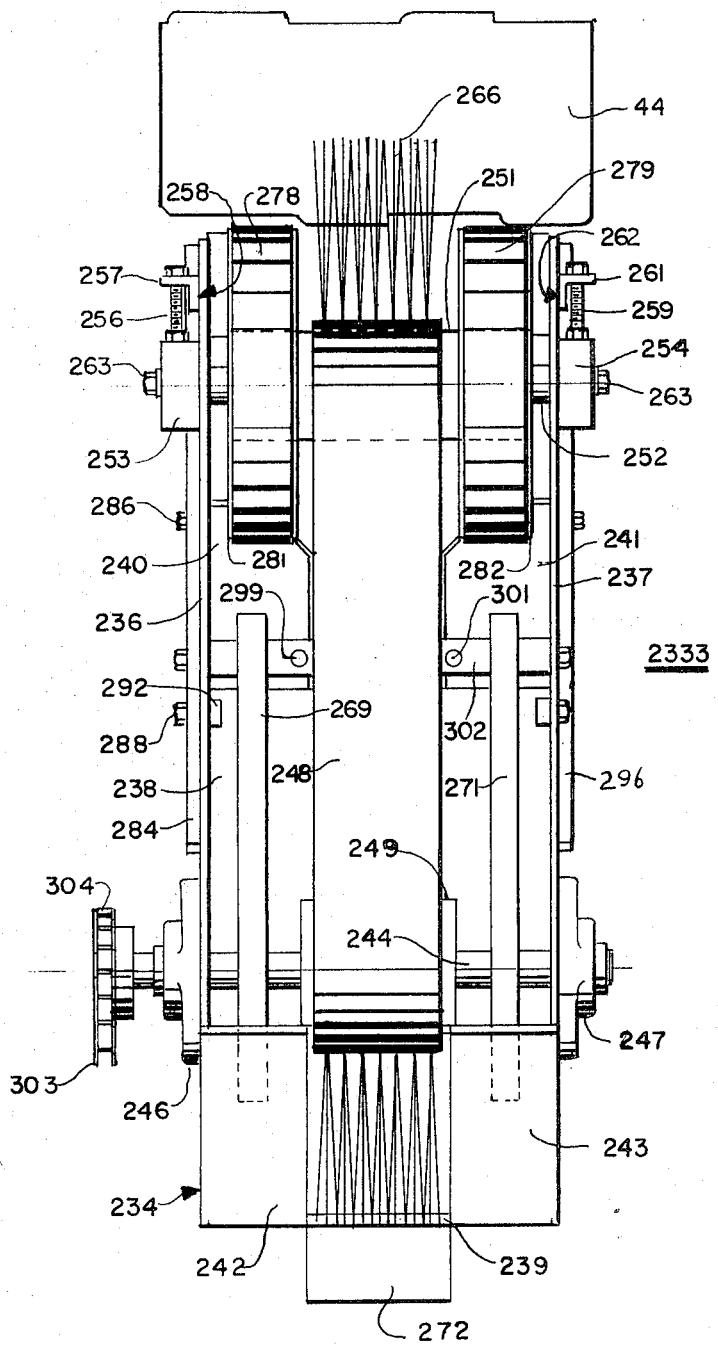
FIG. 21 is a view of a brush conveyor of the machine taken in the direction of the arrows 21—21 in FIG. 20.
Figure 26:
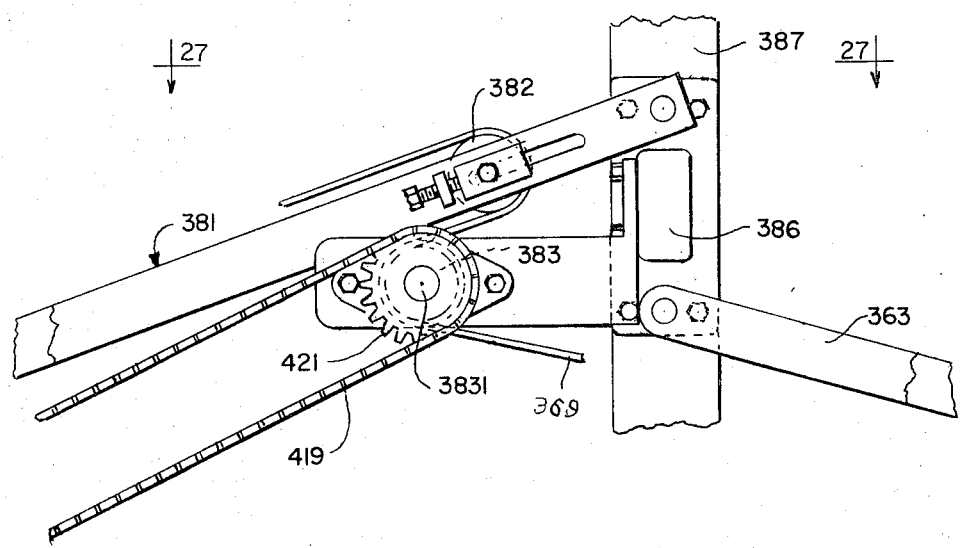
FIG. 26 is an enlarged fragmentary view in side elevation of a conveyor supporting structure.

As shown in FIGS. 3 and 19, there are four brush belt conveyor assemblies 233, 2331, 2332 and 2333. The brush belt conveyor assemblies are similar in structure except that the assemblies 2331 and 2332 provide longer travel than do the assemblies 233 and 2333. Only the assembly 2333 will be described in detail. Details of construction of the brush belt conveyor assembly 2333 are shown in FIGS. 20 and 21. The assembly 2333 includes a housing 234 which includes side plates 236 and 237, a cross plate 238 which spans the side plates 236 and 237, a base plate 239 which spans the side plates 236 and 237, spaced outer air guiding plates 240 and 241, and spaced inner air guiding plates 242 and 243. A drive shaft 244 is rotatably mounted in bearings 246 and 247 attached to the side plates 236 and 237, respectively. A conveyor belt 248 runs on a pulley 249 carried by the drive shaft 244 and on a roll 251 rotatably mounted on a second shaft 252. The shaft 252 is mounted between adjustment blocks 253 and 254. An adjustment bolt 256 extends through an opening in a flange 257 of an angle-shaped bracket 258 attached to the side plate 236 and is threaded in the adjustment block 253. A second adjustment bolt 259 extends through an opening in a flange 261 of an angle-shaped bracket 262 attached to the side plate 237 and is threaded in the adjustment block 254. Screw fasteners 263 carried by the blocks 253 and 254 are mounted in end portions of the shaft 252 and extend through slots 264 in the side plates 236 and 237, one of which is shown in FIG. 20. The tension in the conveyor belt 248 can be adjusted by tightening of the bolts 256 and 259.

The conveyor belt 248 carries rows of outwardly extending bristles 266, and the carton blanks are directed crosswise of the conveyor belt 248 to be lodged between the rows of bristles. The carton blanks are held in spaced relationship between the rows of bristles as the carton blanks are moved upwardly and to the left by the conveyor belt 248, as shown in FIG. 20. A stop bar 267 (FIGS. 3 and 20) in the path of the carton blanks as the carton blanks are discharged from the belt 120 (FIG. 20) is engaged by each carton blank to limit movement of the carton blanks crosswise of the conveyor belt 248. The stop bar 267 is mounted on a cross frame 268. Cantilever mounted spring guides 269 and 271 (FIG. 21) mounted on the inner air guiding plates 242 and 243, respectively, align the carton blanks and keep the carton blanks outside the housing 234 and in position held by outer portions of the bristles 266. A pipe member 272 mounted on the base plate 239 communicates with the interior of the housing 234 through an opening 273 (FIG. 20) in the base plate 239. Air is directed into the interior of the housing 234 and into the housings of the other brush belt conveyor assemblies by a blower 274 (FIG. 2), which directs air into a manifold 276 from which the air is directed through conduits 277, one of which is connected to the pipe 272, as shown in FIG. 20. The carton blanks are held in spaced relation by the bristles of the conveyor belt 248, and the air is discharged from the housing 234 around the carton blanks to cool the carton blanks and set the ink on the carton blanks.

As the carton blanks pass over the upper end of the housing 234, the carton blanks are discharged from the bristles of the conveyor belt 248 by discharge belts 278 and 279 (FIG. 21). The discharge belts 278 and 279 are mounted on pulleys 281 and 282, respectively, both of which are mounted on and turn with the roll 251. The belt 278 also runs on a pulley 283 (FIG. 20) carried by a bar 284 mounted on the side plate 236. The bar 284 is attached to the side plate 236 by a first fastener 286 which extends through a first lengthwise slot 287 in the bar 284 and by a second fastener 288 which extends through a second elongated slot 289 in the bar 284. The second fastener 288 also extends through a crosswise slot 291 in the side plate 236 and is anchored in a sliding plug 292 (FIG. 21) mounted inside the side plate 236. Thus, the bar 284 can be swung about the first fastener 286 and can be adjusted lengthwise to position the pulley 283 in a desired position. In a similar manner, the discharge belt 279 runs on a pulley rotatably mounted on a bar 296 which is mounted on the side plate 237 and can be adjusted in a manner similar to the bar 284. As shown most clearly in FIG. 20, the discharge belts direct the carton blanks outwardly of the bristles as the carton blanks swing around the upper end of the housing 234, and the carton blanks fall from the conveyor belt 248 into a bin 297 in which a bin belt conveyor 298 runs. The brush conveyor belt 248 turns the carton blanks so that, as the carton blanks fall into the bin 297, the carton blanks are inverted from the position at which the carton blanks are fed to the brush belt conveyor. The carton blanks, as received from the printing press exit rolls 45 (FIG. 4) and 46 (FIGS. 4 and 5) have printed faces up, and the brush belt conveyors turn the carton blanks printed face down.

The conveyor belt 248 is guided by rollers 299 and 301 (FIG. 21) mounted on a bar 302 which spans the side plates 236 and 237.

The drive shaft 244 is driven by a chain 303 which runs on a drive sprocket 304 carried by the shaft 244. As shown in FIG. 19, the chain 303 runs on the drive sprocket 304 and also runs on a drive sprocket 306 mounted on a drive shaft 307 of the assembly 2332. The chain 303 also runs on a drive sprocket 3071 carried by a shaft 308 which extends from a gear box 309. Gearing (not shown) in the gear box 309 is driven by a sprocket 311 (FIG. 4). The sprocket 311 is driven by a chain 312 which also runs on a sprocket 313 carried by a shaft 314 which extends from a second gear box 316. Gearing (not shown) in the second gear box 316 is driven by a belt 318 which runs on a pulley carried by the shaft 129 and also on a pulley 319 carried by a shaft 32 which drives the gearing in the second gear box. Thus the brush belt conveyor 248 is driven in timed relation to the delivery of carton blanks thereto. Gearing in the gear box 309 also drives a shaft 322 (FIG. 19) which carries a sprocket 323 on which a chain 324 runs. The chain 324 drives the belt conveyors in the assemblies 233 and 2331.

The housing 234 is pivotally mounted on a pin 326 (FIG. 20) carried by an upright frame bar 328 which is part of a cross frame 329 (FIG. 2) and on a similar pin 3261 (FIG. 20) carried by an upright frame bar 327 carried by the cross frame 268. Stop members 331 (one of which is shown in FIG. 20) mounted on the side plates 236 and 237 engage ends of the cross frames 268 and 329 to limit counterclockwise swinging of the housing 234 as shown in FIG. 20.

The brush belt conveyor assemblies 2331 and 2332 (FIG. 19) are generally similar in construction to the assembly 2333, already described, except that conveyor belts 333 (FIG. 2) thereof are longer than the conveyor belt 248 already described. Carton blank stops 334 (FIGS. 2 and 19) stop advance of carton blanks at the assemblies 2331 and 2332. Each of the stops 334 has a pair of legs 337 and 338 (FIG. 19), both of which are mounted on a cross frame 339. The assembly 2332 discharges carton blanks into a bin 340 (FIG. 19). Outward swinging of a housing 341 of the assembly 2332 is limited by stop screws 342 and 343 (FIG. 2) mounted in a bar 344 which spans frame bars 346 and 347. The assemblies 233 and 2331 are similar to the assemblies 2333 and 2332 and discharge carton blanks into bins 348 and 349, respectively.

INTERMEDIATE CONVEYORS

Figure 28:
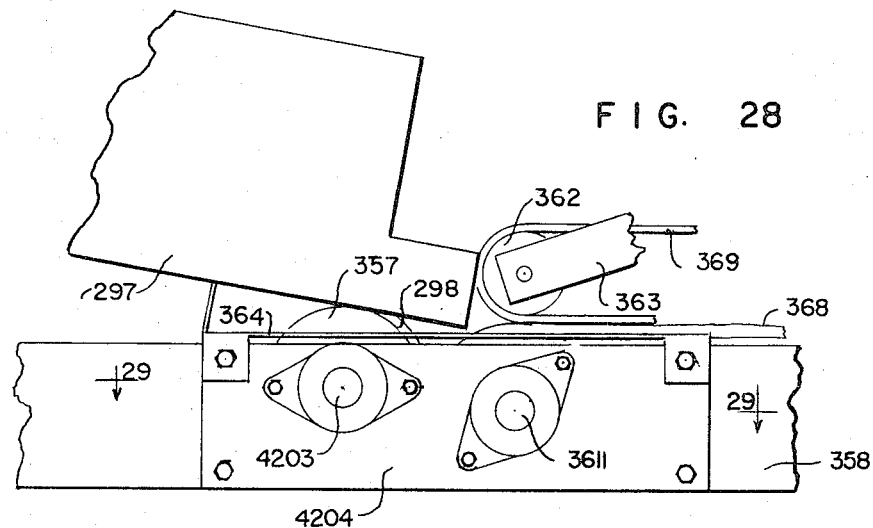
FIG. 28 is a fragmentary view in side elevation of a portion of the conveyor section of the machine.
Figure 29:
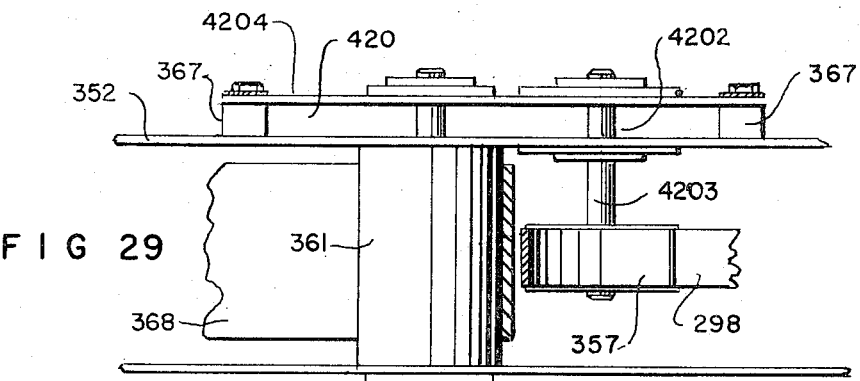
FIG. 29 is a view in section taken on the line 29—29 in FIG. 28.

The bins 340 and 297 direct carton blanks to an upper conveyor assembly 351 (FIG. 22) and a lower conveyor assembly 352, respectively, which are part of the second stacking section 43 (FIG. 1). Similar conveyor assemblies are provided in the first stacking section 42, and only the conveyor assemblies of the second stacking section 43 will be described in detail. As shown in FIG. 20, the conveyor belt 298 runs in the bin 297 spaced immediately above a lower wall 354 thereof. The belt 298 runs on pulleys 356 and 357 (FIG. 22), both of which are supported on a conveyor frame 358. The belt 298 extends through an opening 359 (FIG. 20) in the lower wall 354 of the bin 297 and moves counterclockwise as shown in FIG. 22 to discharge the carton blanks between a roll 361 carried by a shaft 3611 rotatably mounted on the conveyor frame 358 and a roll 362 rotatably mounted on a swinging frame 363. The bin 297 is mounted on the conveyor frame 352. A bin frame 364 (FIGS. 20 and 28) mounted on the underside of the bin 297 carries flanges, one of which is shown at 366 in FIG. 20, which are attached to bosses 367 carried by the conveyor frame 352. The roll 356 (FIG. 22) is carried by bars 3681 and 3682 which are mounted on the conveyor frame 352 and permit adjustment of the axis of the roll 356.

Figure 27:
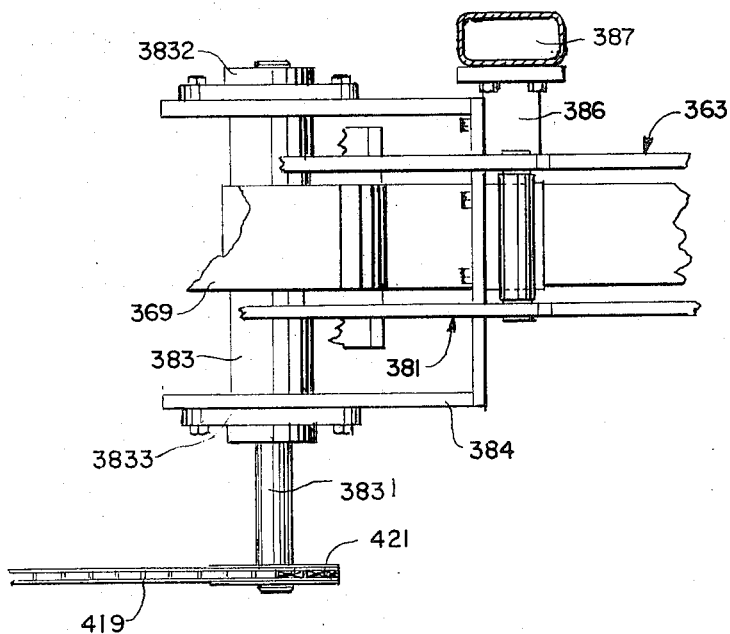
FIG. 27 is a view in section taken on the line 27—27 in FIG. 26.

A lower conveyor belt 368 runs on the roll 361 and an upper conveyor belt 369 runs on the roll 362. As shown in FIG. 22, an upper course of the lower belt 368 runs on guide rollers 371 carried by the conveyor frame 352 and on a discharge guide roll 372 mounted on a shaft 373 carried by bearings 374 (only one of which is shown) mounted on a hopper frame member 376. A lower course of the lower belt 368 returns over a roll 377 and under a roll 378 to the roll 361. A lower course of the upper belt 369 travels in face-to-face relation with the upper course of the lower belt 368 from the roll 361 to the roll 372. From the roll 372, the upper belt 369 travels around a roll 379 rotatably mounted on a swinging frame 381, an adjustable roll 382 carried by the swinging frame 381, and a roll 383 (FIG. 27) mounted on a shaft 3831 rotatably mounted on bearings 3832 and 3833 carried by a stationary frame 384 to the roll 362 (FIG. 22). The swinging frames 363 and 381 are pivotally mounted on a fitting 386 mounted on an upright frame 387. The carton blanks are carried between the face-to-face courses of the belts 368 and 369 and are discharged into a hopper section 3881 of the second section 43 of the machine (FIG. 1) in the manner that the carton blank 44 is shown in FIG. 22. The hopper section of the first section 43 of the machine is indicated at 3882 in FIG. 1.

The belt conveyors 368 and 369 are driven by a motor 389. The motor 389 drives gearing (not shown) in a gear box 391 which drives a shaft 392. The shaft 392 carries a sprocket 393 which drives a chain 394 which also runs on a sprocket 396 (FIG. 23). The sprocket 396 is mounted on a shaft 397 which also carries a sprocket 398. A chain 399 runs on the sprocket 398 and on a sprocket 401 carried by the shaft 373. The chain 399 also runs on a sprocket 402 carried by a frame 403 mounted on the hopper frame member 376. The frame 403 can swing about a fastener 404 and can be locked in position by a fastener 406 which extends through a slot 407 therein to adjust tension in the chain 399. A second sprocket 408 carried by the shaft 373 drives a chain 409 (FIG. 22) which runs on sprockets 411 and 412 carried by reject conveyor drive shafts 413 and 414, respectively, and also runs on idle sprockets 416 and 417. A third sprocket 418 mounted on the shaft 373 drives a chain 419 which, as shown FIG. 27, runs on a sprocket 421 carried by the shaft 3831. As already pointed out, the belt 369 runs on the roll 383 carried by the shaft 3831 so that the belt 369 is driven by the drive arrangement just described and the belt 368 (FIG. 22 and 23) runs on the roll 372 carried by the shaft 373 so that the belt 368 is also driven by this drive arrangement.

The shaft 397 (FIG. 22) carries a roll 422 (FIG. 23) on which a belt 423 runs. As shown in FIG. 22, the belt 423 is part of the upper conveyor assembly 351 and is positioned generally to the left and below a second belt 424 of the upper conveyor assembly 351. The belt 423 runs on a roll 425 (not shown in detail) carried by a shaft 426. The bin conveyor belt 427 discharges carton blanks to the left as shown in FIG. 22 between face-to-face courses of the belts 423 and 424. The belt 424 runs from a roll 428 mounted on a swinging frame 4281 adjacent the bin 340 over rolls 429 carried by a first semi-circular frame 431 and then in overlying relation to a course of the belt 423 over rolls 432 carried by a second or upper semi-circular frame 433 and rolls 434 carried by an elongated extension 436 of the upper semi-circular frame, around a roll 437 mounted on a swinging frame 438, and around an adjustable idle roll 439 and another idle roll 441 to the roll 428.

The bin belt conveyor 298 is driven by a chain 420 which runs on sprockets 4201 and 4202 carried by shafts 3661 and 4203. The roll 356 is mounted on the shaft 3661. A roll 4204 for the belt 427 is carried by the shaft 4203 (see FIG. 22). As shown in FIG. 24, the chain 420 also runs on an idle sprocket 4206 and on a sprocket 4207 carried by a shaft 4208. As shown in FIG. 25, the shaft 4208 and the shaft 4206 are driven by a slave pump-motor unit 4209 mounted on a housing 4210 carried by a frame bracket 4211. The pump-motor unit 4209 is controlled by and driven in timed relation to the pump-motor unit 1413 (FIG. 3) so that the bin conveyor belts 298 and 427 are driven in timed relation to the printing press, which can be about one-sixth of the speed at which carton blanks are delivered by the printing press so that the carton blanks are deposited on the bin conveyor belt in overlapping shingle fashion.

The belt 423 runs on the roll 422 and on idle rolls 442 and 443, around the roll 425, then in face-to-face relation with the belt 424 overlying the belt 424 on the rollers 429 and underlying the belt 424 on the rolls 432 and 434 to the roll 422. Carton blanks are carried shingle-fashion between face-to-face courses of the belts 423 and 424 from the bin 340 upwardly to be discharged to the left over the roll 422 into the upper portion of the hopper section 3881 (FIG. 1) of the machine.

The belts 423 and 424 (FIG. 22) discharge carton blanks crosswise of an upper portion of the hopper section 3881, as shown in FIG. 22. Similarly, the belts 368 and 369 discharge carton blanks into a lower portion of the hopper section 3881. In a similar manner, belts 4381 and 4391 (FIG. 30) deliver carton blanks 44 to an upper portion of the hopper 3882 and belts 4411 and 4421 (FIG. 32) deliver carton blanks to a lower portion of the hopper 3882. The hoppers 3881 and 3882 are similar in construction, and only the hopper 3882 will be described in detail. The upper and lower sections of the hopper 3882 are similar in operation. The upper portion of the hopper 3882 will be described in detail and only such parts of the lower portion of the hopper 3882 which differ will be described in detail.

TONGUE SUPPORTING ASSEMBLY AND CONTROL VALVE

Figure 36:
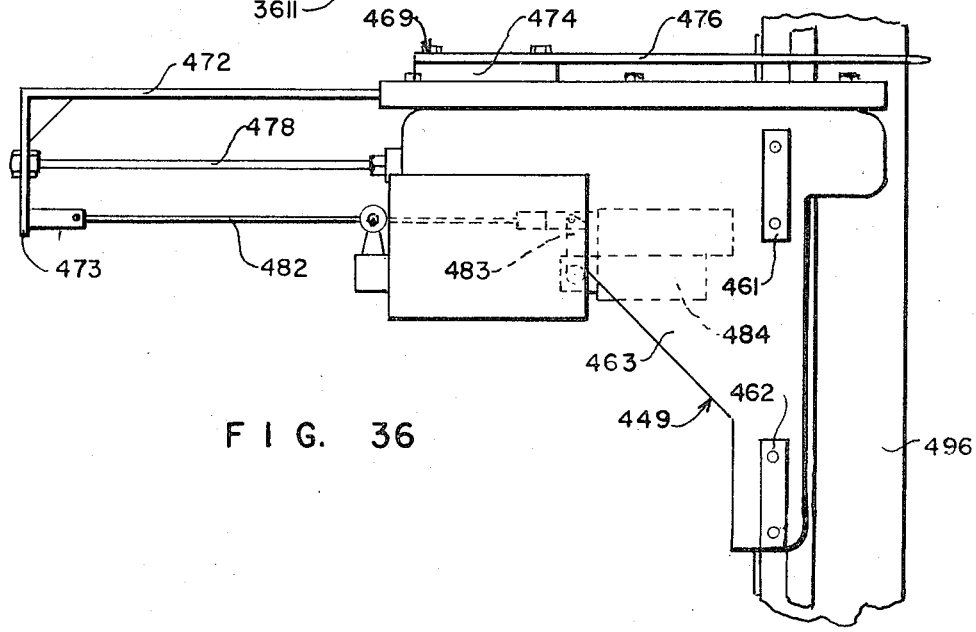
FIG. 36 is a view in side elevation of the tongue supporting assembly with the tongue thereof in retracted position.

The hopper 3882 includes upright frames 4431, 444, 446, and 448 (FIG. 30) connected by appropriate cross frames. A tongue supporting assembly 449 slides up and down between the frames 446 and 4431. As shown in FIG. 34, guides 451 and 452 are mounted on the upright frame 446 to define a slot 453 therebetween. Similar guides 454 and 456 are mounted on the upright frame 4431 (FIG. 35) to define a slot 457. Guide lugs 458 and 459 mounted on a side plate 460 of the tongue supporting assembly 449 ride in the slot 453, and guide lugs 461 and 462 mounted on a side plate 463 of the tongue supporting assembly 449 ride in the slot 457 for guiding the tongue supporting assembly 449 as it moves up and down. Cross plates 464 and 466 link the side plates 461 and 463. HOrizontal guides 467 and 468 mounted on the cross plate 464 guide a sliding carriage 469. The carriage 469 includes an angle-shaped body 471 having an upper flange 472 (FIG. 34) received in the guides 467 and 468 and a downwardly extending flange 473. A block 474 mounted on the flange 472 supports a horizontal tongue member 476. A hydraulic cylinder 477 mounted between the side plates 461 and 463 drives a piston rod 478 which is attached to the flange 473 of the carriage 469. The carriage 469 is driven in and out between the extended position shown in FIG. 34 and a retracted position shown in FIG. 36. When the carriage 469 is in the extended position, the flange 473 engages an operator 479 of a limit switch 480, which is mounted on a mounting plate 481 attached to the side plate 463. When the carriage 469 reaches the retracted position, a flexible cable 482, which extends from the flange 473 to an operator 483 of a limit switch 484, is drawn taut to actuate the limit switch 484.

Figures 30, 31:
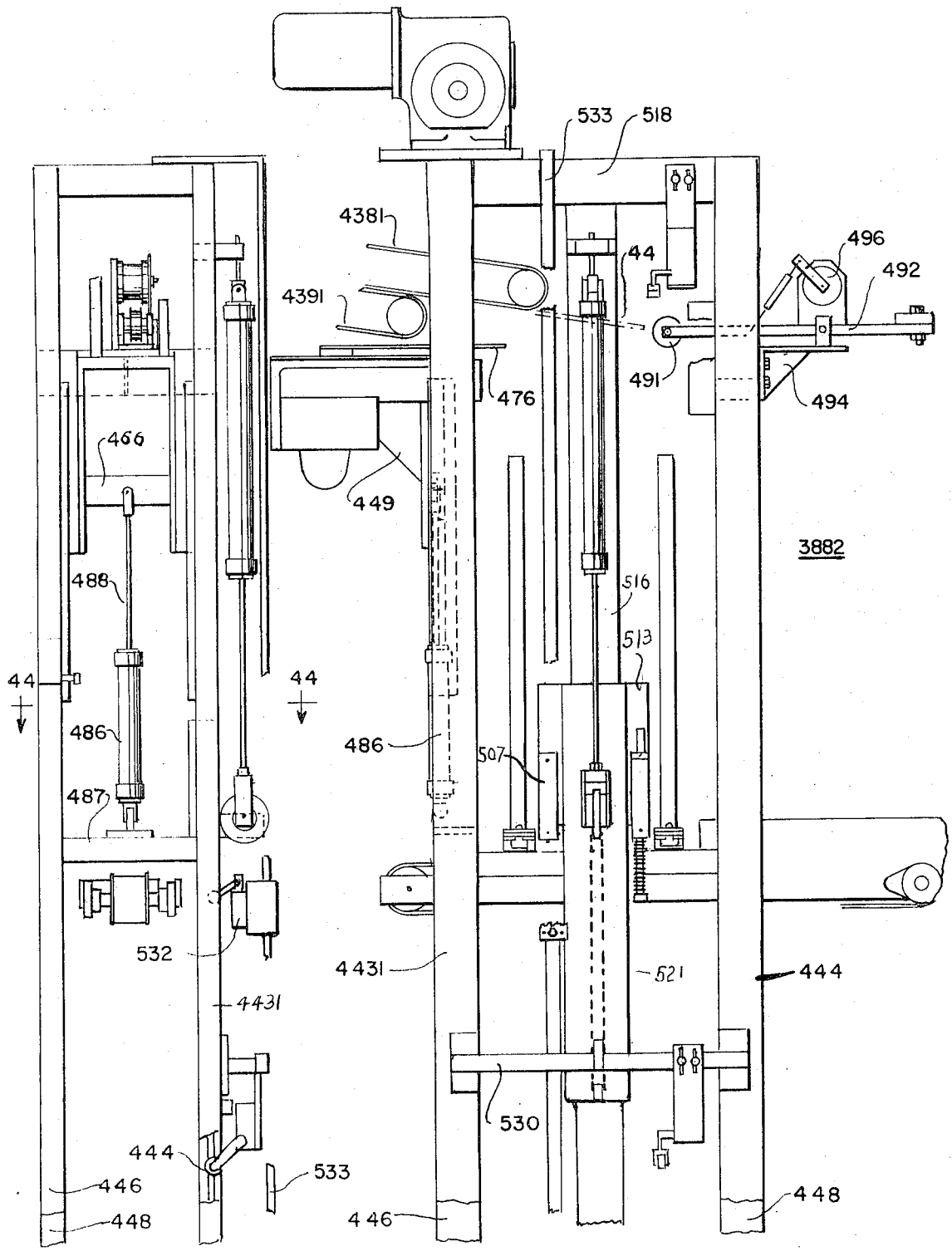
FIG. 30 is a view in side elevation of an upper portion of a hopper section of the machine.
FIG. 31 is a view in end elevation of the upper portion of the hopper section of the machine.

The tongue supporting assembly 449 is moved up and down by a hydraulic cylinder 486 (FIG. 30). A lower end of the cylinder 486 is pivotally mounted on a cross frame 487 which extends between the upright frames 446 and 4431. An upper end of a piston rod 488 of the cylinder 486 is linked to the cross plate 466. When the assembly 449 is in its upper position as shown in FIG. 30, the tongue 476 can be advanced from the FIG. 34 position through the FIG. 30 position to the position shown in FIG. 37 at 476A in dot-dash lines in which the tongue 476 is extended crosswise of the hopper 3882 into the path of carton blanks being delivered by the belts 4381 and 4391 (FIG. 30). The carton blanks are projected beneath a roller 491 (FIG. 37) supported on a rocker frame 492. The rocker frame 492 is pivotally mounted on a bracket 493 supported on a frame 494, which extends between the upright frames 444 and 448. A control valve 496 is mounted on the bracket 493. An adjustable link 497 extends between the rocker frame 492 and a valve operator 498, which operates the control valve 496. The carton blanks ride onto the stack 499 on the tongue 476 and raise the roller 491 to cause the valve operator 498 to be swung clockwise to operate hydraulic mechanism to be described in greater detail hereinafter to cause lowering of the tongue 476 with the tongue supporting assembly through the position shown in full lines in FIG. 37. An adjustable counterweight 501 is mounted on the rocker frame 492. An upright stop bolt 502 threaded in the rocker frame limits counter-clockwise swinging thereof. When the tongue supporting assembly has been lowered sufficiently to allow the roller to fall to its initial position, the control valve 496 is returned to a position at which the tongue supporting assembly is stationary until the stack on the tongue has again built up to a sufficient height to again operate the control valve 496. If there is a jam and an excessive number of carton blanks build up under the roller 491, the rocker frame 492 can engage a push button 4921 of a limit switch 4922, which can activate an alarm as will be explained in greater detail hereinafter. The limit switch 4922 is carried by an angle bracket 4923 mounted on the frame 494.

The tongue supporting assembly supports the stack 499 of carton blanks until the tongue 476 has been lowered to a position shown in full lines in FIG. 38 at which the tongue 476 is received in slots 5021 in horizontal flanges 503 and 504 of angle shaped fork members 506 and 507 (FIG. 30) respectively. When the tongue supporting assembly 449 is at this level, as shown in FIGS. 34 and 35, a frame portion 508 of the tongue supporting assembly engages an actuator 509 of a limit switch 511, and the hydraulic cylinder 477 causes retraction of the tongue 476 to leave the partial stack of carton blanks on the horizontal flanges 503 and 504, as shown in FIG. 38.

FORK ASSEMBLY

Figures 32, 33:
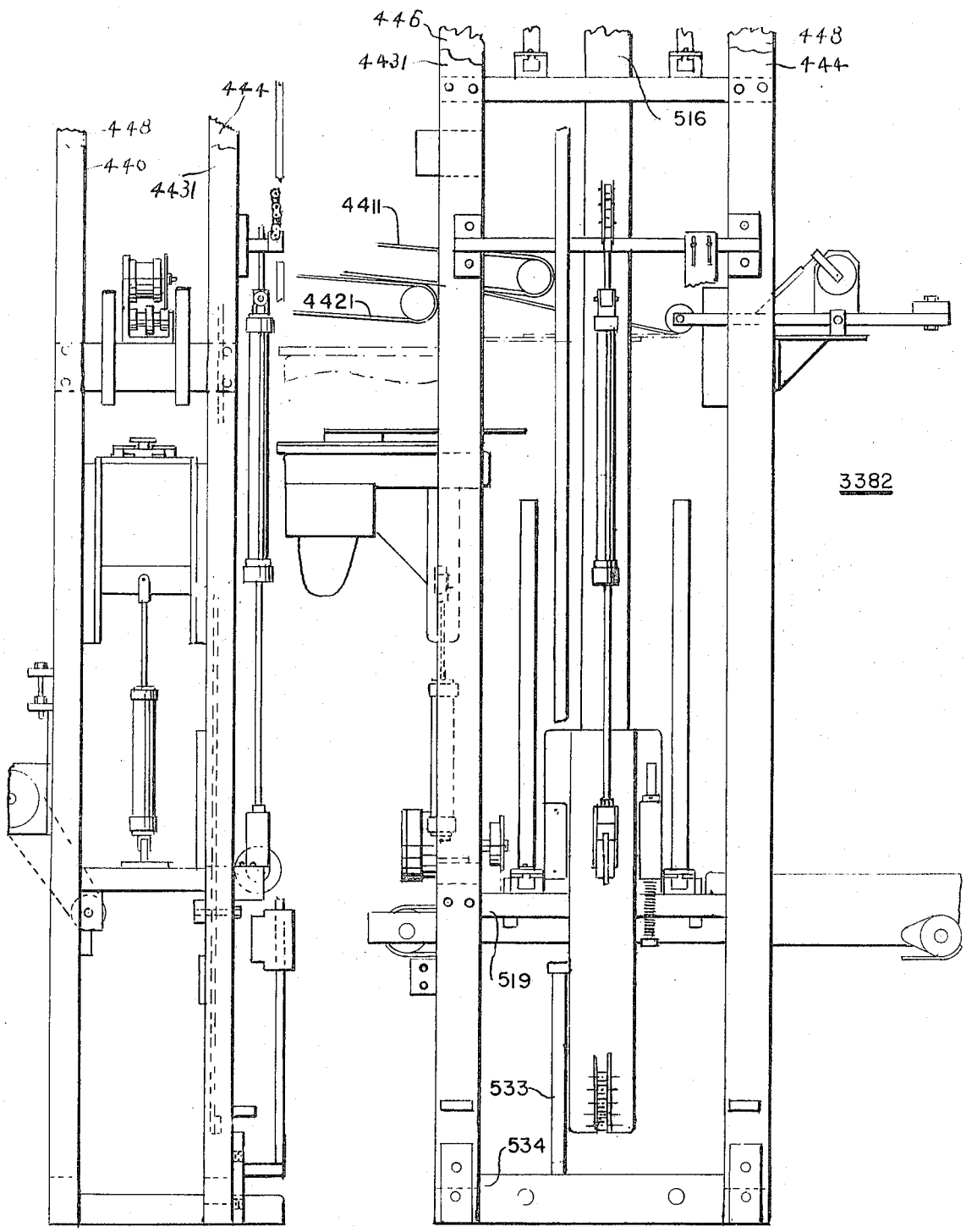
FIG. 32 is a view in side elevation of a lower portion of the hopper section of the machine.
FIG. 33 is a view in end elevation of the lower portion of the hopper section of the machine.
Figure 39:
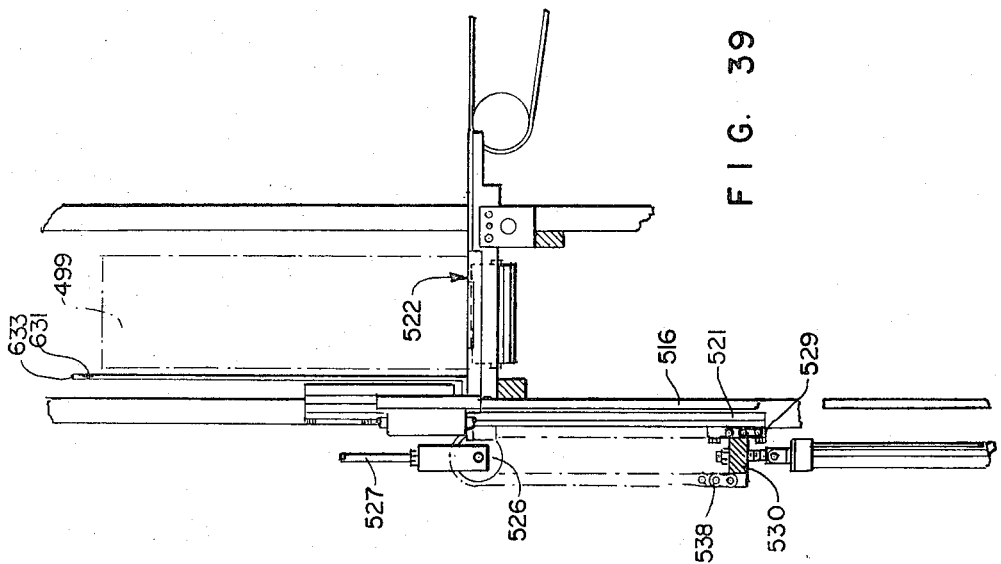
FIG. 39 is a fragmentary view partly in end elevation and partly in section of the hopper section showing the fork structure in lowered position.

As shown in FIG. 38, the fork members 506 and 507 (FIG. 30) are mounted on an upright plate 513. Upright guides 514 mounted on the plate 513 receive an elongated guide plate 516, which guides the fork members for moving up and down without turning. An upper end of the guide plate 516 is attached to a bracket 517 (FIG. 37) welded to the underside of a cross frame 518. A lower end of the guide plate 516 is attached to a cross frame 519 (FIG. 32). A chain anchor plate 521 (FIG. 38) is attached to the upright guides 514. The fork members 506 and 507, the plate 513, the guides 514, and the chain anchor plate 521 form a fork assembly 522. The fork assembly slides up and down between the upper position shown in FIG. 38 and a lowered position shown in FIG. 39. When the fork assembly is in the FIG. 38 position, an actuator 5221 of a limit switch 523 is engaged by the guides 514 to signal that the fork assembly is in raised position. The fork assembly is gradually lowered from the FIG. 38 position as the stack 499 of carton blanks builds up on the fork members through action of an hydraulic cylinder 524. An upper end of the cylinder 524 is suspended from the bracket 517. A sprocket 526 is rotatably mounted on a piston rod 527 thereof. One end of a chain 528, which runs on the sprocket 526, is anchored to a lug 529 of the chain anchor plate 521. The other end of the chain 528 is anchored to a stationary cross frame 530 (FIGS. 30 and 39) so that, as the sprocket 526 is lowered, the fork assembly 522 is lowered. As will be explained more fully hereinafter, the cylinder 524 can be controlled by the control valve 496 (FIG. 37) so that the fork assembly 522 descends while maintaining the level of the uppermost carton blank in the stack 499 in engagement with the roller 491, and the fork assembly is lowered when the height of the stack 499 is sufficient to raise the roller 491.

When the stack has reached a selected height, a lower end of the chain anchor plate 521 engages a switch operator 531 (FIG. 41) of a limit switch 532 to actuate the switch 532. During the lowering of the fork assembly, the tongue supporting assembly returns to its upper position and, when the switch 532 is actuated, the tongue again is extended, and the fork assembly 522 rapidly is lowered to its FIG. 39 (lowered) position. The limit switch 532 is mounted on an elongated upright rod 533. An upper end of the rod 533 is attached to the cross frame 518 (FIG. 30). A lower end of the rod 533 is attached to a cross frame 534 (FIG. 32). As shown in FIG. 41, the limit switch 532 is mounted on a mounting plate 536, which is supported by side members 537 and 538 and a rear plate 539. Fasteners 540 hold the plates 536 and 539 and the side members 537 and 538 in assembled relation. A pressure plate 541 mounted between the side members 537 and 538 is held against the upright bar 533 by a positioning set screw 542 and a bolt 543, both threaded in the rear plate 539. The set screw 542 is seated in a bore 544 in the pressure plate 541. The bolt 543 is seated in a bore 545 (FIG. 41) in the pressure plate 541. The limit switch 532 can be clamped in selected positions along the upright bar 533.

Figure 45:
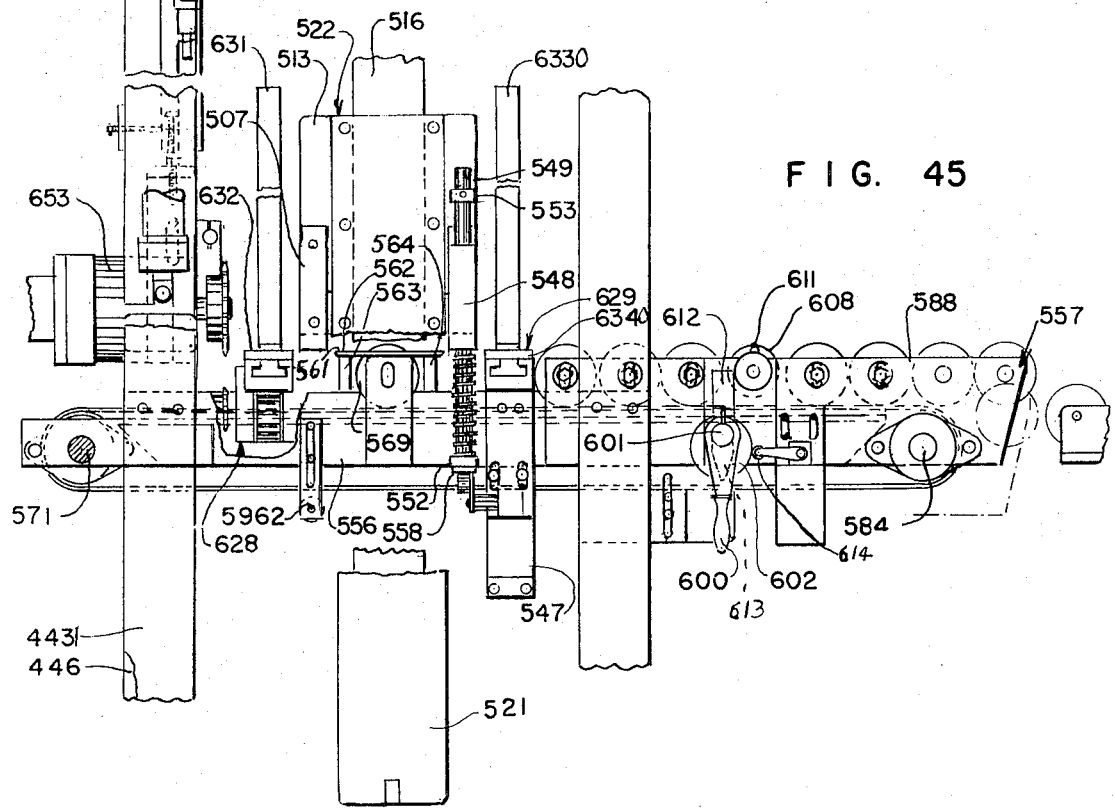
FIG. 45 is a view in side elevation of the portion of a reject conveyor assembly of the machine shown in FIG. 44, a lowered position of the reject conveyor being indicated in dot-dash lines.

When the fork assembly 522 is in its lowered position, as shown in FIGS. 40 and 45, a limit switch 547 can be actuated thereby. An upright housing 548 (FIG. 40) is mounted on the fork assembly 522. An upright rod 549 is slideably mounted in the housing 548. The upright rod 549 is urged downwardly by a compression spring 551, which bears on a collar 552 mounted thereon. A second collar 553 mounted on the rod 549 limits downward movement thereof. When the fork assembly 522 is in its lowermost position, the lower end of the rod 549 can engage a switch operator 554 of the limit switch 547 to cause operation of the switch 547 to indicate that the fork assembly has reached its lowermost position and to set in motion mechanism to be described hereinafter for discharging the stack of carton blanks from the fork assembly. However, if a framework 556 of a reject conveyor 557 is in a raised position shown in full lines in FIGS. 40 and 45, a stop bar 558 attached to the underside of the framework 556 prevents actuation of the limit switch 547 by the upright rod 549. When the reject conveyor 557 is in its lowered position, the stop bar is at a lowered position shown in dot-dash lines at 558A in FIG. 40, and the rod 549 is released to engage the switch operator and actuate the limit switch 547.

REJECT CONVEYOR

Figure 44:
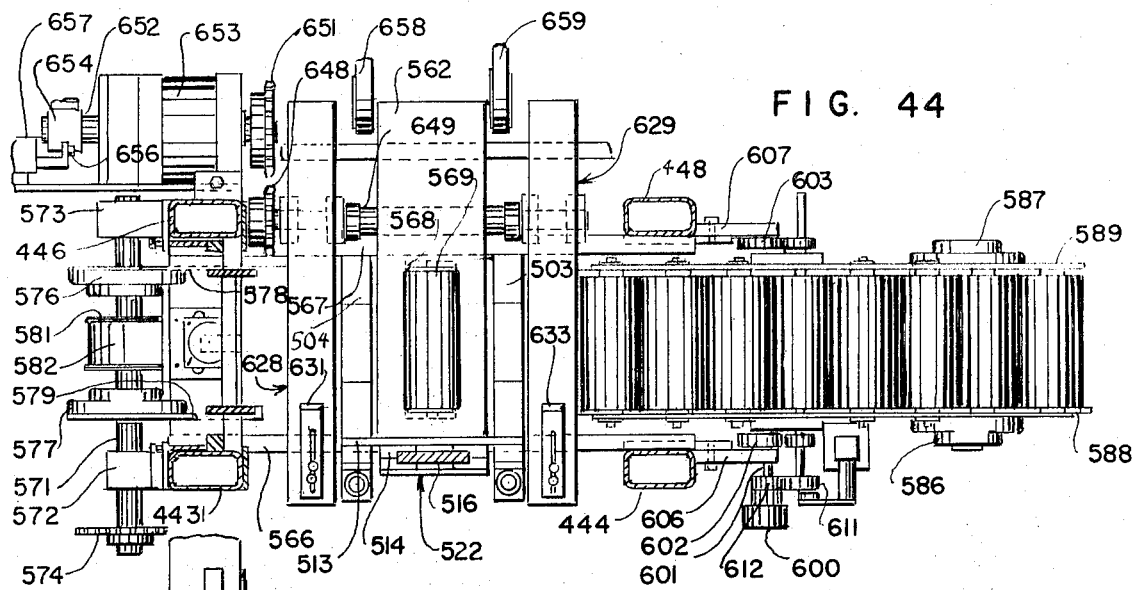
FIG. 44 is a view in section taken generally on the line 44—44 in FIG. 31.

The fork assembly 522 lowers the stack of carton blanks until the upper faces of the fork flanges 503 and 504 are aligned with an upper face 561 of a horizontal stationary plate 562 (FIGS. 40 and 45), which is carried by legs 563 and 564 (FIG. 45) that are mounted on a cross frame 566 (FIG. 44). The plate 562 has a rectangular opening 568 therein through which an upper portion of a roller 569 can extend, as shown in FIGS. 44 and 40 (full lines). The roller 569 is rotatably mounted between frames 5691, one of which is shown in FIG. 46, which are mounted on the reject conveyor framework 556. The roller 569 can move with the reject conveyor between the full line position of FIGS. 40 and 45 and a lowered dot-dash line position as indicated at 569A in FIG. 40 (full lines at 569 in FIG. 46) when the reject conveyor is lowered as shown in FIG. 46. The reject conveyor framework 556 is swingably mounted on a reject conveyor shaft 571, which is rotatably supported in bearings 572 and 573 mounted on the upright frames 443 and 446, respectively. The shaft 571 carries a sprocket 574 (FIG. 44) on which a drive chain (not shown) runs to drive the shaft 571 continuously. The drive connections for the reject conveyor shaft 571 are similar to those already described which drive the reject conveyor shafts 413 and 414. Bearings 576 and 577 rotatably mounted on the shaft 571 carry plates 578 and 579 respectively on which the reject conveyor frame 556 is mounted. A pulley 581 mounted on the shaft 571 drives an endless belt 582 which runs on top of the reject conveyor frame 556. The belt 582 also runs on an idle pulley 583 (FIG. 46) carried by a shaft 584 rotatably mounted in bearings 586 and 587 carried by plates 588 and 589, respectively, mounted on the reject conveyor frame 556. The belt 582 runs under the roller 569 and under rollers 591, 592, 593, 594 and 596, which are rotatably mounted between the plates 588 and 589, with the upper course of the belt 582 engaging the rollers 569, 591, 592, 593, 594 and 596 to rotate the rollers. A belt tightening roller 5961 rotatably carried by a shaft 5962 can engage the belt 582. Frames 5963, only one of which is shown, mounted on the frame 556 adjustably support the belt tensioning roller 5961.

Figure 47:
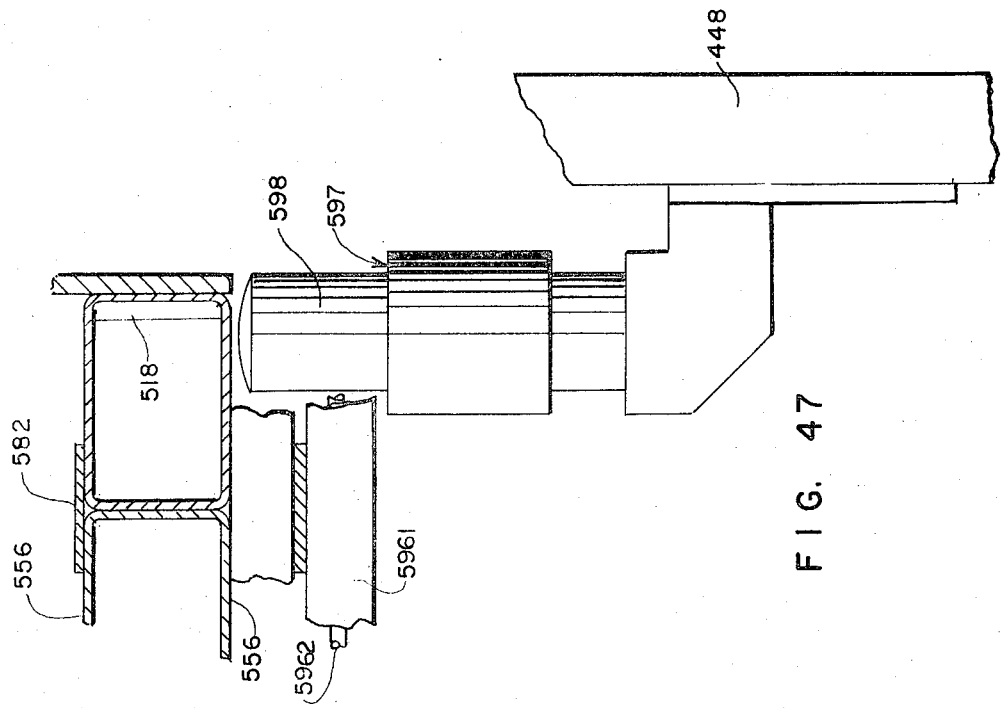
FIG. 47 is a fragmentary view partly in end elevation and partly in section showing a shock absorbing device which is a part of the reject conveyor.

During normal operation of the machine, the reject conveyor 557 remains in the lowered position shown in FIG. 46. The reject conveyor frame 556 rests on a hydraulic bumper 597 having a plunger 598 (FIGS. 46 and 47) which engages the underside of the reject conveyor frame 556. In the lowered position of the reject conveyor, the roller 569 is below the upper face 561 of the plate 562 as shown in FIG. 46 so that the roller 569 does not engage a stack 5981 of carton blanks on the horizontal flanges 503 and 504. When a stack is improperly formed, or for other reason is to be rejected, a handle 600 carried by a shaft 601 rotatably mounted between the plates 588 and 589 is swung from the FIG. 46 position to the FIG. 45 position. Cams 602 and 603 (FIG. 44) mounted on the shaft 601 engage rollers 604, only one of which is shown in FIG. 46, mounted on plates 606 and 607 carried by the upright frames 444 and 448, respectively, so that swinging of the handle 600 one half turn from the FIG. 46 position to the FIG. 45 position causes the reject conveyor to swing upwardly to the FIG. 45 position at which a portion of the roller 569 is exposed above the plate 562 in position to advance the rejected stack to the right as shown in the drawings. As the rejected stack passes to the right, it advances over a roller 608 carried by a shaft 609 (FIG. 46) rotatably mounted between the plates 588 and 589 causing the roller 608 to turn so that a cam 611 mounted on the shaft 609 turns engaging a bar 612 mounted on the shaft 601 to cause the handle 600 and the cams 602 and 603 to return to the FIG. 46 position and permitting the reject conveyor 557 to swing back down to its normal FIG. 46 position. As the handle 600 swings back, a radially extending switch operating member 613 mounted on the shaft 601 instantaneously engages a switch actuator 614 of a limit switch 616 carried by the plate 588 to swing the switch actuator 614 to the dot-dash line position indicated at 614A, the switch operating member being shown in dot-dash lines at 613A in the position at which it engages the switch actuator. The hydraulic plunger 598 of the hydraulic bumper 597 permits the reject conveyor to swing downwardly but prevents sudden descent thereof. The rejected stack rolls on to the right along the reject conveyor and passes onto a stationary reject storage rack 617. The rack 617 includes rollers 618 rotatably mounted on shafts 619 which span plates 621 and 622 carried by a stationary frame 623. The frame 623 is a part of the framework of the machine. The rollers 618 are aligned with the rollers of the reject conveyor 557. An angle-shaped stop 624 mounted on a cross frame 6241 which spans the plates 621 and 622 limits advance of the rejected stack at the position shown at 626 in FIG. 46.

STACK PUSHING ASSEMBLY

When a stack of carton blanks has been properly formed, it is discharged from the plate 562 and from the horizontal flanges 503 and 504 of the fork members by pusher assemblies 628 and 629 (FIGS. 44 and 45). The pusher assembly 628 includes an L-shaped pusher member 631 mounted on a horizontal plate 632. The pusher member 629 includes an L-shaped pusher member 6330 mounted on a horizontal plate 6340 (FIG. 45). The pusher assemblies are similar in construction and only the pusher assembly 628 will be described in detail.

The horizontal plate 632 (FIG. 48) is mounted on a rack member 633, which is slideably mounted in a slideway member 634 having a lengthwise slot 636 (FIG. 49) in which the rack member 633 slides. The pusher member 631 is adjustably mounted on the top of the horizontal plate 632 (FIG. 48). Adjacent one end, the slideway member 634 is supported on the cross frame 566. Spaced from the cross frame 566, the slideway member 634 rests on and is attached to bearing housing members 638 and 639 (FIG. 49). The bearing housing members 638 and 639 in turn are mounted on the cross frame 567. A shaft 641 extends through transverse bores 6411 and 6412 in the bearing housing members 638 and 639, respectively. A gear 642 is mounted on and keyed to the shaft 641. The gear 642 extends through a slot 643 (FIG. 48) in the slideway member 634 and meshes with the rack member 633. The rack member 633 is held in place in the slideway member 634 by gibs 644 and 645 (FIG. 49) mounted on the slideway member 634 and engaging shoulders 646 and 647, respectively, on the rack member 633. A sprocket 648 (FIG. 44) is mounted on the shaft 641. A chain 649 (FIG. 48) runs on the sprocket 648 and on a drive sprocket 651 carried by a drive motor shaft 652. The shaft 652 is driven by a rotary cylinder hydraulic drive mechanism or motor 653 (FIG. 44) supported on the upright frame 446. A switch operating member 654 mounted on the shaft 652 is engageable with a switch actuator 656 of a limit switch 657 when the rack member 633 and the pusher member 631 have been advanced to the limit of their movement to the right as shown in FIG. 48. As shown in FIG. 44, the pusher assemblies 628 and 629 are disposed on opposite sides of belt conveyors 658 and 659, and the pusher assemblies advance sufficiently to transfer the completed stack onto the belt conveyors 658 and 659 before the limit switch 657 is actuated. As the stack is transferred onto the belt conveyors 658 and 659, the stack breaks a light beam between target 1076 (FIG. 54) and a photo-cell unit 3017 (FIG. 50) which activates circuitry to be described hereinafter to start operation of the belt conveyors 658 and 659. As the stack clears the light beam between the target 6591 and the unit 6592, the transfer belt conveyors 658 and 659 stop.

TRANSFER CONVEYOR ASSEMBLY

The belt conveyors 658 and 659 are part of a transfer conveyor assembly 671 shown in detail in FIGS. 51, 52, 53 and 54. As shown in FIG. 51, the upper course of the belt conveyor 658 travels on an elongated horizontal frame 672. An idle pulley 673 mounted on a shaft 674 supported between plates 676 and 677 (FIG. 52) mounted on the frame 672 adjacent one end thereof guides one end of the upper course of the belt conveyor 658. A similar idle pulley 678 (FIG. 51) mounted on a shaft 679 supported between bearing plates 681 (only one of which is shown) mounted on the frame 672 adjacent the opposite end thereof guides the opposite end of the upper course of the belt conveyor 658. The frame 672 includes an upper tubular portion 672A and a lower solid bar portion 672B welded to the tubular section 672A. A similar elongated horizontal frame 682 carries pairs of bearing plates 683, two of which are shown in FIG. 52, at opposite ends thereof which support shafts on which idle pulleys 685 (only one of which is shown) are rotatably supported adjacent opposite ends of the frame 682 on which the conveyor belt 659 runs. The horizontal frames 672 and 682 are mounted on cross frame bars 686 and 687 (FIG. 51). In addition, a bearing supporting frame 689 spans the frames 672 and 682. Spaced bearing support plates 691 and 692 (FIG. 52), which are mounted on the bearing supporting frame 689, extend downwardly from the bearing supporting frame 689. Bearings 693 (FIG. 51) mounted on the bearing support plates 691 and 692 rotatably support a shaft 696. The conveyor belt 658 runs on a drive pulley 697 mounted on the shaft 696 as shown in FIG. 51. Similarly, the conveyor belt 659 runs on a drive pulley 698 (FIG. 52) mounted on the shaft 696. Idle pulleys 699 and 701 (FIG. 51) around which the conveyor belt 658 extends, are mounted on idle bearing support plates 702 and 703, respectively, which are adjustably mounted on the bearing support plate 691. The conveyor belt 659 extends around similar idle pulleys 704 carried by bearing support plates 706, only one of which is shown (FIG. 52), which are similarly mounted on the bearing support plate 692. A sprocket 707 is mounted on the shaft 696 on which a drive chain 708 runs. The chain 708 also runs on a sprocket 709 carried by a shaft 711.

The shaft 711 is driven by an appropriate motor 712, not shown in detail, mounted in a housing 713 (FIG. 52). The motor drives a shaft 714 on which is mounted a sprocket 716. A chain 717 runs on the sprocket 716 and on another sprocket 7171 mounted on the shaft 711 to drive the shaft 711. Opposite end portions of a connecting rod or link 718 are rotatably mounted on the shafts 711 and 696.

Upright bars 719 and 721 (FIG. 52) extend downwardly from the cross frame bar 687 on opposite sides of the belt conveyors 658 and 659. An outwardly extending cam follower 722 is mounted adjacent the lower end of the bar 721. A similar outwardly extending cam follower 723 (FIG. 51) is mounted on the upright bar 719. Similar upright bars 724 and 725 are mounted on and extend downwardly from the cross frame bar 686 on opposite sides of the belt conveyors 658 and 659. Cam followers 726 (only one of which is shown) are mounted on the upright bars 724 and 725. The cam followers 722 and 723 are guided by cam members 727 and 728. The cam followers 726 are guided by cam members 729 and 731. As shown, each of the cam members includes a sloping slot 732 along which the cam follower of the associated upright bar travels. The cam members 727, 728, 729 and 731 are part of a sliding cam assembly 7321 shown in detail in FIG. 55. The assembly 7321 also includes cross bars 733 and 734 linking the cam members 727 and 728 and a cross bar 736 linking the cam members 729 and 731. Rails 737 and 738 carry guide rollers 739, 741, 742, and 743 and which extend outwardly from the sliding cam assembly 732. As shown in FIG. 52, cross frames 744 and 746 carry rails 748 and hold down plates 747 (only one set of which is shown) which guide the sliding cam assembly 7321 for moving back and forth between the position shown in FIG. 51 and that shown in FIG. 54. Shim plates 749 (FIG. 55) are disposed between the rails 737 and 738 and associated cam members. A clevis member 751 is adjustably mounted on the cross frame 734. Adjustment screws 752 mounted in a flange 753 of the cross frame 734 engage lugs 754 of the clevis plate 751. A head 756 of a piston rod 757 is pivotally mounted on a pivot pin 758 which is mounted in and spans the lugs 754. The piston rod 757 carries a piston (not shown) which runs in a hydraulic cylinder 759 (FIG. 51). When the piston rod 757 is moved from the FIG. 51 position to the FIG. 54 position, the transfer conveyor assembly 671 is lowered to the FIG. 54 position. In this position, the cross frame bar 687 engages a switch operator 761 of a limit switch 762 to signal that the transfer conveyor assembly 671 is in its lower position.

SKID CONSTRUCTION

Figure 56:
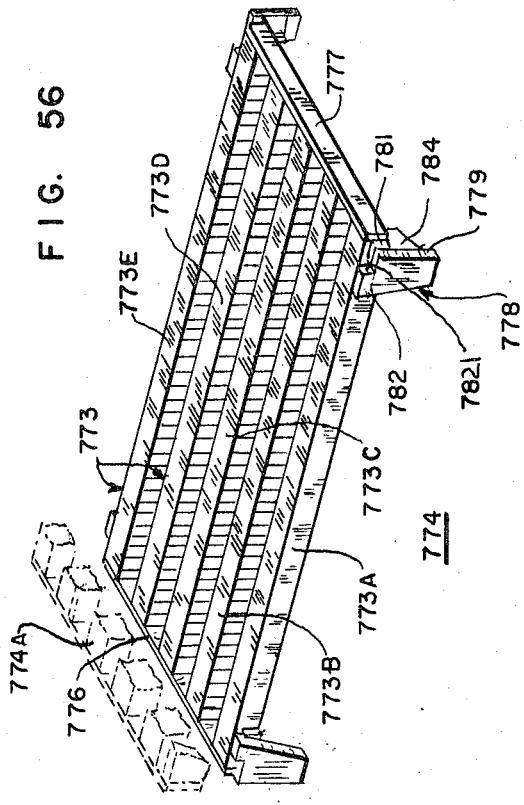
FIG. 56 is a perspective view of a skid used in the machine, a fragmentary portion of a second skid stacked thereon being shown in dot-dash lines.

The belt conveyors 658 and 659 of the transfer conveyor assembly 671 can be received between bars 773 of a skid row 774. Details of construction of the skid 774 are shown in FIG. 56. The bars 773 are held in parallelism by cross bars 776 and 777 welded to opposite ends thereof. Leg assemblies 778 are provided at the corners of the skid. Each leg assembly includes a trapezoidal leg member 779 spaced from one of the bars 773 by a spacer member 781. A diamond-shaped member 782 is provided at the upper edge of each leg member so that a slot 7821 is formed in which a lower end portion of a leg member of another similar skid can be received with the skids in stacked relation in the manner that a fragmentary portion of a skid 774A is shown. A transverse stiffener plate 784 is welded to the leg member 779 and to one of the bars 773.

As shown in FIG. 51, the skid 774 moves along the machine on rollers 783. The rollers are mounted on pairs of roller frames 787-788. The roller frames 787 and 788 are mounted on lengthwise frames 789 and 791, respectively, which are supported on frame members, one of which is indicated at 792 in FIGS. 51 and 52. Fragments of additional roller frames 793–794 are shown in FIGS. 52 and 53. The construction of the roller frames will be described in greater detail hereinafter. The skid 774 is advanced by skid advancing mechanism which will be described in greater detail hereinafter to approximately the position shown in FIG. 53. The transfer conveyor assembly 671 is raised to the FIG. 53 position, and wedge members 795 and 796 carried by the cross frame bars 687 and 686, respectively, engage the bar 773B of the skid 774 to precisely position the skid.

Figure 54:
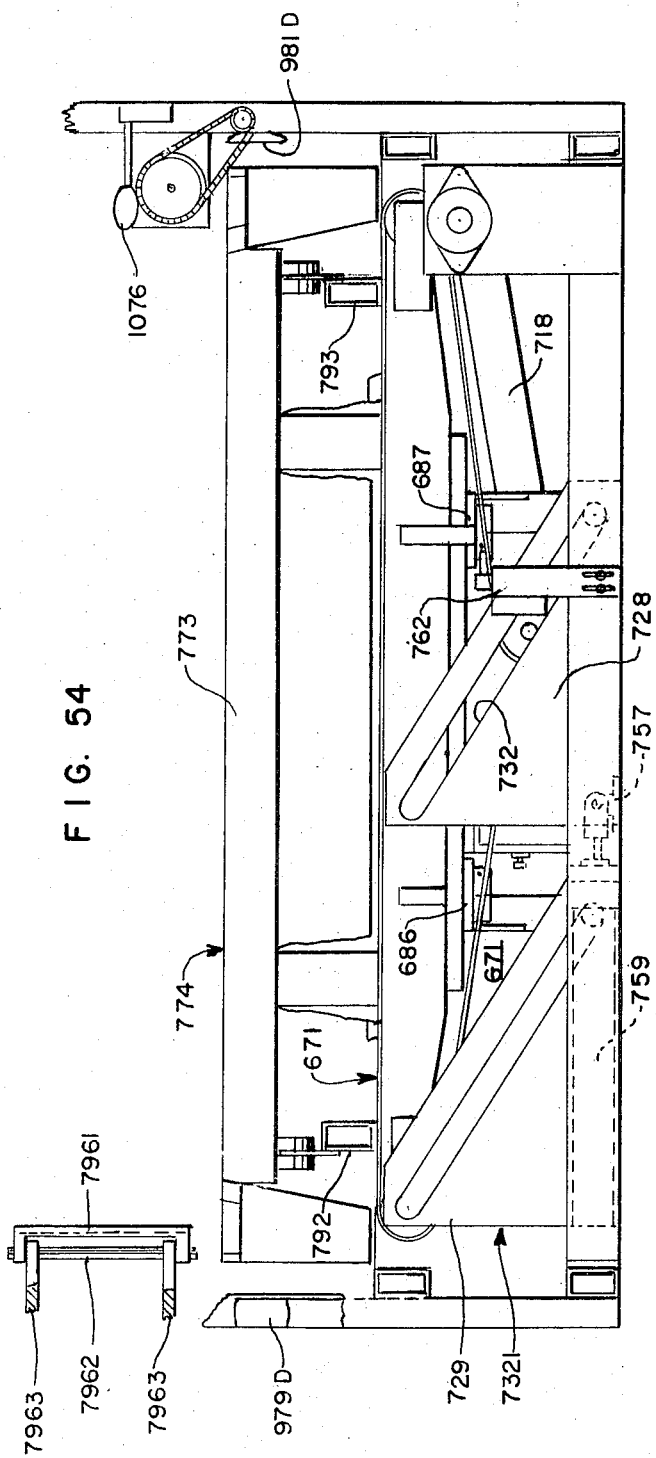
FIG. 54 is a view in section taken generally on the same line as FIG. 51 but showing the transfer conveyor assembly in lowered position.
Figure 55:
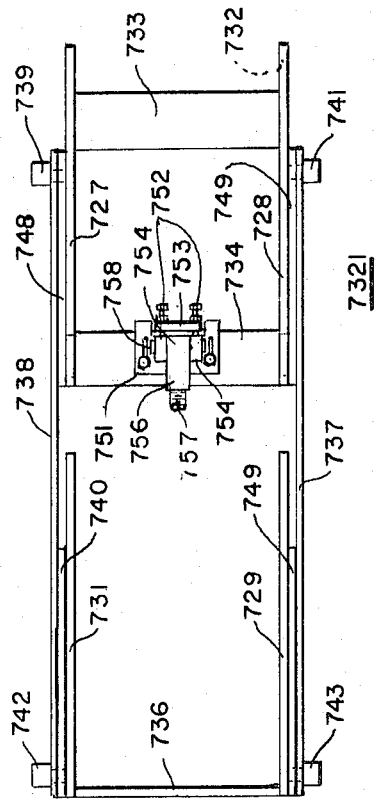
FIG. 55 is a plan view of a guide framework forming a part of the transfer conveyor assembly shown in FIGS. 51-54 inclusive.
Figure 75:
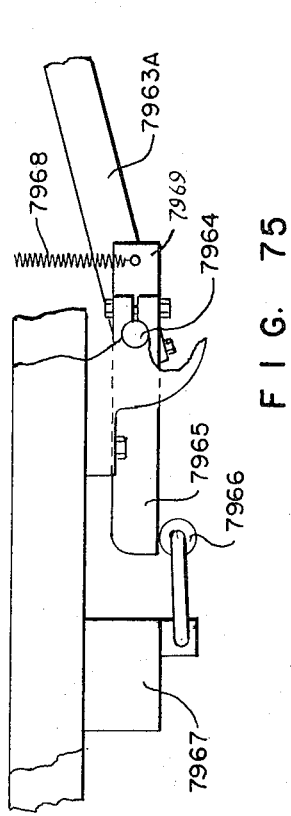
FIG. 75 is a fragmentary plan view showing a gate operated limit switch and switch operating members.

Then stacks 499 of carton blanks are advanced onto the belt conveyors 658 and 659 overlying the bars 773C, 773D and 773E of the skid. When a selected number of stacks 449 has been accumulated for one row of stacks, the first stack in the row advances into engagement with a gate 7961 (FIG. 54). The gate 7961 is mounted on a shaft 7962 carried by crank arms 7963. Equivalent portions of a gate 7961A associated with the second stacking section 43 as shown in FIGS. 70 and 75 are indicated with the same numbers with the addition of the letter "A." Arms 7963A are mounted on a pivotally mounted upright shaft 7964 (FIG. 75). A crank 7965 is engaged by a switch operator 7966 of a limit switch 7967 to indicate the presence of the last stack of the row. A tension spring 7968 is attached to a crank 7969 mounted on the shaft 7964 and urges the gate 7961A to the FIG. 70 position. The transfer conveyor assembly is lowered to leave the row of stacks on the skid, and the skid is advanced to approximately the FIG. 52 position. The transfer conveyor assembly is raised to the FIG. 52 position, and the wedge members 798 and 799 engage the bar 773D of the skid to again position the skid precisely but at a position where a second row of stacks can be advanced onto the belt conveyors 658 and 659 in overlying relation to the bars 773A, 773B and 773C of the skid. When the second row is completed, the transfer conveyor is again lowered to leave the second row of stacks on the skid, and the skid is advanced away therefrom.

Figure 58:
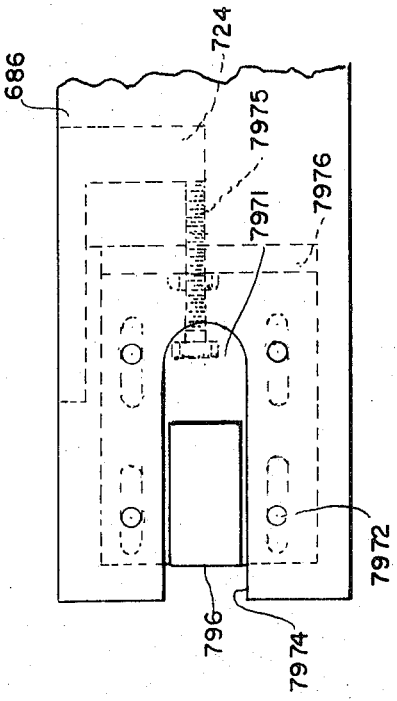
FIG. 58 is a plan view of the wedge member and associated elements shown in FIG. 57.
Figure 57:
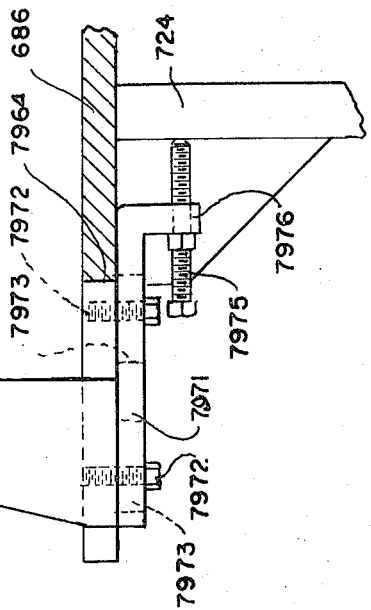
FIG. 57 is a fragmentary enlarged view partly in side elevation and partly in section showing a skid positioning wedge member which is a part of the transfer conveyor assembly.

As shown in FIGS. 57 and 58, the wedge member 796 is carried by a slide support 7971 which is supported under the cross frame bar 686 by fasteners 7972. The fasteners 7972 extend through slots 7973 in the slide support 7971 and are received in the cross frame bar 686. The wedge member 796 moves in a slot 7974 in the cross frame bar 686. A positioning screw 7975 threaded in a flange 7976 of the slide support 7971 engages the upright bar 724 for positioning the wedge member 796. The other wedge members can be similarly mounted.

SKID HANDLING DRAG

Figure 59:
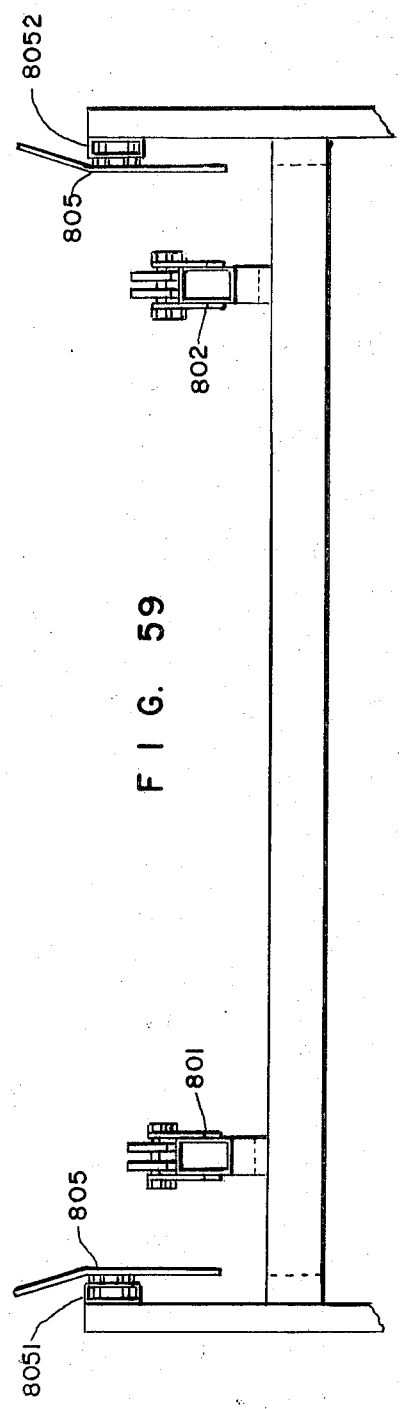
FIG. 59 is an enlarged fragmentary end view of the stacking section shown in FIG. 50 looking in the direction of the arrows 59—59 in FIG. 50.
Figure 60:
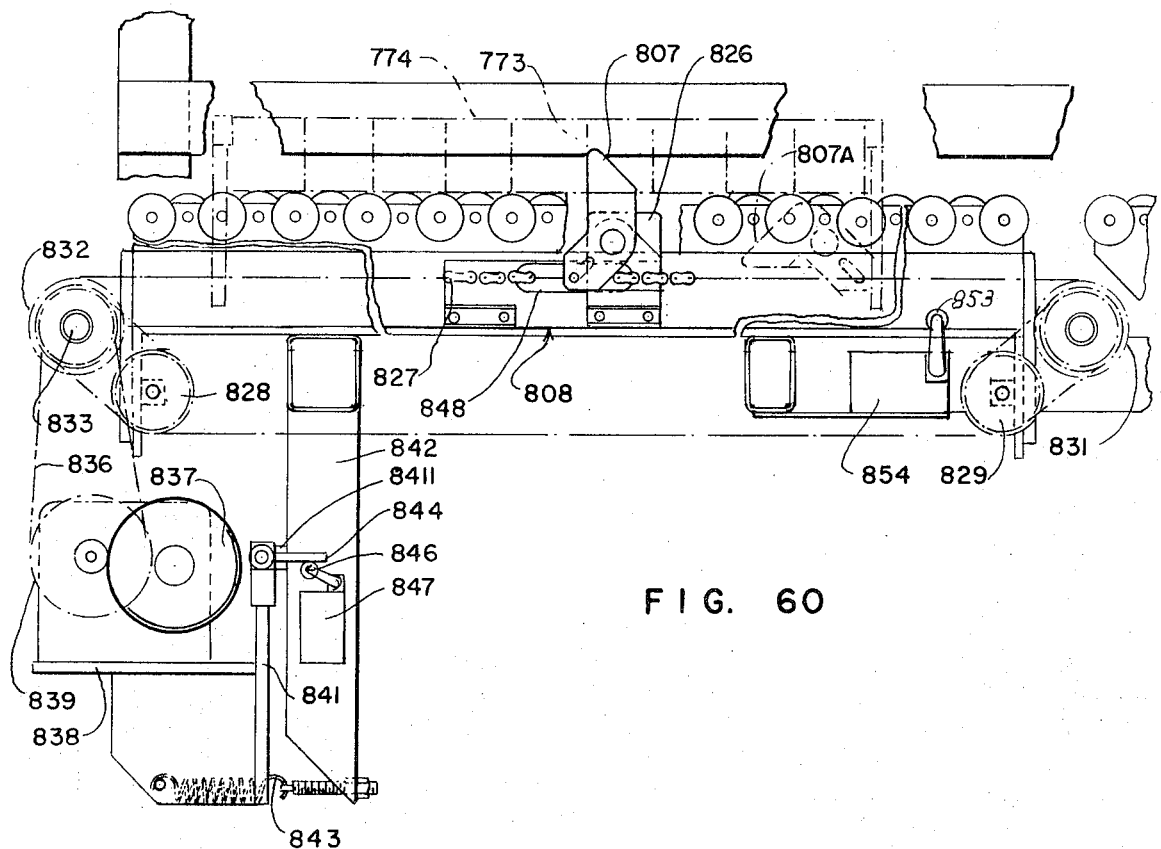
FIG. 60 is an enlarged view partly in side elevation and partly in section of an upper portion of the stacking section shown in FIG. 50, a skid being shown in association therewith in dot-dash lines, a drag link thereof being shown in lowered position in dot-dash lines.
Figure 61:
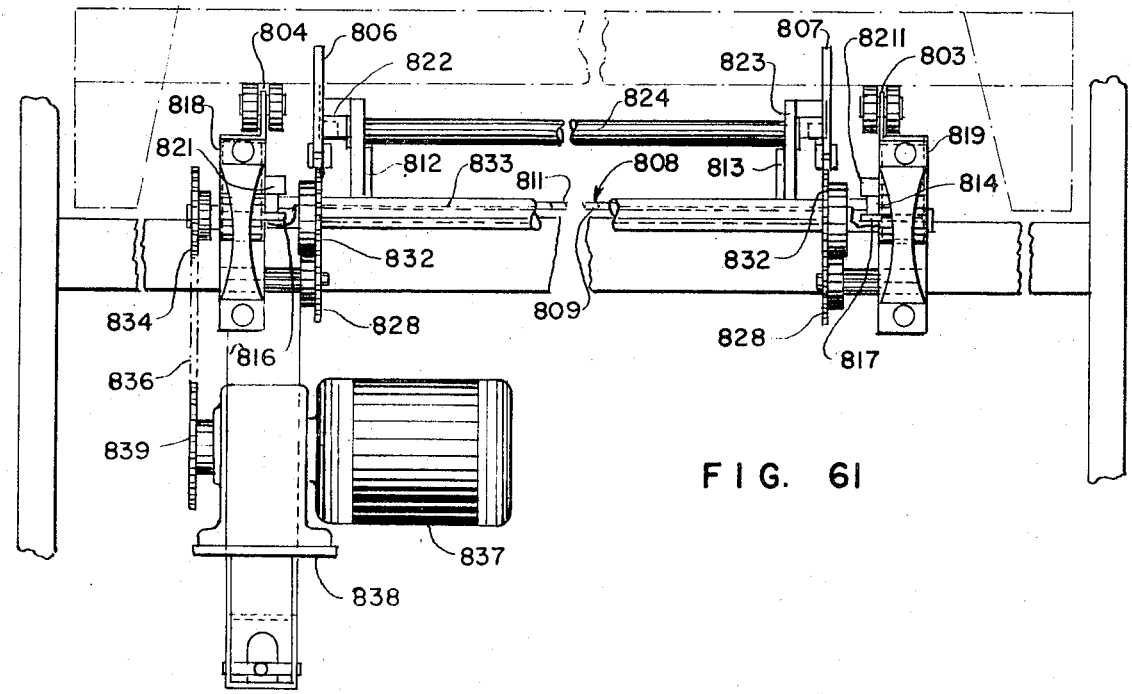
FIG. 61 is a view in end elevation of the upper portion of the stacking section shown in FIG. 60.
Figure 62:
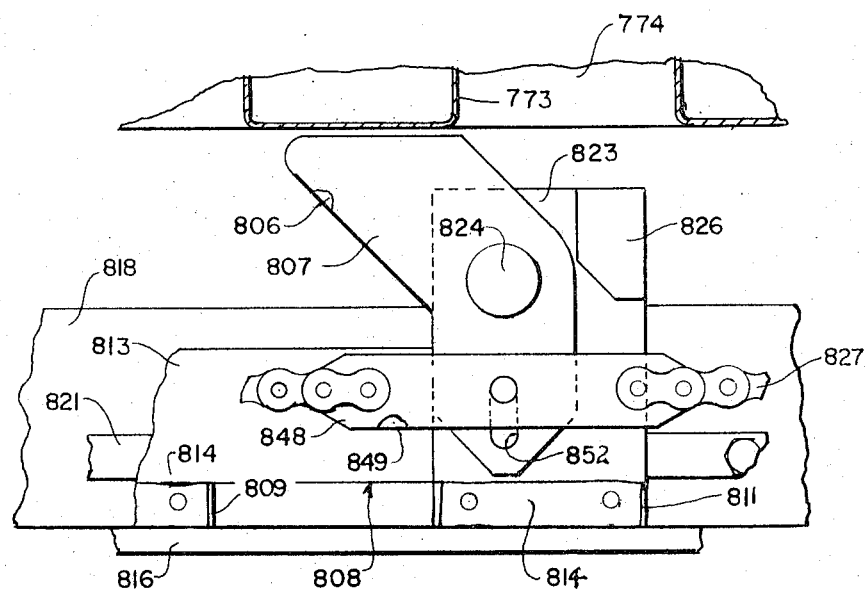
FIG. 62 is a fragmentary view in side elevation of the drag link and associated members showing the drag link in an intermediate position.
Figure 63:
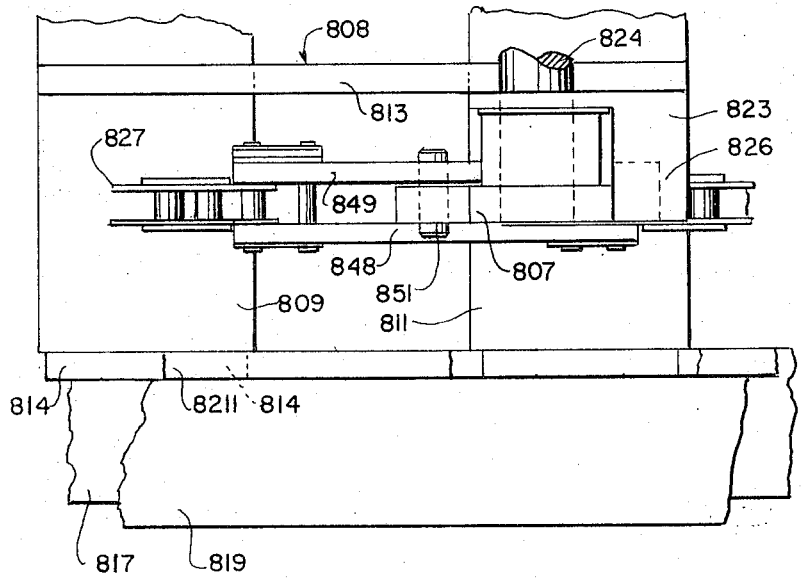
FIG. 63 is a fragmentary plan view of the drag link shown in FIG. 62 in elevated position.

The handling and advance of skids will be described with relation to the second stacking section 43 (FIG. 1). Skids are loaded onto the machine at the right hand end of the second stacking section 43 as shown in FIG. 50 and are placed on sloping roller conveyors 801 and 802 (FIG. 50) down which the skids roll onto horizontal roller conveyors 803 and 804 (FIG. 61). The skids are guided into position by side guides 805 (FIGS. 50 and 59) mounted on side frames 8051 and 8052. The skids are advanced along the horizontal roller conveyors 803 and 804 by drag links 806 and 807 (FIG. 61). The drag links 806 and 807 are pivotally mounted on a drag carriage 808 (FIG. 60) which moves back and forth along the horizontal roller conveyors 803 and 804. The drag carriage 808 includes transverse plates 809 (FIGS. 62 and 63) and 811 which are connected by lengthwise carriage frames 812 (FIG. 61) and 813 (FIGS. 62 and 63). Slide blocks 814 mounted on opposite ends of the transverse plates 809 and 811 run on track plates 816 and 817 carried by roller conveyor frames 818 and 819, respectively. Hold down rails 821 and 8211 mounted on the conveyor frames 818 and 819, respectively, hold the slide blocks on the track plates 816 and 817. Blocks 822 (FIG. 61) and 823 (FIGS. 62 and 63) mounted on the transverse plate 811 rotatably support a cross shaft 824 on which the drag links 806 and 807 are mounted. The blocks 822 and 823 carry stop bosses 826 which the drag links 806 and 807 engage when in an upright position shown in full lines in FIG. 60 and in FIG. 63. When the drag links are in upright position, the drag links can engage one of the cross bar member 773 of the skid 774. The drag links 806 and 807 can swing down to the position shown in FIG. 62 and to that shown in FIG. 60 in dot-dash lines at 807A at which the drag links are below the skid bars 773. The drag links 806 and 807 and the drag carriage 808 are advanced and retracted by drive chains 827 which runs on idle sprockets 828 (FIG. 60), 829 and 831 and on driven sprockets 832. The driven sprockets 832 are mounted on a cross shaft 833 which carries a sprocket 834 (FIG. 61) on which a short chain 836 runs. The short chain 836 is driven by a motor 837 mounted on a swinging table 838. The motor 837 drives a sprocket 839 on which the short chain 836 runs. The swinging table 838 is supported on an upright swinging frame 841 (FIG. 60) which is pivotally supported on a bracket 8411 carried by an upright cantilever frame 842. A tension spring 843 urges the swinging table 838 to the FIG. 60 position. When the drag carriage meets an obstruction, as when a skid is being advanced to the left as shown in FIG. 60 and the skid meets an obstruction which stops the skid, further driving of the motor 837 causes the swinging table 838 to swing clockwise as shown in FIG. 60. A switch operating crank 844 mounted on the upright swinging frame 841 engages a switch operator 846 of a limit switch 847 to actuate the limit switch 847 when the swinging table 838 swings upwardly. A similar action occurs when the drag carriage reaches the limit of its movement to the left as shown in FIG. 60. As will be explained in greater detail hereinafter, actuation of the limit switch 847 causes reverse of the drive of the motor 837.

Each of the chains 827 includes a pair of elongated links 848 and 849, as shown in FIGS. 62 and 63 which extend on opposite sides of the associated drag link, as shown in association with the drag link 807. The pair of elongated links 848–849 carry a transverse pin 851 which extends through a slot 852 in the drag link 807, as shown in FIG. 62. As the chains are drawn in a direction to retract the drag carriage, the drag links swing from the full line position shown at 807 in FIG. 60 through the FIG. 62 position to the dot-dash line position at which the drag link is indicated at 807A in FIG. 60. When the drag carriage reaches its fully retracted position, the transverse plate 811 engages a switch actuator 853 of a limit switch 854 which indicates that the drag carriage is fully retracted. When the chains 827 are advanced to the left, the drag links 806 and 807 swing back through the FIG. 62 position to the full line position of FIG. 60 at which the drag links can engage one of the bars 773 of the skid 774.

Figure 68:
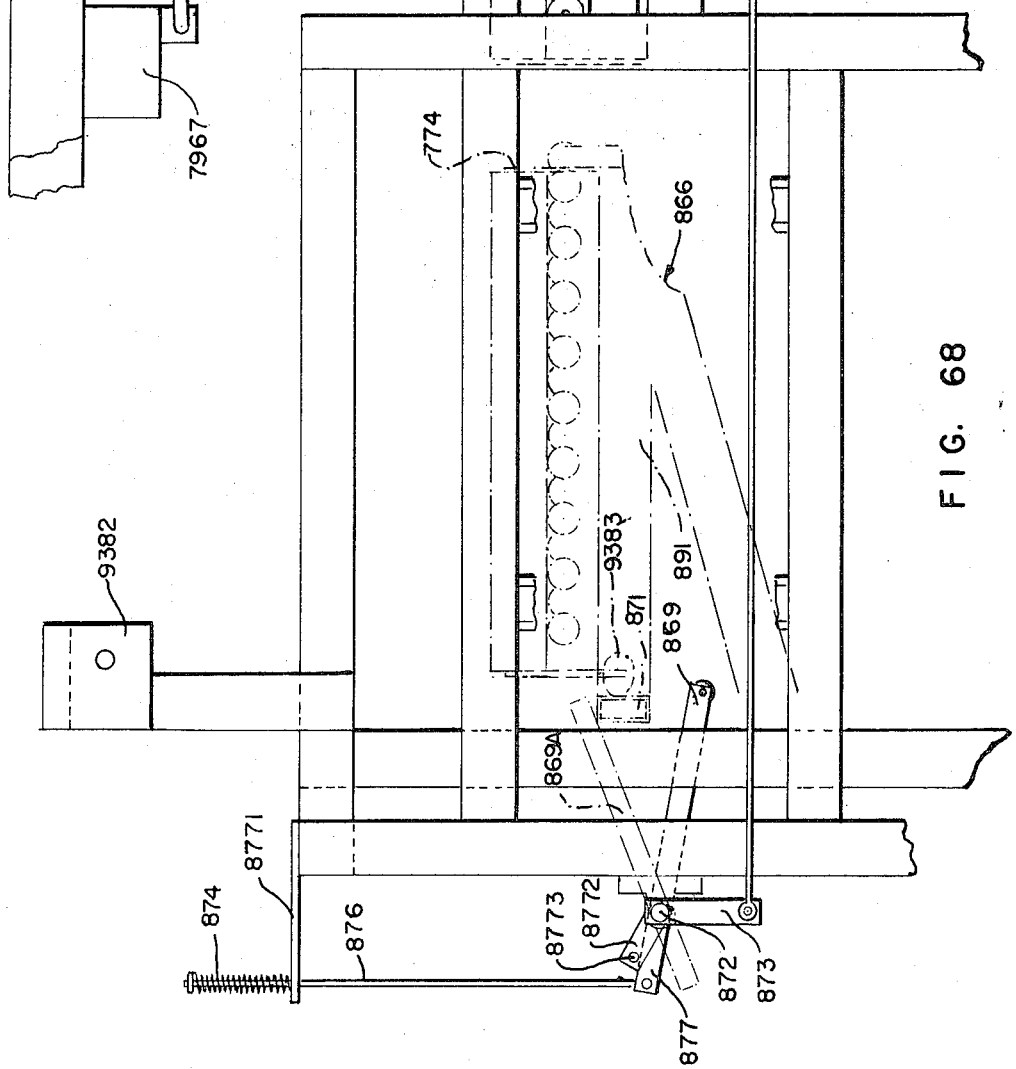
FIG. 68 is a fragmentary view in side elevation of the upper portion of the machine shown in FIGS. 64–67 showing a skid stop arrangement, the skid lift being shown in dot-dash lines in elevated position, a skid being shown held by the skid stop, other portions of the machine being omitted for clarity, a skid on the skid lift being shown in dot-dash lines.

When the skid reaches the position shown at 774M in FIG. 68, the skid can be arrested by skid stops 856, only one of which is shown, which are carried by a shaft 857 rotatably mounted in bearings (not shown)

mounted on frame elements 8571 and 8572. A stop member 858 mounted on the shaft 857 is provided with a stop pin 859 which engages the frame member 8571 to limit clockwise swinging of the skid stop 856 at the FIG. 68 position. The shaft 857 also carries a crank 861 to which a link 862 is pivotally connected. The shaft 857 and the skid stop 856 are normally held in the FIG. 68 position, at which trailing legs of a skid 774M are shown held thereby, but the skid stop 856 can swing downwardly out of engagement with the skid 774M when the skid is to be advanced further.

SKID LIFT

When the skid 774M (FIG. 68) is released from the stop member 856, the skid can travel onto a skid lift 866 (FIGS. 64 and 65) which runs up and down on upright rails 867 and 868. The stop member 856 is released by operation of a pivoted frame 869 (FIG. 68), which can be engaged by a cross frame 871 of the skid lift 866 when the skid lift is in the FIGS. 67 and 68 (dot-dash line) position. The frame 869 is pivotally mounted on a shaft 872 which carries a crank 873 pivotally connected to the link 862. When the skid lift 866 is lowered, a compression spring 874 mounted on a rod 876 pivotally connected to an extension 877 of the frame 869 and engaging a stationary frame 8771 urges the stop member to the FIG. 68 full line position. A crank 8772 mounted on the shaft 872 is provided with a pin 8773, which can rest on the extension 877. However, when the skid lift 866 is in the raised position shown in dot-dash lines in FIG. 68, the frame 869 is swung to the dot-dash line position shown at 869A, and the pin 8773 of the crank 8772 is released so that the skid stop 856 can swing out of engagement with trailing legs of the skid 774M.

Figure 64:
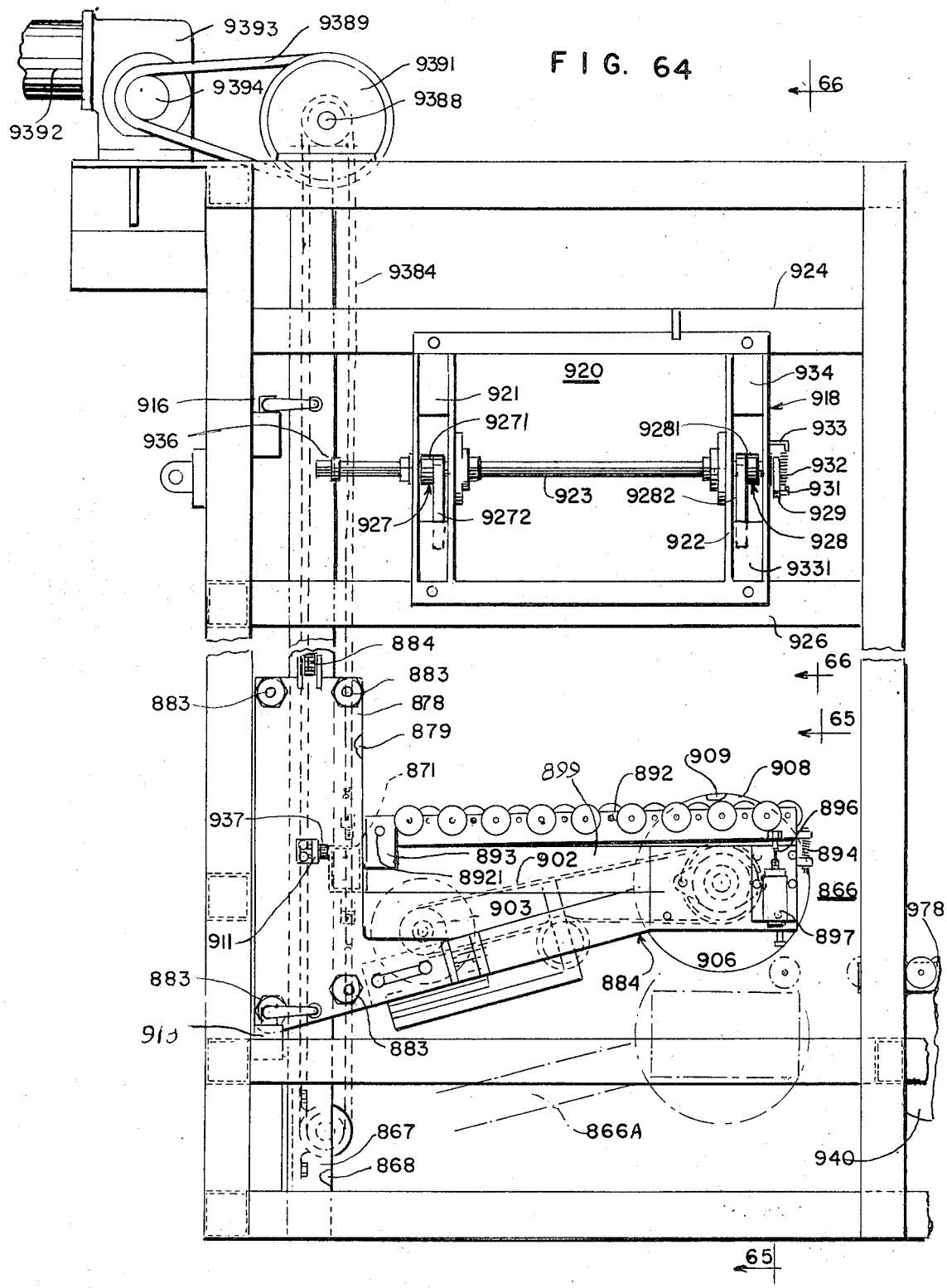
FIG. 64 is an enlarged fragmentary view in side elevation showing the left hand portion of the stacking section of the machine shown in FIG. 50.

As shown in FIGS. 64 and 65, the skid lift includes upright plates 878 and 879 mounted on opposite ends of the cross frame 871, which run adjacent outer sides of the upright rails 867 and 868, respectively. The plate 878 carries rollers 881 mounted on roller shafts 882 carried by mounting nuts 883. The rollers 881 run on opposite side faces of the rail 867. An upper roller 884 mounted on the plate 878 runs on an outer face of the rail 867. In similar fashion, the plate 879 carries rollers 886 (FIG. 65), which run on opposite side faces of the rail 868, and an upper roller 887, which runs on the outer face of the rail 868.

Figure 67:
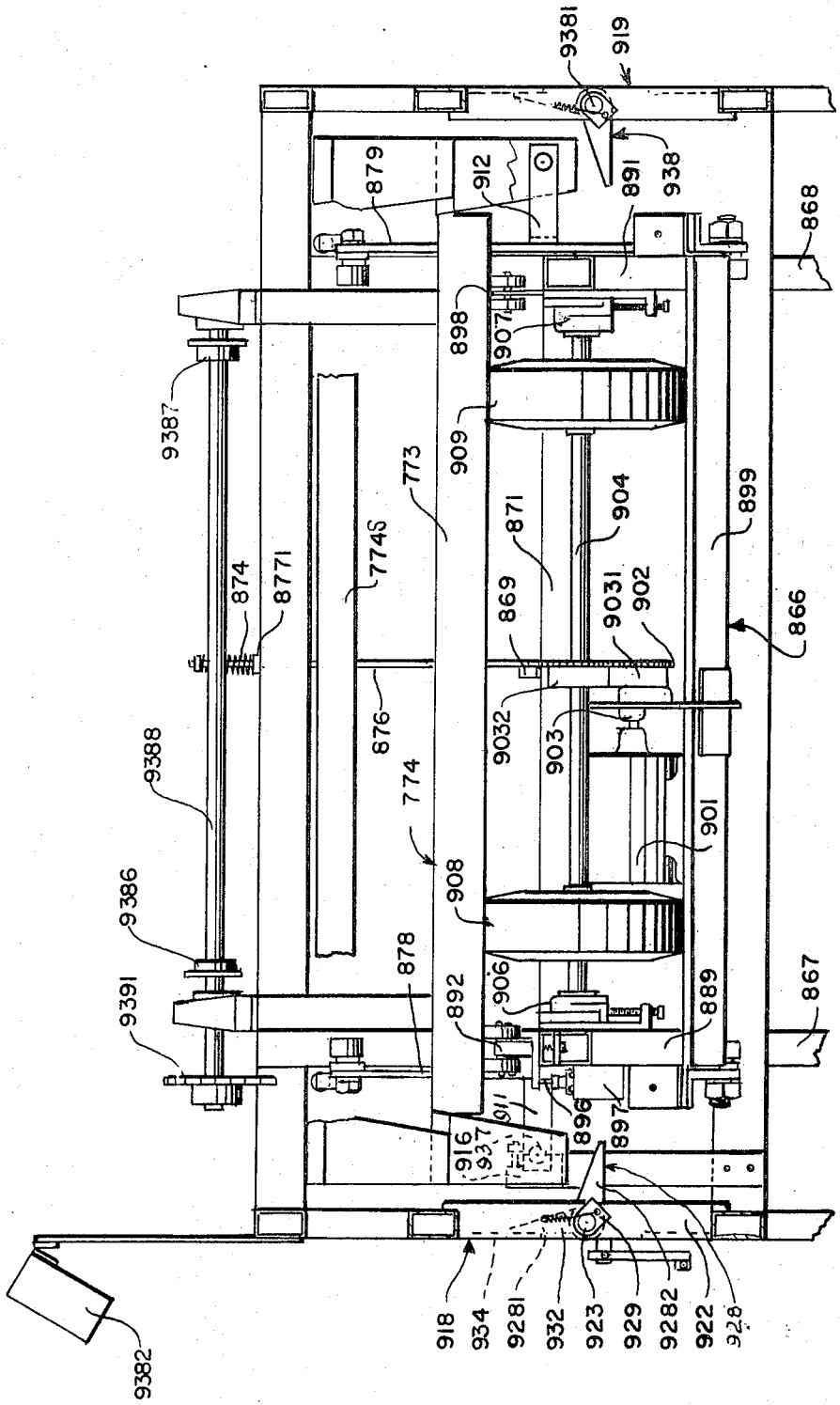
FIG. 67 is a view in section taken on the same line as FIG. 66 but showing a skid lift of the stacking section in elevated position.

The assembly of the upright plates 878 and 879 and the cross frame 871 support spaced cantilever frames 889 (FIGS. 64 and 65) and 891 (FIG. 65). A roller frame 892 is pivotally mounted above the cantilever frame 889. A pin 8921 (FIG. 64) supported on lugs 893 mounted on the cantilever frame 889 serves as the pivot for the roller frame 892. A compression spring 894 urges the roller frame 892 to the FIGS. 64 and 65 position. However, when the skid 774 (FIG. 67) is on the skid lift 866, the weight of the skid 774 causes the roller frame 892 to swing down to the FIG. 67 position at which a switch operator 896 carried by the roller frame 892 engages a push button of a limit switch 897 to signal that a skid or a stack of skids is carried on the skid lift 886. The cantilever frame 891 carries a second roller frame 898 (FIG. 67). The skid 774 is supported on rollers carried by the roller frames 892 and 898. A plate 899 spans the cantilever frames 889 and 891. A motor 901 carried on the plate 899 drives a chain 902. The chain 902 runs on a motor driven sprocket 903, an idle sprocket 9031 and a sprocket 9032 carried by a shaft 904 journalled in bearings 906 and 907 mounted on the cantilever frames 889 and 891, respectively. The shaft 904 carries wheels which can be equipped with pneumatic tires 908 and 909 which engage the underside of the bars 773 of the skid 774 to advance the skid onto and off of the skid lift 866.

The skid lift 866 carries outwardly extending escapement and limit switch operating members 911 and 912 which are mounted on and extend outwardly from the upright plates 878 and 879, respectively. The member 911 is constructed to engage switch operators of limit switches 913, 914 and 916 (FIG. 50). The member 911 engages the switch operator of the switch 913 when the skid lift 866 is at its lowermost position, as shown in dot-dash lines at 866A in FIG. 64. The member 912 engages the switch operator of the limit switch 916 when it is at its uppermost position as shown in FIG. 67. The member 912 engages the switch operator of the switch 914 (FIG. 50) when the skid lift 866 is at an intermediate position opposed to a roller conveyor 917.

As the skid lift 866 rises to the uppermost (FIG. 67) position, it actuates mechanism of escapement assemblies 918 and 919, which are similar in construction. Only the escapement assembly 918 will be described in detail. As shown in FIG. 64, the escapement assembly 918 includes a rectangular framework 920 including upright hollow frames 921 and 922 between which a horizontal shaft 923 is rotatably mounted. The framework 920 is mounted on horizontal frames 924 and 926. Double crank members 927 and 928 are mounted on the shaft 923 and swing inside the hollow frames 921 and 922, respectively. As shown in FIGS. 67 and 64, the double crank member 928 includes crank arms 9281 and 9282 which extend approximately at right angles to each other. The double crank member 927 (FIG. 64) includes similar crank arms 9271 and 9272. A short crank arm 929 mounted on the rod 923 carries a pin 931 to which one end of a tension spring 932 is attached. The other end of the tension spring 932 is attached to a pin 933 mounted on the upright frame 922. The spring 932 urges the short crank 929 and the shaft 923 to the FIG. 66 and FIG. 67 positions. At the FIG. 66 position, the crank arm 9282 engages a stop wall portion 9331 of the upright frame 922. At the FIG. 67 position, the crank arm 9281 engages a stop wall portion 934 of the upright frame 922. A crank arm 936 (FIG. 64) mounted on the shaft 923 is engaged by a roller 937 mounted on the escapement and limit switch operator member 911 as the skid lift 866 rises to the FIG. 6 position to swing the shaft 923 and crank arms carried thereby to the FIG. 67 position. In a similar fashion, double crank members 938 carried by a shaft 9381 of the escapement assembly 919 are swung to the FIG. 67 position. When a stack of skids 774–774S has been advanced onto the skid lift 866 and the skid lift moves downwardly to one of its lower positions, the lowermost skid 774 engages the crank arm 9282 and other similar crank arms of the escapement assemblies and swings the shafts 923 and 9381 and the crank arms carried thereby from the FIG. 67 position to the FIG. 66 position at which skids 774S and 774T are shown supported by the escapement assemblies. Thus, the lowermost skid of the stack on the skid lift travels downwardly on the skid lift but the remaining skids are held by the escapement assemblies until the skid lift has discharged the skid on it and has returned upwardly to the FIG. 67 position to pick up another of the stack of skids.

When the skid lift is at its uppermost position, and there is no skid on the skid lift, a light beam from a photo-cell unit 9382 (FIG. 68) reaches a target 9383 mounted on the skid lift frame 891. When a skid is fully on the skid lift, this light beam is broken.

The skid lift moves to the intermediate position at which the limit switch 914 (FIG. 50) is actuated. If a skid is called for at the middle level but no skid is called for at the lower level, the skid is discharged at the middle level. If, on the other hand a skid is called for at the lower level, the skid lift progresses downwardly to the position at which the limit switch 913 is actuated and the skid is discharged there.

The skid lift 866 is supported by chains 9384 and 9385 (FIG. 65) attached to the cross frame 871. The chains 9384 and 9385 run on sprockets 9386 (FIG. 67) and 9387 carried by a shaft 9388. A drive chain 9389 (FIG. 64) runs on a drive sprocket 9391 carried by the shaft 9388. A motor 9392 drives gearing (not shown in detail) in a gear box 9393 to drive a sprocket 9394 on which the drive chain 9389 runs so that the motor 9392 operates to raise and lower the skid lift 866.

SKID CONVEYOR

The skid is discharged by action of the tires 908 and 909 which are turned by the motor 901 (FIG. 67). As already indicated, the skid can be discharged at either the intermediate level or at lowermost level. Since both levels include similar units, only the units of the lower level will be described in detail. The tires 908 and 909 advance the skid until the skid is received on a pair of tires 940 (FIG. 50) and 941 (FIG. 70) carried by wheels mounted on a shaft 942.

The shaft 942 and a shaft 943, which carries wheels on which pneumatic tires 944 and 946 are mounted, are connected to be turned in unison by a chain 947, which runs on sprockets 948 and 949 carried by the shafts 942 and 943, respectively. The shafts 942 and 943 are driven by a motor 951 which drives gearing (not shown) in a gear box 952 to drive a sprocket 953. A chain 954 runs on the sprocket 953 and on a sprocket 956 carried by a shaft 9561. The shaft 9561 carries a sprocket 9562 on which a chain 9563 runs. The chain 9563 also runs on a sprocket 9564 carried by a shaft 957. The sprocket 9564 includes a one-way clutch mechanism (not shown in detail) so that the shaft 957 is driven in a clockwise direction (FIG. 69) when the shaft 9561 is driven clockwise but the shaft 957 is not driven when the shaft 9561 turns counter-clockwise. The shaft 957 carries wheels on which pneumatic tires 958 (FIG. 70) and 959 are mounted. An overrunning clutch 961 mounted on the shaft 957 restrains the shaft 957 so that, the shaft 957 turns only in the direction in which it is driven by the motor 951. A sprocket 967 mounted on the shaft 9561 drives a chain 968, which runs on a sprocket 9681 carried by a shaft 969, so that the shafts 9561 and 969 turn in unison. A drive chain 971 runs on sprockets 972 and 973 mounted on the shafts 969 and 942, respectively, to drive the shaft 942 clockwise as shown in FIG. 69 when the shaft 969 is driven clockwise.

Figure 71:
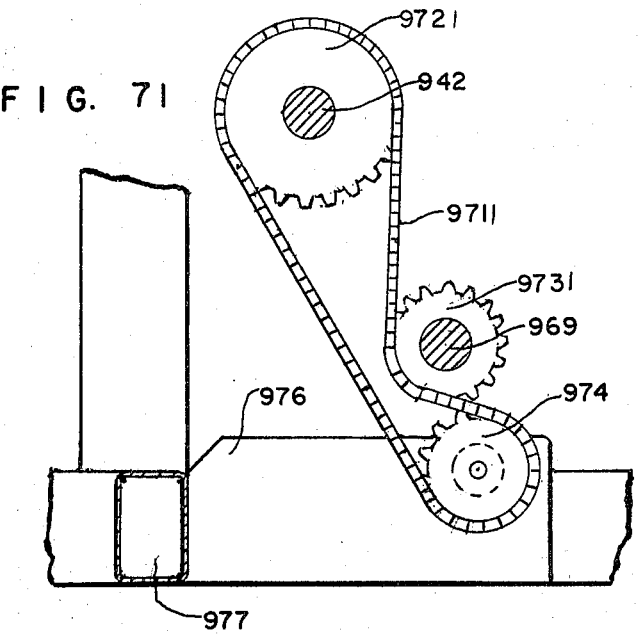
FIG. 71 is an enlarged view in section taken on the line 71—71 in FIG. 70.

The sprocket 973 includes a one-way clutch mechanism (not shown in detail) so that the sprocket 973 drives the shaft 942 when the shaft 969 is turned clockwise, as shown in FIG. 69, but the sprocket 973 does not drive the shaft 942 when the shaft 969 turns counter-clockwise. As shown in FIG. 71, a chain 9711 runs on a sprocket 9721 carried by the shaft 942 and under a sprocket 973 carried by the shaft 969 so that the shaft 942 is turned clockwise when the shaft 969 is turned counter-clockwise. The chain 9711 also runs around an idle sprocket 974 rotatably carried by a plate 976 mounted on a cross frame 977. The sprocket 9721 also includes a one-way clutch mechanism (not shown in detail) so that the shaft 942 is driven in a clockwise direction when the shaft 969 turns counter-clockwise, but the shaft 942 is not driven by the chain 9711 when the shaft 969 turns clockwise. By this construction, the shafts 942 and 943 and tires carried thereby are turned clockwise as shown in FIG. 69 when the motor 951 is driven in a forward direction and also when the motor 951 is driven in a reverse direction. However, the shaft 957 and tires carried thereby is driven clockwise only when the motor 951 is driven forward, and the shaft 957 is stationary when the motor 951 is driven in reverse.

As the skid is advanced off the skid lift 866 (FIG. 64), the skid advances onto roller conveyors 978 and 9781 (FIG. 70) and onto the tires 940 and 941 (FIG. 70) which advance the skid onto the tires 944 and 946. As shown in FIG. 69, the tires normally extend above upper edges of the rollers of the roller conveyors, but the weight of the skid causes the upper portions of the tires to be deformed downwardly so that the skids are supported both by the roller conveyor and the tires. The tires 944 and 946 advance the skid into a light beam between a photo-cell unit 979 and a target 981 (FIG. 70) to break the light beam to indicate that the skid has reached a position ahead of a transfer conveyor 671A. A similar photo-cell unit 979D and target 981D are shown in FIG. 54 in association with the transfer conveyor assembly 671. The skid is further advanced until a trailing leg 779A (FIG. 70) of the skid engages a switch operator 982 of a limit switch 983, which stops the motor 951 with the skid 774 at a first loading position. A skid at a first loading position of the first stacking section 42 is shown in FIG. 53, a similar limit switch operator being shown at 982A. Then, when the skid is half loaded, the tires 944 and 946 (FIG. 70) advance the skid to a second loading position, at which the trailing leg is shown at 779AA in FIG. 70, to engage a switch operator 984 of a limit switch 986 to stop the motor 951 with the skid at the second loading station. A skid is shown at the second loading station of the first stacking section 42 in FIG. 52, a similar limit switch operator being shown at 984A. When a full load of stacks of carton blanks has been placed on the skid, the tires 958 and 959 (FIG. 70) advance the skid away from the transfer belt conveyor assembly 671A and onto tires 987 and 988 carried by wheels mounted on a shaft 989. As the skid leaves the transfer belt conveyor assembly 671A, it passes onto roller conveyors 990 and 9901, some of the rollers of which have been omitted in FIG. 70 for clarity.

The shaft 989 and a shaft 991, which carries a single wheel equipped with a single tire 992, are connected to turn together by a chain 993. The chain 993 runs on sprockets 994 and 996 mounted on the shafts 989 and 991, respectively. A motor 997 drives gearing (not shown) in a gear box 998 to drive a chain 999, which runs on a sprocket 1000 mounted on the shaft 991 to drive the shafts 989 and 991. The sprocket 1000 can include a one-way clutch mechanism, not shown in detail, which permits skid advance even if the motor 997 is not energized. Normally the skid is advanced in this portion of the machine by action of the motor 997. As the skid advances, the skid reaches a stage at which a leading leg 779B of the skid engages a switch operator 1001 of a limit switch 1002 at which stage the skid can be arrested until it can be discharged. Finally, the skid reaches a stage at which the leading leg is indicated at 779BB engaging a pivotally mounted discharge gate 1003, which carries a crank 1004. The crank 1004 engages a switch operator 1006 of a limit switch 1007 to stop advance of the motor 997 when the skid is at the discharge position. A compression spring 1008 urges the gate 1003 into position for engagement by the skid. Frame guides 1009 mounted on the machine framework are provided to guide arms of a fork lift or the like (not shown) used in removing the loaded skid from the machine.

OPERATION — GENERAL

Figure 73:
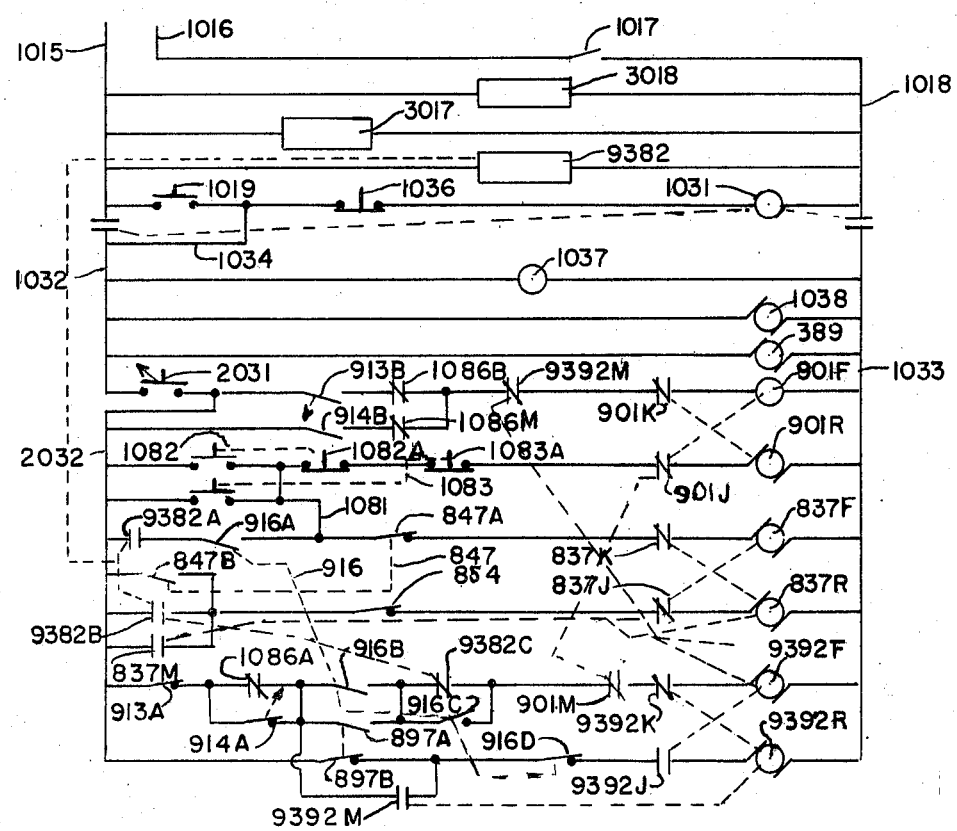
FIG. 73 is a schematic view of electrical connections of the entry table section of the machine and of a skid drag portion of one stacking section of the machine.
Figure 74:
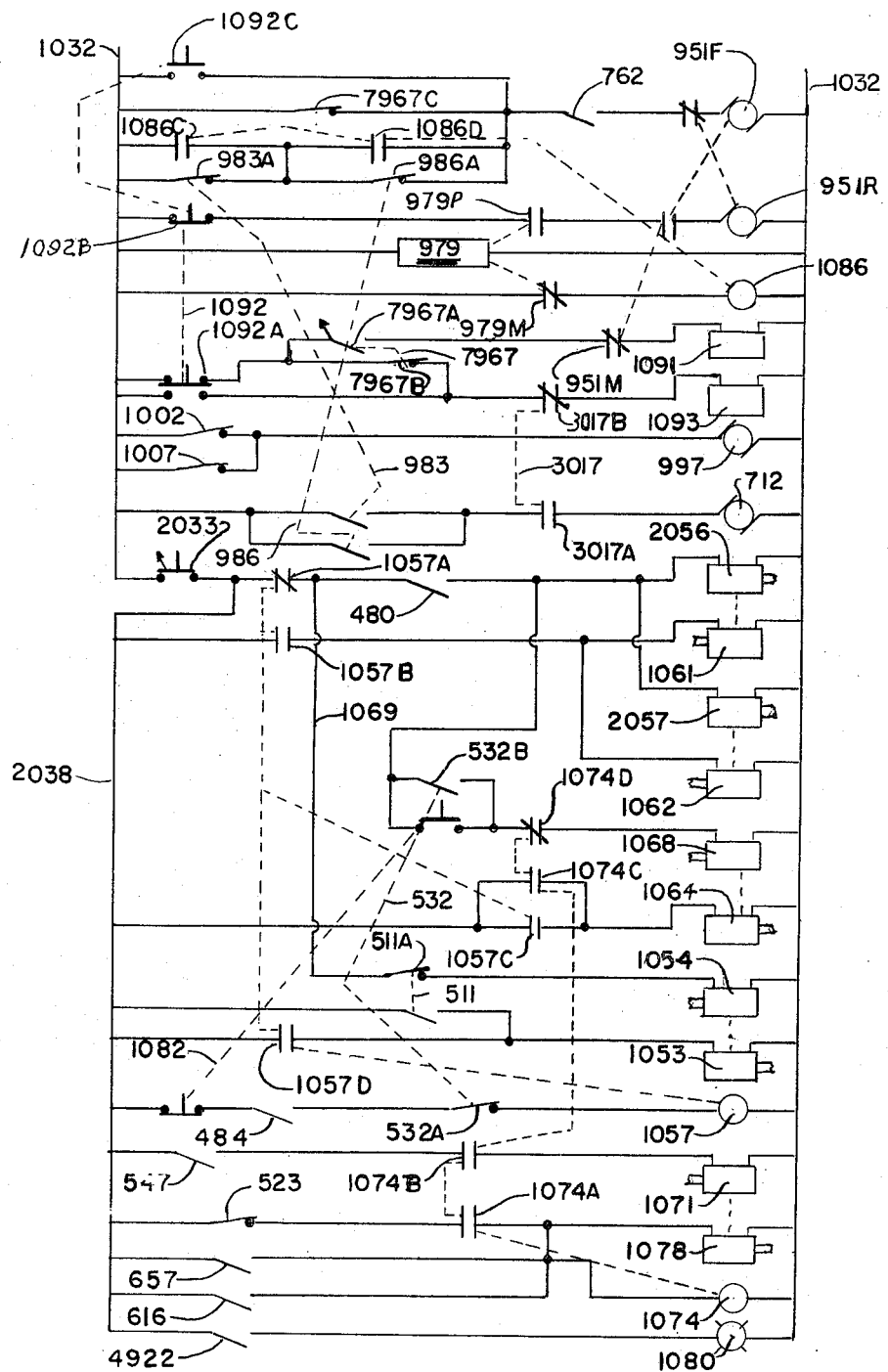
FIG. 74 is a schematic view of electrical connections of one level of one stacking section and of hopper portions associated therewith.

The operation of the machine will now be described by reference to FIG. 72, which shows hydraulic connections of the lower hopper portion of the second stacking section of the machine and of a conveyor drive for the second stacking section and FIGS. 73 and 74, which show electrical connections. FIG. 73 shows electrical connections for the entry table section of the machine and for a skid drag portion of the second stacking section 43 (FIG. 1). FIG. 74 shows electric connections for the lower hopper portion of the second stacking section and associated skid advancing structures.

Figure 72:
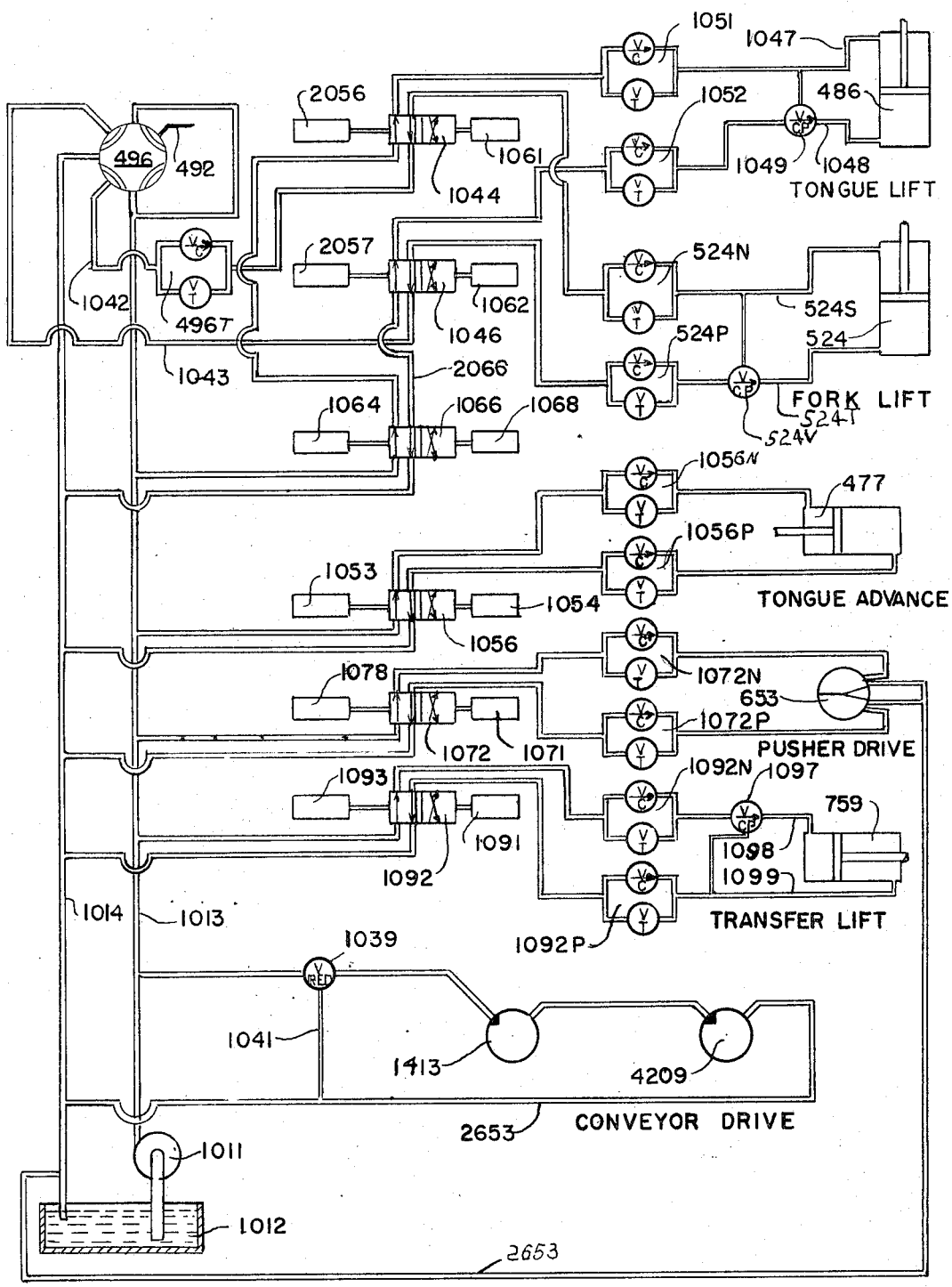
FIG. 72 is a schematic view of hydraulic connections of one stacking section of the machine.

As shown in FIG. 72, an appropriate pump 1011 draws hydraulic fluid from a tank 1012 and directs the fluid under pressure into a pressure line 1013. Fluid returns to the tank 1012 through a return line 1014. As shown in FIG. 73, electric power is supplied by main leads 1015–1016. A main on-off switch 1017 connects a lead 1018 to the power lead 1016.

In the description of the machine, reference will be made to various operating parts of the machine which have already been described and, throughout the description of the operation, reference will be to the lower hopper section of the second stacking section 43 and associated parts of the second stacking section. However, reference will be made to numerals identifying equivalent operating parts of other sections of the machine which have been described in the detailed description of operating parts when particular elements of the lower hopper section have not been separately described.

When the main on-off switch 1017 has been closed, the lower stack sensing photo-cell unit 3017 (FIG. 50) and a similar middle level stack sensing unit 3018 (FIG. 73) are energized. In addition, the skid sensing unit 9382 (FIGS. 67 and 68), which senses the presence of a skid on the skid lift 866 when the skid lift is at its uppermost position, is energized. Other electric circuits of the machine are activated by closing of a push button switch 1019 which energizes a first control relay 1031 to cause closing of contacts thereof connecting the main lead 1015 to a power lead 1032 and connecting the lead 1018 to a power lead 1033. The first control relay 1031 remains energized by a lead 1034 connected to the power lead 1032 until a push button switch 1036 is opened to deenergized the first control relay 1031 and deenergize the power leads 1032 and 1033. A warning lamp 1037 is lighted when the first control relay 1031 is energized. In addition, when the first control relay 1031 is energized, a motor 1038, which drives the blower 274 (FIG. 2) is energized and the motor 389 (FIGS. 23 and 24) is also energized to drive the conveyor assemblies 351 and 352. When the machine is set in operation, an on-off switch 2031 (FIG. 73) is closed to connect a skid drag power line 2032 to the power lead 1032 and an off-on switch 2033 (FIG. 74) is closed to connect a hopper power lead 2034 to the power lead 1032.

OPERATION — CARTON BLANK DELIVERY

As already pointed out, conveyors of the entry table section of the machine are powered by the printing press. The master orbit motor-pump unit 1413 (FIG. 4) is also powered by the printing press. As shown in FIG. 72, the master orbit motor-pump unit 1413 is supplied fluid under pressure from the pressure line 1013 through a pressure reducing valve 1039. A pressure bleeding line 1041 connects the pressure reducing valve 1039 to the return line 1014. The slave orbit pump-motor unit 4209 FIGS. 25 and 72) is supplied with fluid under pressure by the master unit 1413 so that the units 1413 and 4209 are driven at the same rate, and the bin conveyor belt 298 (FIG. 22) is driven in timed relation to entry table conveyors.

When the machine is in operation, carton blanks are continuously delivered by the lower conveyor assembly between the belts 4411 and 4421 (FIG. 32). As shown in FIG. 37, the stack 499 of carton blanks builds up under the roller 491 causing upward swinging of the rocker frame 492, actuating the control valve 496. As shown in FIG. 72, when the rocker frame 492 swings upwardly, the valve 496 swings counter-clockwise to connect a line 1042 to the pressure line 1013 and to connect a line 1043 to the return line 1014.

In FIG. 37, the partial stack 499 is shown on the tongue member 476. At that position, solenoid operated detent valves 1044 and 1046 are in their alternate positions, i.e., the position not shown in FIG. 72. When the rocker frame swings upwardly, fluid under pressure is introduced into the upper end of the cylinder 486 (FIGS. 30 and 31) through a line 1047 (FIG. 72) to cause lowering of the tongue supporting assembly 449 (FIGS. 30 and 31) as required to maintain the upper level of the stack 499 (FIG. 37) substantially constant. A line 1048 (FIG. 72) connected to the lower end of the cylinder 486 is connected to the return line 1014 during this operation. If the tongue supporting assembly is lowered further than is necessary to maintain the level of the carton blanks, the rocker frame 492 can swing downwardly connecting the line 1048 to the pressure line 1013 and connecting the line 1047 to the return line 1014 to cause raising of the tongue supporting assembly 449 as required to maintain a substantially constant level at the top of the stack 499 (FIG. 37). A pressure controlled check valve 1049 (FIG. 72) in the line 1048 prevents downward movement of the tongue supporting assembly except when a positive pressure is set up in the line 1047. Throttle-check valve units 1051 and 1052 in the lines 1047 and 1048, respectively, permit control of the maximum rate of advance of the tongue supporting assembly.

When the tongue supporting assembly has been lowered to the position at which the tongue 476 is shown in full lines in FIG. 38, the switch operator 509 of the limit switch 511 (FIGS. 34 and 35) is engaged by the tongue supporting assembly 449 and the limit switch 511 is actuated to energize a solenoid 1053 (FIG. 74) and deenergize a solenoid 1054 causing movement of a detent valve 1056 (FIG. 72) to its alternate position to introduce fluid into the right hand end of the cylinder 477 and withdraw fluid from the left hand end of the cylinder 477 (FIG. 34) to cause withdrawal of the tongue 476 from below the stack 499 (FIG. 38).

As the tongue 476 starts to retract, the switch operator 479 of the limit switch 480 is released and the limit switch 480 opens deenergizing solenoids 2056 and 2057 of the valves 1044 (FIG. 72) and 1046, respectively. When the tongue 476 (FIG. 36) is fully retracted, the flexible cable 482 actuates the switch operator 483 of the limit switch 484 to operate the switch 484. Operation of the switch 484 (FIG. 74) energizes a second control relay 1057 to open contacts 1057A thereof preventing energization of the solenoids 2056 and 2057 and closing contacts 1057B thereof energizing solenoids 1061 and 1062 of the valves 1044 (FIG. 72) and 1046, respectively, to cause the valves 1044 and 1046 to move to the position shown in FIG. 72. When the valves 1044 and 1046 are in position, the control valve 496, as the rocker frame 492 is raised by build-up of the stack of carton blanks, admits fluid under pressure into the upper end of the cylinder 524 and permits withdrawal of fluid from the lower end of the cylinder 524 so that the fork assembly 522 (FIG. 38) is lowered at a rate to continue to maintain the upper level of the stack 499 constant as the stack builds up. Contacts 1057C (FIG. 74) of the second control relay 1057 energize a solenoid 1064 of a valve 1066 (FIG. 72) to move the valve 1066 to its other position at which fluid under pressure is introduced into the lower end of the cylinder 486 via lines 2066 and 1048 and fluid is removed from the upper end of the cylinder 486 to raise the tongue supporting assembly 449 (FIG. 31) rapidly to its uppermost position. Contacts 1057D (FIG. 74) of the second control relay 1057 provide a hold-in circuit for the solenoid 1053 until the second control relay 1057 is released even after the limit switch 511 (FIGS. 34 and 35) is released.

The stack continues to build up on the flanges 503–504 (FIG. 38) of the fork assembly 522 until a stack of a predetermined height has been accumulated. Then, the lower edge of the chain anchor plate 521 of the fork assembly 522 engages the switch operator 531 (FIG. 41) of the limit switch 532. Actuation of the limit switch 532 opens contacts 532A (FIG. 74) thereof to deenergize the second control relay 1057 and closes contacts 532B thereof to energize a solenoid 1068 of the valve 1066 (FIG. 72) to return the valve 1066 to the position shown. Deenergization of the second control relay 1057 causes closing of the contacts 1057A thereof to energize a lead 1069 and opening of contacts 1057B thereof to deenergize the solenoids 1061 and 1062. The lead 1069 energizes the solenoid 1054 through normally closed contacts 511A of the limit switch 511 (FIG. 34) to move the valve 1056 (FIG. 72) to the position shown at which pressure introduced into the left hand end of the cylinder 477 causes advance of the tongue 476 to the extended position to start pick up of a new stack of carton blanks. When the tongue has completed its advance, the limit switch 480 (FIG. 34) is actuated to complete a circuit from the lead 1069 (FIG. 74) to the solenoids 2056 and 2057 which return the valves 1044 and 1046 to the alternate positions of FIG. 72 at which fluid under pressure is introduced into the upper end of the fork cylinder 524 and the lower end of the fork cylinder 524 is connected to the return line 1014 to provide rapid lowering of the fork assembly 522 (FIGS. 38 and 39) to its lowermost position.

When the fork assembly 522 reaches its lowermost position, if the reject conveyor 557 (FIG. 40) is not raised, the lower end of the upright rod 549 engages the switch operator 554 of the limit switch 547 to close the switch contacts thereof energizing a solenoid 1071 (FIG. 74) to advance a detent valve 1072 to the position shown in FIG. 72 at which fluid under pressure drives the hydraulic rotary cylinder 653 (FIG. 44) in a direction to advance the pusher members 631 and 633 toward the transfer belt conveyors 658 and 659. A fluid bleeding line 2653 connects the motor 653 with the fluid return line 1014. The stack advances into and breaks a light beam between the stack sensing photocell unit 3017 (FIG. 50) and a target 1076 (FIGS. 50 and 54). Breaking of this light beam permits closing of contacts 3017A (FIG. 74) to energize the transfer belt driving motor 712 (FIG. 52) when one of the limit switches 983 and 986 (FIG. 69) is activated by a skid at one of the loading positions. The transfer belts continue to advance until the light beam of the photo-cell unit 3017 is again completed and the contacts 3017A open as the stack completes passage through the light beam. The pusher solenoid 1071 remains energized until activation of the limit switch 657 signifies that a push has been completed. The switch 657 acts to complete a circuit to activate a third control relay 1074 (FIG. 74). Energizing of the third control relay 1074 closes contacts 1074A thereof which energize a hold-in circuit for the third control relay 1074 including contacts of the limit switch 523 (FIG. 38), which is opened when the fork assembly 522 is at its uppermost position, and the third control relay 1074 remains energized until the fork assembly reaches its uppermost position. The contacts 1074A also energize a solenoid 1078 which returns the valve 1072 to its alternate position as shown in FIG. 72 causing retraction of the pusher members. Contacts 1074B (FIG. 74) of the limit switch 1074 are opened to deenergize the solenoid 1071. Contacts 1074C close to energize the solenoid 1064 and contacts 1074D open to deenergize the solenoid 1068 so that the valve 1066 is returned to its alternate position in which pressure is introduced into the lower end of the fork cylinder 524 and fluid returns from the upper end of the fork cylinder 524 so that the fork assembly 522 is rapidly raised to the FIG. 38 position for receiving the next stack. When the fork assembly reaches its uppermost position, the switch 523 is actuated to deenergize the hold-in circuit for the third control relay 1074 (FIG. 74) permitting the third control relay 1074 to open.

If, through some malfunction, there is an excessive buildup of carbon blanks in the hopper section below the roller 491 (FIG. 37), the rocker frame 492 can swing sufficiently to engage the push button 4921 of the limit switch 4922 to energize an alarm 1080 (FIG. 74) which can include an appropriate bell, lamp, or other warning device.

In the event that a stack or partial stack is misformed or must be discarded for some other reason, as at the beginning or end of a run, the reject conveyor 557 (FIG. 46) is raised to cause discharge thereof. As the rejected stack passes along the reject conveyor 557 and the reject conveyor returns to its lowered position, the switch actuator 614 of the limit switch 616 is actuated to energize the third control relay 1074 (FIG. 74) to permit return upward of the fork assembly without completion of a push.

If it is desired to discharge a partial stack carried by the fork assembly before the height of the stack has become sufficient that the switch 532 is actuated, a stack reject switch 1082 can be actuated to complete a circuit to the solenoid 1068 starting rapid downward movement of the fork assembly and causing release of the second control relay 1057. The reject conveyor 557 (FIG. 46) can be raised to cause discharge of the partial stack without the partial stack being advanced onto a skid.

OPERATION — SKID DELIVERY

As already pointed out, empty skids are placed on the sloping roller conveyors 801 and 802 (FIG. 50) and roll down onto the horizontal roller conveyors 803 and 804 along which the skids are advanced by the drag links 806 and 807. The drag links are advanced and retracted by the motor 837 (FIGS. 60 and 61), which includes a forward winding 837F (FIG. 73) and a reverse winding 837R. The forward winding 837F advances the drag links toward the skid lift 866 (FIG. 50) and the reverse winding 837R (FIG. 73) retracts the drag links from the skid lift.

Operation of the winding 837F is controlled in part by the photo-cell unit 9382 (FIGS. 67 and 68) which projects a light beam toward the target 9383 (FIG. 68) on the skid lift 866. This light beam is unbroken when the skid lift 866 is at its uppermost position and no skid is fully on the skid lift 866. When the limit switch 916 (FIG. 50) is actuated indicating that the skid lift is at its uppermost position and the light beam of the photo-cell unit 9382 is unbroken, contacts 916A (FIG. 73) of the limit switch 916 are closed and contacts 9382A of the photo-cell unit 9382 are also closed to energize the winding 837F causing the drag links to be advanced toward the skid lift until the limit switch 847 (FIG. 60) is actuated to open contacts 847A (FIG. 73) thereof indicating that the drag links have been advanced to the limit of their movement toward the skid lift. When the limit switch 847 is actuated, contacts 847B thereof close to energize the reverse winding 837R causing retraction of the drag links until contacts of the limit switch 854 (FIG. 60) are opened indicating the drag links have reached the limit of their movement away from the skid lift. The windings 837F and 837R are provided with interlocking motor relay contacts 837J and 837K, respectively, preventing energizing of one of these windings when the other of these windings is energized. A hold-in circuit for the winding 837R is provided by motor relay contacts 837M, which prevent deenergization of the reverse winding 837R until the switch 854 is actuated. Contacts 9382B of the photo-cell unit 9382 energize the reverse winding 837R when a skid breaks the light beam of the photo-cell unit 9382.

The drag links advance the first skid or stack of skids on the roller conveyors 803 (FIG. 50) and 804 (FIG. 61) onto the tires 908 and 909 (FIGS. 64 and 67) of the skid lift 866. The skid lift conveyor motor 901 includes a reverse winding 901R (FIG. 73), which turns the tires 908 and 909 in a direction to advance a skid or a group of skids onto the skid lift and a forward winding 901F which turns the tires in a direction to move the skid from the skid lift. The reverse winding 901R is energized by a circuit including the photo-cell contacts 9382A, the contacts 916A of the limit switch 916 (FIG. 50) a line 1081 (FIG. 73), and normally closed contacts 1082A and 1083A of push button manual drag operating switches 1082 and 1083. The reverse winding 901R advances the skid or stack of skids onto the skid lift 866 until the light beam of the photo-cell unit 9382 is broken to open the contacts 9382A. The winding 901F and 901R of the skid lift conveyor motor include interlocking motor relay contacts 901J and 901K, respectively, which prevent energizing of one of these windings when the other of these windings is energized.

As already pointed out, the motor 9392 (FIG. 50) raises and lowers the skid lift 866. The motor 9392 includes a winding 9392F (FIG. 73) which powers the skid lift for downward movement and a winding 9392R which powers the skid lift for upward movement. Operation of the winding 9392F is controlled in part by a fourth control relay 1086 (FIG. 74). The fourth control relay 1086, in turn, is controlled by the photo-cell unit 979 (FIG. 54). The photo-cell unit 979 and the target 981 (FIGS. 54 and 69) thereof are disposed on opposite sides of the path of the skid just ahead of the transfer conveyor assembly 671A (FIG. 69). When a skid breaks the light beam of the photo-cell unit 979, contacts 979M (FIG. 74) thereof close to energize the fourth control relay 1086. The lift downward winding 9392F (FIG. 73) of the motor 9392 is energized by a circuit which includes normally closed contacts 913A of the lift down limit switch 913 (FIG. 50), normally closed contacts 1086A (FIG. 73) of the fourth control relay 1086 and normally closed contacts 914A of the lift middle level limit switch 914 (FIG. 50) (which are mounted in parallel), normally open contacts 916B (FIG. 73) of the lift top level limit switch 916 (FIG. 50) and normally open contacts 897A (FIG. 73) of the lift on skid limit switch 897 (FIG. 64) (which are mounted in parallel), normally closed contacts 9382C of the photo-cell unit 9382 and normally closed motor relay contacts 901M of the onto lift conveyor motor winding 901F.

In normal operation of the machine, once a skid or a stack of skids has been advanced onto the skid lift to cause the swinging roller frame 892 (FIG. 64) to swing downwardly actuating the limit switch 897 to close the contacts 897A (FIG. 73) thereof and the skid has been advanced onto the skid lift sufficiently to permit breaking of the beam to the photo-cell unit 9382 so that the contacts 9382C thereof close, the skid lift descends carrying one skid therewith and leaving the other skids of the stack on the escapement assemblies 918 and 919 (FIG. 66). The skid lift descends to the middle level at which the switch contacts 914A (FIG. 73) open, and the skid lift stops at the middle level unless the switch contacts 1086A of the fourth control relay at the lower level are closed indicating that a skid is needed at the lower level. If so, the skid lift continues downwardly until the limit switch 913 is actuated to open contacts 913A and stop the skid lift at the lower level.

As the skid lift starts to descend, the skid stops 856 (FIG. 68) swing upwardly into a position at which the step can catch trailing legs of the next following skid to hold the next following skid 774M against further advance until the skid lift has returned to its uppermost position. The lift conveyor motor 901 (FIG. 65) advances the skid substantially faster than the drag links 806 and 807 (FIG. 61). When the light beam of the photo-cell unit 9382 (FIG. 68) is broken by a skid on the skid lift, the contacts 9382A (FIG. 73) open to deenergize the forward winding 837F and stop advance of the drag links. The skid lift starts downwardly substantially immediately after the beam of the photo-cell unit 9382 is broken. The skid stops 856 (FIG. 68) can catch and hold the trailing legs of the next following skid 774M while the skid 774M is spaced from the skid 774 on the skid lift.

When the skid lift is stopped at either the middle level or the lower level and a skid is required at the level at which the skid lift has stopped, the forward or off-lift winding 901F (FIG. 73) of the skid lift conveyor motor 901 (FIG. 65) is energized. If a skid is called for at the lower level, contacts 1086B of the fourth control relay 1086 (FIG. 74) for the lower level are closed. When the skid lift reaches the lower level, contacts 913B (FIG. 73) of the lower level limit switch 913 (FIG. 50) are closed to energize the winding 901F (FIG. 73) causing the skid lift conveyor tires 908 and 909 to turn clockwise as shown in FIG. 64 to advance the skid off the skid lift and onto the roller conveyors 978 and 9781 (FIG. 70). A motor relay 9392M (FIG. 73) prevents actuation of the winding 901F while the skid lift is being lowered.

If the skid lift is at the middle level and a skid is required at the middle level, contacts 1086M of a fourth control relay of the middle level electric circuitry (not shown in detail) are closed indicating that a skid is required at the middle level. The operation of the fourth control relay of the middle level can be similar to the operation of the fourth control relay of the lower level already discussed. Contacts 914B of the middle level limit switch 914 (FIG. 50) are closed to energize the winding 901F (FIG. 73) to advance the skid from the skid lift at the middle level.

When the skid has been discharged from the skid lift, contacts 897B of the limit switch 897 (FIG. 64) close to indicate that there no longer is a skid on the skid lift and the skid lift raising winding 9392R (FIG. 73) is energized through a circuit including contacts 916D of the top level limit switch 916 (FIG. 50) to advance the skid lift upwardly. When the skid lift reaches the upper level, the contacts 916D (FIG. 73) open to deenergize the winding 9392R. A hold-in circuit for the skid lift raising winding 9392R is provided by motor relay contacts 9392M (FIG. 73) which cause the skid lift to advance upwardly to its uppermost position once it has started upwardly and has left the level at which the skid has been discharged. The motor relay contacts 9392M are in series with the bottom level limit switch contacts 913A and with the middle level limit switch contacts 914A so that the hold-in circuit is not energized until the skid lift is away from the lower level and is not energized until the skid, if at the middle level, has started away from the middle level.

The skid lift motor windings 9392F and 9392R are provided with interlocking motor relay contacts 9392J and 9392K, respectively, which prevent energizing of one of these windings when the other of these windings is energized.

The skid is discharged onto the tires 940 and 941 (FIG. 70). If the transfer conveyor 671 is in its lowered position and the limit switch 762 (FIG. 54) is actuated, a circuit to a forward winding 951F (FIG. 74) of the motor 951 (FIG. 70) can be energized. This circuit is energized through normally closed contacts 983A (FIG. 74) of the limit switch 983 (FIG. 70) and contacts 986A (FIG. 74) of the limit switch 986 (FIG. 70). The winding 951F drives the shafts 942, 943, and 957 in a clockwise direction as shown in FIG. 69 to advance the skid to the right as shown in FIGS. 69 and 70. The leading leg of the skid passes the switch operator 982 of the limit switch 983 momentarily opening switch contacts 983A thereof as shown in FIG. 74 but, since contacts 1086C of the fourth control relay 1086 remain closed, the skid advances further to break the light beam of the photo-cell unit 979 and the target 981 (FIG. 70) at which time the fourth control relay 1086 is energized closing contacts 1086D thereof and opening the contacts 1086C thereof. The skid continues to be advanced, and the leading leg thereof momentarily opens contacts 986A of the limit switch 986 (FIG. 70), but the circuit to the winding 951F (FIG. 74) continues to be energized through the limit switch contacts 983A and the contacts 1086D of the fourth control relay 1086 until the trailing leg 779A (FIG. 70) of the skid engages the switch actuator 982 of the limit switch 983 to open the contacts 983A thereof deenergizing the winding 951F and stopping advance of the skid at the first loading position thereof, as shown in FIG. 53.

The transfer conveyor assembly 671 is then raised to the FIGS. 51 and 53 position. A solenoid 1091 (FIG. 74) is energized by a circuit which includes contacts 1092A of a push button skid discharge switch 1092, contacts 7967A of the limit switch 7967 (FIGS. 70 and 75) and motor relay contacts 951M of the winding 951F. The limit switch 7967 has contacts which are normally in the position shown in FIG. 74 but which are held in their opposite condition by action of the spring 7968 (FIG. 75). Thus, when the winding 951F (FIG. 74) is deenergized to permit closing of motor relay contacts 951M thereof, the solenoid 1091 is energized. The solenoid 1091 draws a valve 1092 (FIG. 72) to the position shown at which fluid under pressure is introduced into the left hand end of the cylinder 759 (FIGS. 51 and 54) to cause the transfer conveyor assembly 671 to rise to the FIGS. 51 and 53 position at which stacks of carton blanks are advanced onto the transfer belt conveyors 658 and 659 overlying the skid in its first stack receiving position. When a predetermined number of stacks of carton blanks in a first row of stacks has been advanced onto the transfer belts 658 and 659, the first stack in the row engages the gate 7961A (FIG. 70) to swing the gate arms 7963A clockwise to permit the contacts of the limit switch 7967 to move to the position shown in FIG. 74. When the last stack has cleared the light beam of the photo-cell unit 3017, contacts 3017B thereof close, and a solenoid 1093 is energized by a circuit including the push button contacts 1092A, gate limit switch contacts 7967B, and the contacts 3017B of the photo-cell unit 3017. When the solenoid 1093 is energized, the valve 1092 (FIG. 72) moves to its other position at which fluid under pressure is introduced into the right hand end of the transfer conveyor assembly cylinder 759 to lower the transfer conveyor assembly 671 to the FIG. 54 position. When the transfer conveyor assembly 671 has been lowered to leave the first row of stacks of carton blanks on the skid and the contacts of the limit switch 762

(FIG. 74) are again closed, the winding 951F is again energized by a circuit including gate relay contacts 7967C of the gate relay 7967 (FIG. 70) and the limit switch contacts 762 (FIG. 74), and the skid is again advanced by the winding 951F. The skid advances moving the first stack of the first row beyond the gate 7961A (FIG. 70), whereupon the spring 7968 (FIG. 75) swings the arms 7963A and the gate 7961A (FIG. 70) back to their original position holding the switch operator 7966 (FIG. 75) of the gate switch 7967 in a position where the gate switch contacts are in the alternate position of FIG. 74. The skid advances further until the trailing edge of the skid comes free of the light beam of the photo-cell unit 979 (FIG. 70) and the target 981 whereupon the fourth control relay 1086 (FIG. 74) is deenergized. Advance of the skid continues until the trailing leg of the skid engages the switch operator 984 (FIG. 70) of the limit switch 986 as indicated at 779AA in FIG. 70, whereupon the skid advance is stopped by opening of the limit switch contacts 986A (FIG. 74), and of the fourth control relay contacts 1086D. The transfer conveyor assembly 671 is raised again in the manner already described to the FIG. 52 position, and a second row of stacks of carton blanks is advanced onto the transfer belt conveyors 658 and 659 overlying the skid in the second loading position of FIG. 52.

Deenergizing of the fourth control relay 1086 as the skid clears the beam of the photo-cell unit 979 (FIG. 70) signals that the lower level is ready to receive another skid. A winding 951R (FIG. 74) of the motor 951 (FIG. 70) is energized by closing of photo-cell contacts 979P (FIG. 74) to drive the shafts 942 and 943 (FIG. 70) clockwise as shown in FIG. 69 but without driving the shaft 947. When the next skid is discharged at the lower level, the next skid is advanced until the leading edge thereof breaks the light beam of the photo-cell unit 979 (FIG. 70) and the target 981 whereupon the contacts 979P (FIG. 74) open to deenergize the winding 951R. Thus, the next skid can be advanced to this position while the transfer conveyor 671 is in raised position. The windings 951F and 951R are provided with interlocking motor relay contacts 951J and 951K, respectively, which prevent energizing of one of the windings when the other of the windings is energized.

When the desired number of stacks of carton blanks has been assembled in a second row above the skid, the frist stack of the second row engages the gate 7961A (FIG. 70) to permit closing of the switch contacts 7967B, whereupon the transfer conveyor assembly 671 is again lowered to the FIG. 54 position to leave the second row of carton blanks on the loaded skid. When the assembly 671 has again been lowered, the switch contacts 762 (FIG. 74) again close, and the winding 951F is again energized by the circuit including the gate limit switch contacts 7967C and the contacts 762. The loaded skid is advanced beyond the transfer conveyor assembly and onto the tires 987 and 988 (FIG. 70) while the next skid is advanced into position to receive a first row of carton blanks.

The tires 987 and 988 are mounted on the shaft 989, as already pointed out. The shaft 989 and the shaft 991, which carries the tire 992, are driven in unison by the motor 997 (FIG. 74). The motor 997 is energized so long as one of the switches 1002 and 1007 is not actuated. As the loaded skid advances, the leading leg thereof reaches the position shown at 779B (FIG. 70) where it engages the switch operator 1001 of the limit switch 1002. If there already is a preceding skid at the position where the leading leg of the preceding skid is shown at 779BB engaging the discharge gate 1003, the contacts of the limit switch 1007 are already open, and the loaded skid stops at the position where the limit switch 1002 is actuated because the contacts of both the limit switches 1002 and 1007 (FIG. 74) are actuated. When the preceding skid has been removed from the position engaging the discharge gate 1003 (FIG. 70), the discharge gate 1003 is swung back into the skid path by action of the spring 1008, and the contacts of the limit switch 1007 close (FIG. 74) energizing the motor 997 so that the filled skid is advanced to the limit of advance thereof by the tire 992 (FIG. 70) and into a position where the loaded skid can be removed by arms of a fork lift (not shown) introduced between the frame guides 1009.

During normal operation of the machine, empty skids are loaded onto the upper levels of the stacking sections 42 and 43 (FIG. 1) of the machine as available and loaded skids are removed from lower levels of the stacking sections as delivered while carton blanks are delivered continuously to the machine.

If a defective stack or partial stack is to be rejected, operation of the reject switch 1082 (FIG. 74) and of the reject conveyor 557 (FIG. 45) permits removal thereof as already explained.

If it is necessary to remove a skid before it has been completely loaded, the skid discharge push button switch 1092 is depressed. This moves the contacts 1092A thereof from the position shown to the alternate position to energize the solenoid 1093 if the beam of the photo-cell unit 3017 is unbroken to cause lowering of the transfer conveyor assembly. Opening of contacts 1029B prevents operation of the winding 951R while closing of the contacts 1092C energizes the winding 951F as soon as the transfer conveyor assembly has been lowered to close switch contacts 762, allowing immediate discharge of the skid.

In the hydraulic system (FIG. 72) throttle-check valve units are provided in the lines controlled by the valves 1056, 1072, and 1092 to permit control of the rate at which the components actuated thereby can advance. These throttle-check valve units are given the same numerals as the associated valves with the addition of the letters N and P. A pressure controlled check valve 1097 in a line 1098 which supplies fluid to the left hand end of the cylinder 759 for raising the transfer conveyor assembly is controlled by pressure in a line 1099 connected between the valve 1092 and the right hand end of the cylinder 759. The pressure controlled check valve 1097 prevents lowering of the transfer conveyor assembly until there is a positive pressure in the line 1099. Throttle-check valve units 524N and 524P in lines 524S and 524T which supply the fork lift cylinder 524 similarly permit adjustment of the maximum speed of raising and lowering of the fork assembly. A pressure controlled check valve 524V in the line 524T prevents descent of the fork assembly except when there is a positive pressure in the line 524S.

A throttle-check valve unit 496T in the line 1042 permits regulation of the maximum rate of lowering of the tongue assembly and of the fork assembly when under control of the control valve 496 where a sudden group of carton blanks can raise the rocker frame 492 of the control valve 496 more than is usual in normal operation of the machine.

In the foregoing description of the operation of the machine, only the operation of one level of one of the sections has been described in detail, but the operation of other levels is similar to that described above.

The machine receives carton blanks from the printing press with the printed faces up, spaces the carton blanks for cooling thereof, inverts the carbon blanks, and assembles the carton blanks in stacks on skids with printed faces down in proper condition for feeding to carton folding and sealing machinery.

The carbon blank cooling and stacking machine shown in the drawings and described above is subject to structual modification without departing from the spirit and scope of the appended claims.

Having described our invention, what we claim as new and desire to secure by Letters Patent is:

1. In a machine for loading articles onto a skid, skid handling apparatus which comprises a skid lift, means for supporting skids at a skid loading level, means for advancing the skids along the skid loading level toward the skid lift, means on the skid lift for drawing one of the skids onto the skid lift at the skid loading level, the means for drawing the skid onto the skid lift being constructed to discharge the skid at a stack loading level, means for advancing the skid at the stack loading level to a stack receiving station, means at the stack receiving station for advancing stacks of articles onto the skid, the means for advancing stacks of articles onto the skid including a transfer table having elongated transfer belt means, the transfer table being raisable and lowerable at the stack receiving station between a raised position in which the transfer belt means extends through slot means in the skid and a lowered position free of the skid, means for advancing a stack of articles onto the transfer belt means when the transfer table is in raised position, and means for advancing the transfer belt means to advance the stack above the skid, the stack being deposited on the skid when the transfer table is lowered.

2. A machine as in claim 1 wherein there is a light beam extending crosswise of the path of skid advance ahead of the stack receiving station, means for stopping the skid advancing means when the skid is at a first skid position at the stack receiving station in which the skid is in the light beam to break the light beam, means for advancing the skid advancing means to advance the skid to a second position at the stack receiving station in which the skid is free of the light beam when a first row of stacks of articles has been received thereon at the first position, and means controlled by the light beam for advancing another skid to the light beam when the first skid is at the second position.

3. A machine as in claim 2 wherein there is a second skid advancing means at the stack loading level for advancing the skid away from the stack receiving station when a second row of stacks has been received on the skid while at the second position.

* * * * *